United States Patent

Noguchi et al.

[11] Patent Number: 6,046,734
[45] Date of Patent: Apr. 4, 2000

[54] IMAGE PROCESSOR

[75] Inventors: Yasushi Noguchi; Shyunsuke Takano; Susumu Orikasa; Akihiko Tao, all of Kanagawa, Japan

[73] Assignee: Sony Corporation, Tokyo, Japan

[21] Appl. No.: 08/826,476

[22] Filed: Mar. 27, 1997

Related U.S. Application Data

[62] Division of application No. 08/218,416, Mar. 25, 1994, Pat. No. 5,642,135.

[30] Foreign Application Priority Data

Mar. 22, 1993 [JP] Japan ................................ P05-087926

[51] Int. Cl.⁷ ...................................................... G09G 5/00
[52] U.S. Cl. ............................................ 345/203; 345/213
[58] Field of Search ..................................... 345/185–190, 345/199, 200, 203, 213; 348/581, 578, 607, 616, 617, 466

[56] References Cited

U.S. PATENT DOCUMENTS

| | | | |
|---|---|---|---|
| 4,007,486 | 2/1977 | Inaba et al. ................................. | 358/13 |
| 4,445,135 | 4/1984 | Heitmann et al. ......................... | 358/19 |
| 5,347,313 | 9/1994 | Chio ........................................ | 348/445 |
| 5,351,090 | 9/1994 | Nakamura ................................ | 348/484 |
| 5,572,655 | 11/1996 | Tuljapurkar et al. .................... | 345/186 |
| 5,724,053 | 3/1998 | Nagakubo ................................ | 345/213 |
| 5,801,718 | 9/1998 | Shimizu et al. ......................... | 345/213 |
| 5,926,174 | 7/1999 | Shibamiya et al. ..................... | 345/213 |

*Primary Examiner*—Amare Mengistu
*Attorney, Agent, or Firm*—Jay H. Maioli

[57] ABSTRACT

A picture processor for a video conference device, etc., can be used easily by carrying it into a room other than the video conference room, has an object of enabling the display of the input picture to be switched freely even if the picture of the line drawing is displayed together with the input picture. The picture of a line drawing, etc., is held at the corresponding position even in cases where the display of the input picture is switched by updating the input picture data, which is stored in the input picture memory 40, on the basis of the line drawing data and by writing the picture expressed with the line drawing data directly in the input picture, which is stored in the input picture memory 40.

5 Claims, 47 Drawing Sheets

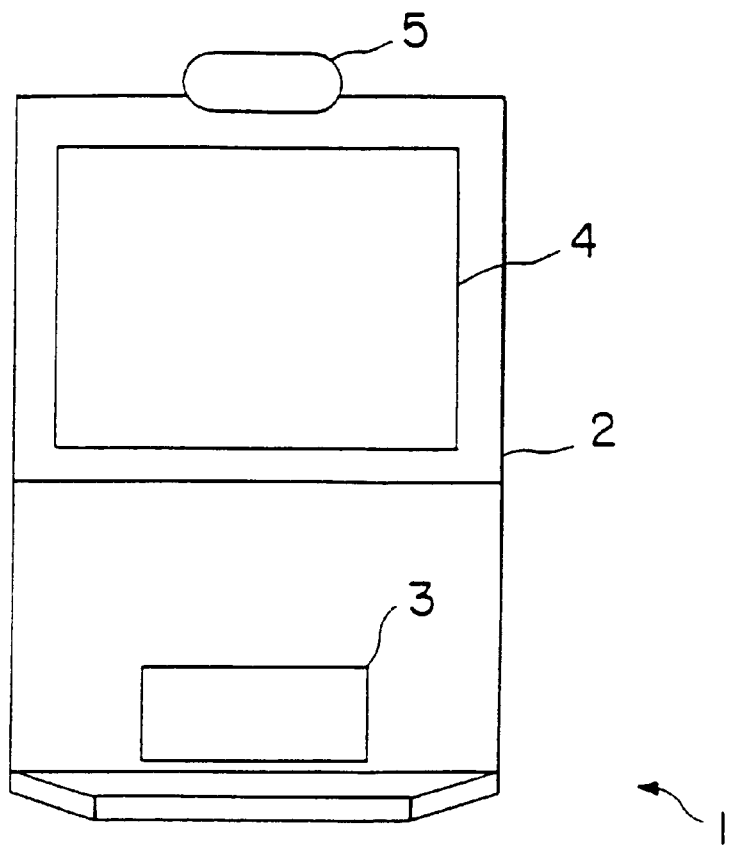
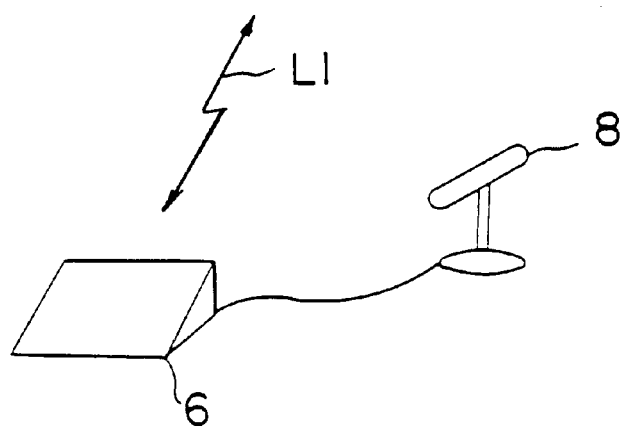
FIG. 1

| Y | ODD NO. | | 40A 40B 40A 40B - - - |
|---|---|---|---|
| | EVEN NO. | | 40E 40F 40E 40F - - - |
| U | ODD NO. | U | 40C 40C - - - - |
| | | V | 40D 40D - - - - |
| V | EVEN NO. | U | 40G 40G - - - - |
| | | V | 40H 40H - - - - |

FIG. 19

| 40A - - - - |
|---|
| 40B - - - - |
| 40C - - - - |
| 40D - - - - |
| 40E - - - - |
| 40F - - - - |
| 40G - - - - |
| 40H - - - - |
| 40A - - - - |
| 40B - - - - |

FIG. 20

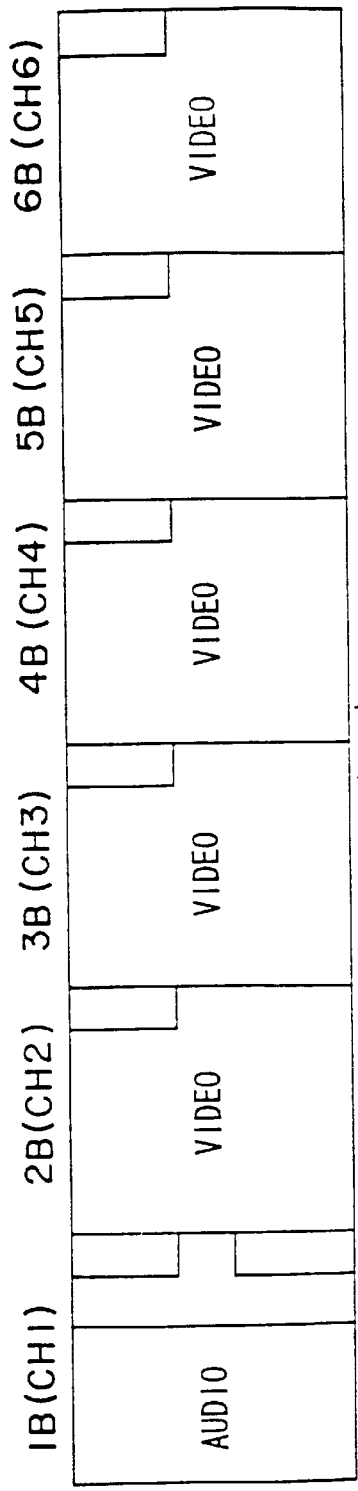
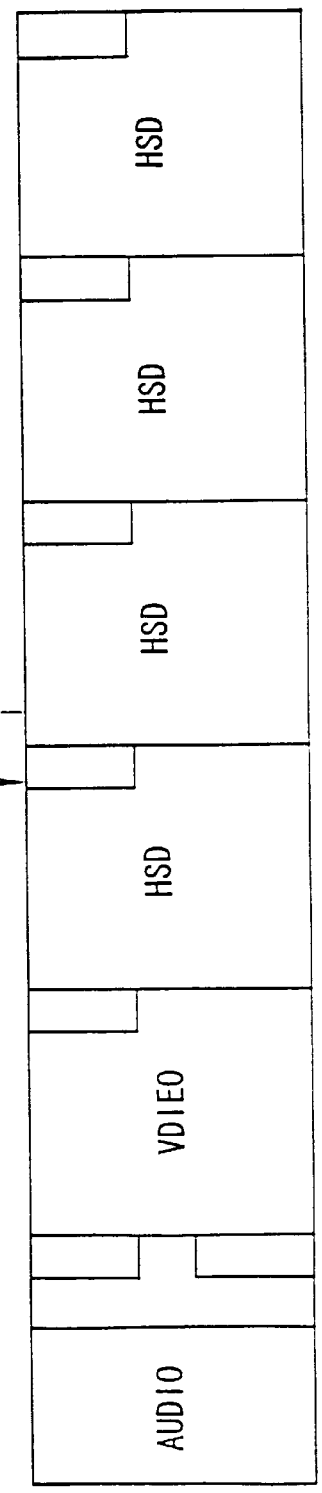
FIG. 35A
FIG. 35B

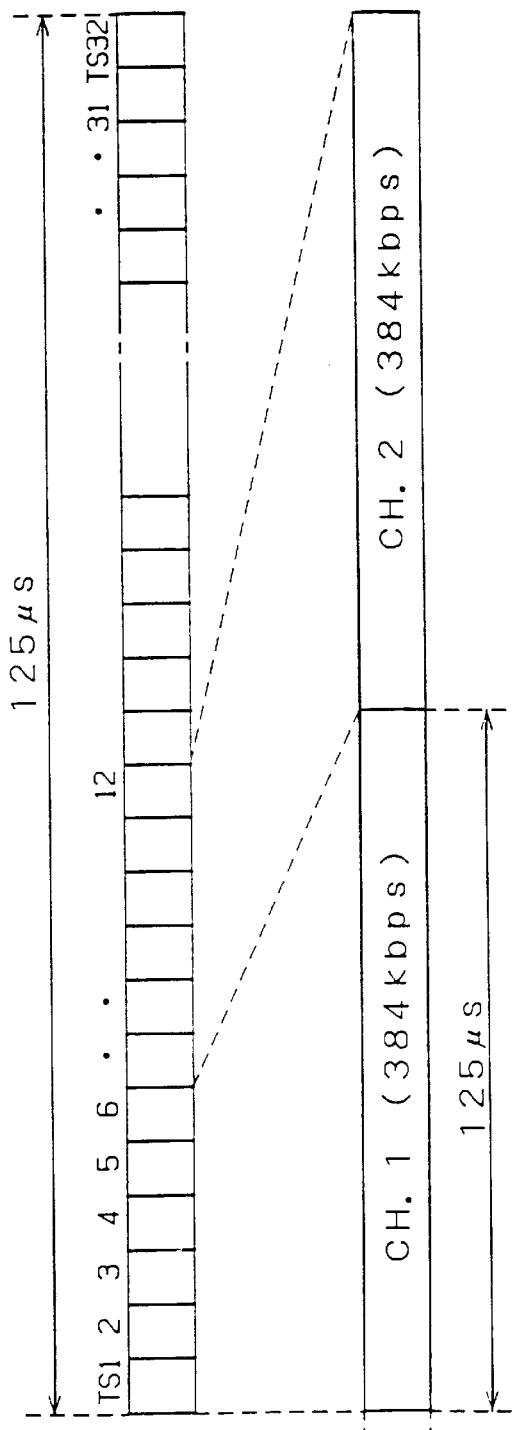

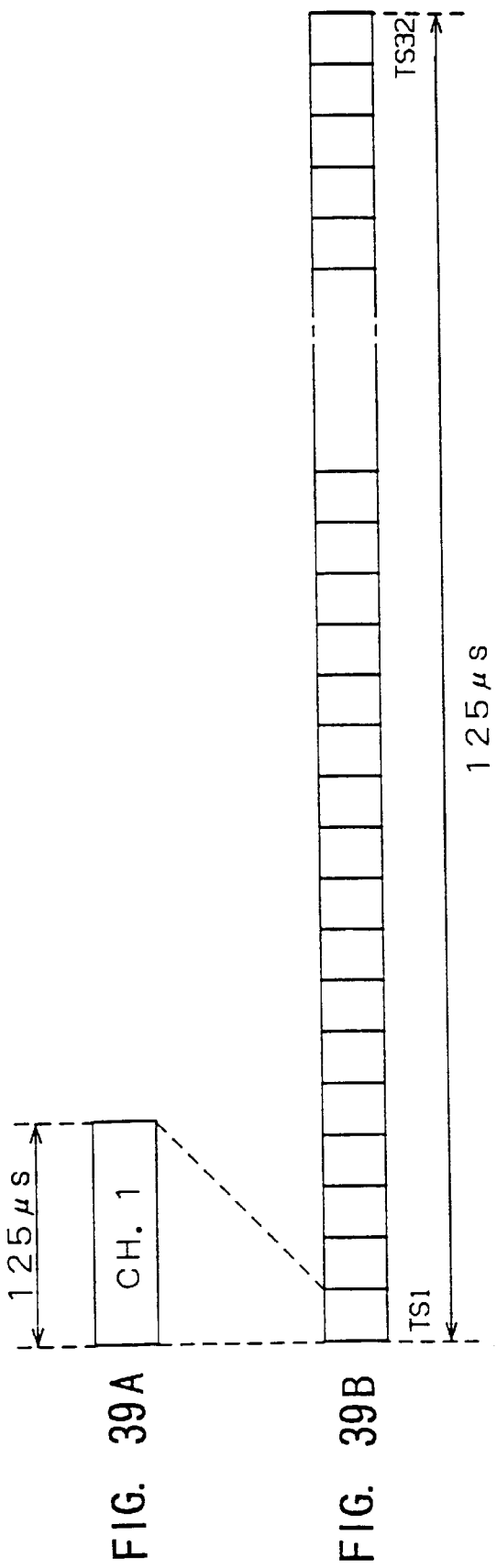

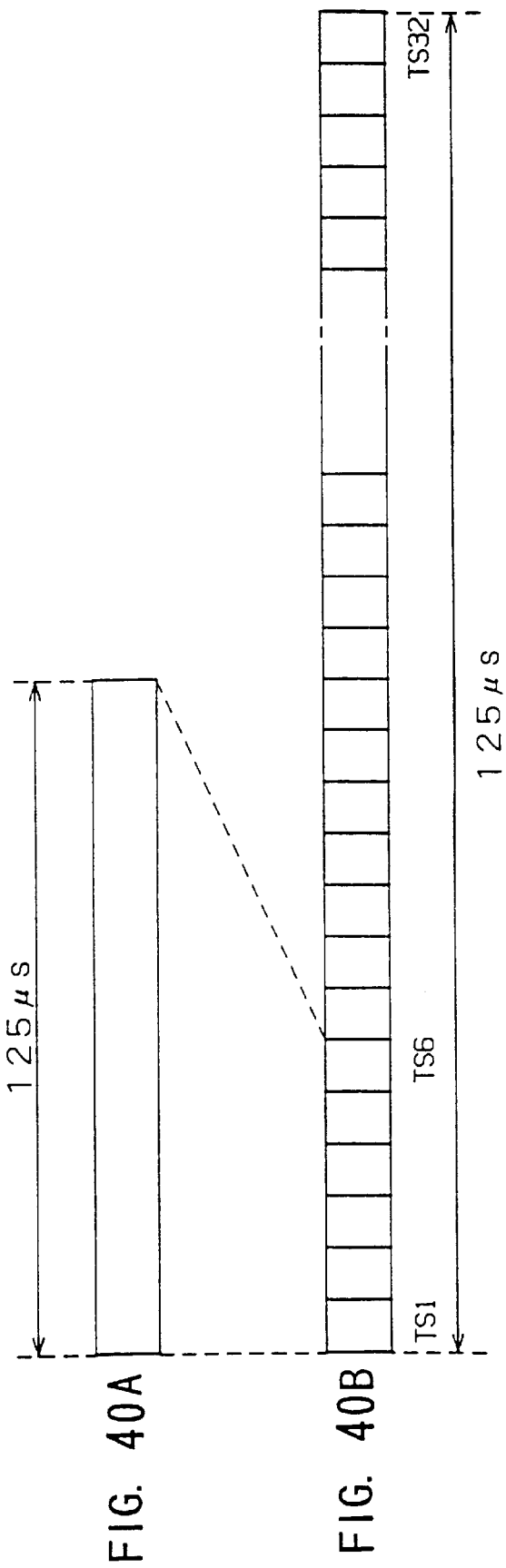

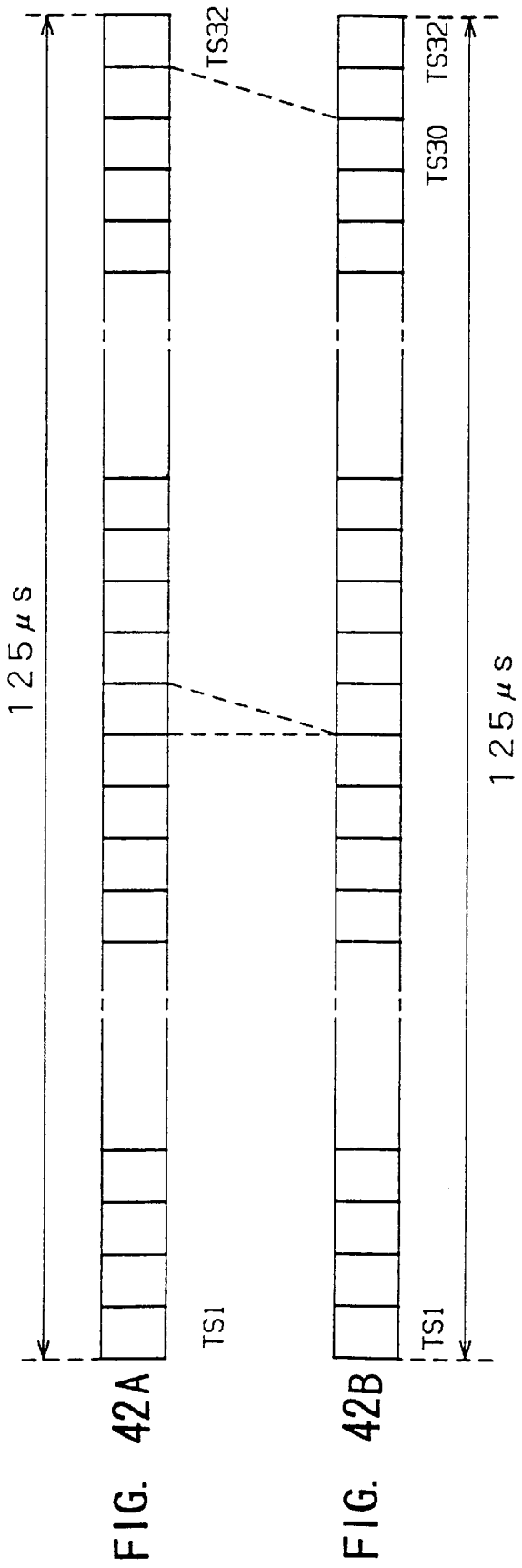

FIG. 45

| SUB-MULTI FRAME | FRAME | 1ST TO 8TH BITS OF SC OF EACH FRAME |  |  |  |  |  |  |  |
|---|---|---|---|---|---|---|---|---|---|
| | | 1 | 2 | 3 | 4 | 5 | 6 | 7 | 8 |
| SMF 1 | 0 | N1 | 0 | 0 | - | - | - | 0 | - | - |
| | 1 | 0 | 1 | A | E | C1 | C2 | C3 | C4 |
| SMF 2 | 2 | N2 | 0 | 0 | - | - | - | 0 | - | - |
| | 3 | 0 | 1 | A | E | C1 | C2 | C3 | C4 |
| SMF 3 | 4 | N3 | 0 | 0 | - | - | - | 0 | - | - |
| | 5 | 1 | 1 | A | E | C1 | C2 | C3 | C4 |
| SMF 4 | 6 | N4 | 0 | 0 | - | - | - | 0 | - | - |
| | 7 | 0 | 1 | A | E | C1 | C2 | C3 | C4 |
| SMF 5 | 8 | N5 | 0 | 0 | - | - | - | 0 | - | - |
| | 9 | 1 | 1 | A | E | C1 | C2 | C3 | C4 |
| SMF 6 | 10 | L1 | 0 | 0 | - | - | - | 0 | - | - |
| | 11 | 1 | 1 | A | E | C1 | C2 | C3 | C4 |
| SMF 7 | 12 | L2 | 0 | 0 | - | - | - | 0 | - | - |
| | 13 | L3 | 1 | A | E | C1 | C2 | C3 | C4 |
| SMF 8 | 14 | TEA | 0 | 0 | - | - | - | 0 | - | - |
| | 15 | R | 1 | A | E | C1 | C2 | C3 | C4 |

160msec

IMAGE PROCESSOR

This is a division of application Ser. No. 08/218,416 filed Mar. 25, 1994 U.S. Pat. No. 5,642,135.

BACKGROUND OF THE INVENTION

1. Field of the Invention

This invention relates to an image processor and more particularly, to a video conference apparatus in which picture data is compressed and transmitted together with audio data, etc.

2. Description of the Related Art

In a conventional video conference apparatus, it is so arranged that communication can be made with a desired communication object at a remote site by sending and receiving audio data, image data, etc., between predetermined transmission objects.

This is, this kind of video conference apparatus obtains pick-up images of a person attending a conference through a predetermined imaging section, fetches and compresses these pick-up images, and then sends them to a communication object.

Furthermore, the video conference apparatus also sends audio signals of this person present at a conference to a communication object and displays the image data coming from the communication object on a predetermined display by decompressing the data.

Furthermore, the video conference apparatus sends line drawing data which is input through a tablet, etc., to a communication object in response to a user operation, and in place of this, inputs a still picture through an image scanner, etc., and sends it to a communication object.

Therefore, the conventional video conference apparatus was so arranged that it can be installed in a dedicated video conference room so as to be able to send and receive a large capacity of data between communication objects by connecting the lines of optical fiber, for example.

If this kind of video conference apparatus can be used freely in a place other than the video conference room by carrying this apparatus to such a place as the need arises, the usage of this kind of video conference apparatus can be improved and it will become more convenient. In addition, the application field of this kind of video conference apparatus can be extended.

For this reason, it is necessary that this kind of video conference apparatus can be connected not only with optical fiber lines, but also with, for example, an integrated service digital network (ISDN) which has been widely diffused to general users. Furthermore, not only must connection with this kind of line by made possible, but also overall configuration has to be made simple.

Furthermore, the operation of the apparatus itself has to be made simple. It has to be arranged so that not only dedicated operators, but also users who are unfamiliar with its operation can operate it easily.

SUMMARY OF THE INVENTION

In view of the foregoing, an object of this invention is to provide an image processor for a video conference apparatus, etc., which can be used easily in places other than a video conference room by carrying it to that place.

The foregoing objects and other objects of the invention have been achieved by the provision of an image processor 1 comprising an input picture memory 40 for storing input picture expressed with input picture data by storing input picture data, which is input through a predetermined picture input means 15, a display picture memory 42 for storing the picture data of a picture for display, picture data transfer means 41D and 41E for transferring input picture data, which is stored in the input picture memory 40, to the display picture memory 42, picture data output means 10, 23, 41C, 41F, and 41Y for outputting picture data, which is stored in the display picture memory 42, to a predetermined display means 4, and a line drawing data input means 46 having a two-dimensional plane coordinate system corresponding to the display picture of the display means 4 for inputting line drawing data expressed with a coordinate system, in which the picture data transfer means 41D and 41E switch the display of the input picture which is displayed through the display means 4 by switching the input picture data to be transferred to the display picture memory 42 and in which the line drawing data input means 46 writes a picture expressed with the line drawing data directly into the input picture, which is stored in the input picture memory 40 by updating the input picture data, which is stored in the input picture memory 40, according to the line drawing data.

Furthermore, in this invention, the picture processor 1 holds a picture expressed with the line drawing data in a predetermined line drawing picture memory, the picture data output means 10, 23, 41C, 41F, and 41Y, display the input picture and a picture expressed with the line drawing data superimposed on each other on the display means 4 by outputting the picture data of the picture, which is stored in the line drawing picture memory 44 at the same time when the picture data stored in the display picture memory 42 is output on a predetermined display means 4, and when the picture data transfer means 10, 23, 41C, 41F, and 41Y switch the display of the input picture, the line drawing data input means 46 updates the input picture data stored in the input picture memory 40, according to the line drawing data by updating the input picture data stored in the input picture memory 40, with the picture data of the picture stored in the line drawing picture memory 44, and then, initializes the line drawing picture memory 44.

If it is so arranged that a picture expressed with the line drawing data is written directly into the input picture, which is stored in the input picture memory 40 expressed with the line drawing data by updating the input picture data, which is stored in the input picture memory 40, according to the line drawing data, the picture of a line drawing, etc., can be retained at a corresponding place even if the input picture display is switched.

Furthermore, when the display of the input picture is switched, the data of a line drawing stored in the line drawing picture memory 44 before the display is switched, can be processed freely by updating the input picture data stored in the input picture memory 40, with the picture data of the picture stored in the line drawing picture memory 44. In this way, the picture expressed with this line drawing data can be rewritten freely.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 1 is a front view illustrating a video conference apparatus according to the embodiment of this invention;

FIG. 19 is a schematic diagram for the explanation of the assignment of the memory for the natural picture;

FIG. 20 is a schematic diagram for the explanation of the assignment of the memory for the document picture;

FIGS. 35A and 35B are schematic diagrams for the explanation of the data transmission in the case where six lines of channel B are used;

FIGS. 38A and 38B are schematic diagrams for the explanation of the time slot in the case where two lines of channel $H_0$ are used;

FIGS. 39A and 39B are schematic diagrams for the explanation of the time slot in the case where one line of channel B is used;

FIGS. 40A and 40B are schematic diagrams for the explanation of the time slot in the case where one line of channel $H_0$ is used;

FIGS. 42A and 42B are schematic diagrams for the explanation of the time slot in the case where channel $H_{12}$ is used;

FIG. 45 is a schematic diagram for the explanation of FAS between the frames;

DETAILED DESCRIPTION OF THE EMBODIMENT

Figure 2:
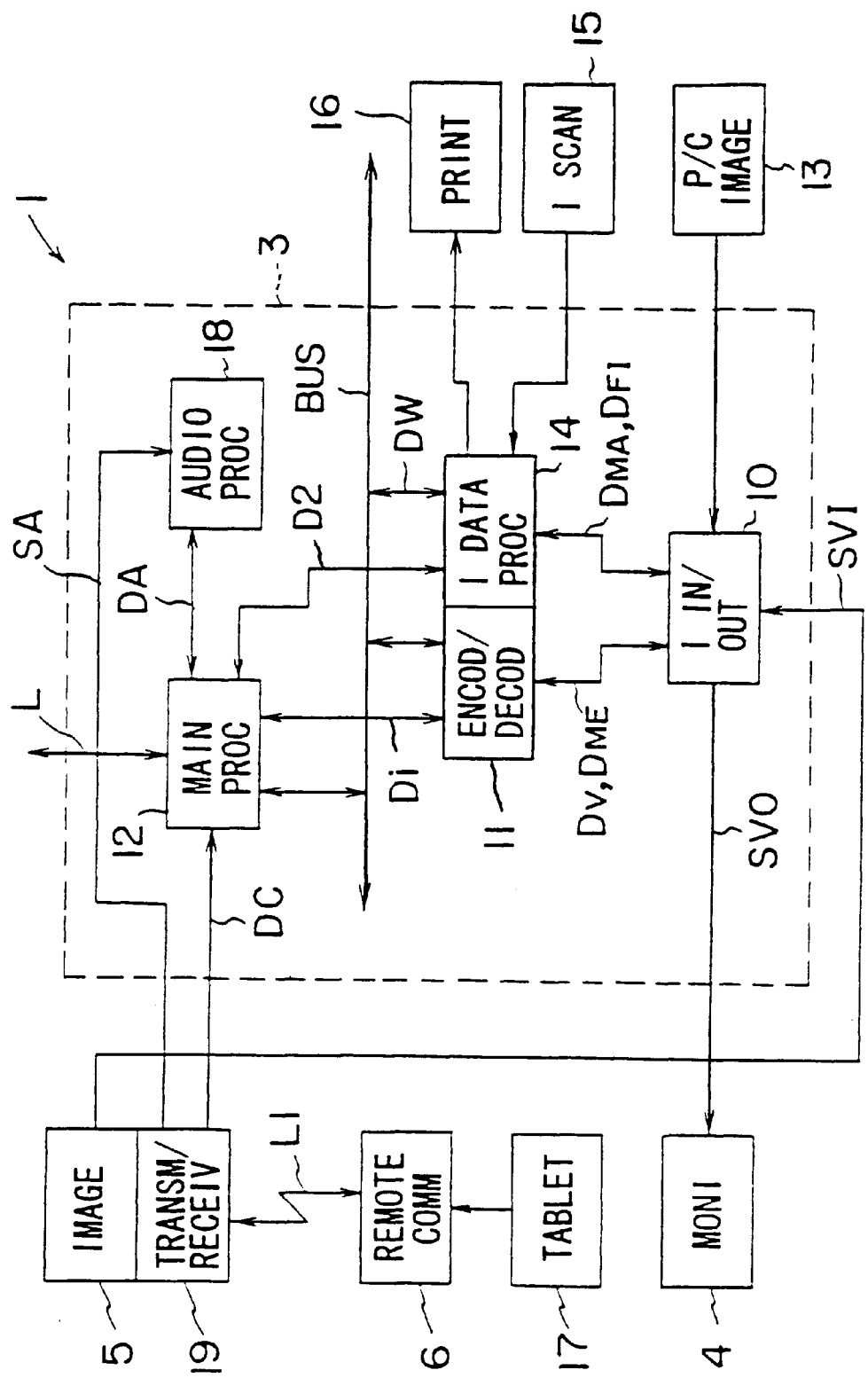
FIG. 2 is a block diagram illustrating the overall configuration.

Preferred embodiments of this invention will be described with reference to the accompanying drawings:

(1) Overall Configuration

In FIG. 1, 1 illustrates a video conference apparatus as a whole. A processor 3 is housed in a predetermined housing 2 and a monitor 4 is placed on the upper portion of this housing 2. Then, an imaging section 5 is placed on the upper portion of this monitor 4.

In this way, a video conference apparatus 1 images people present at a conference lining in front of the monitor 4 with an imaging section 5, processes the video signal of that imaging result with a processor 3, and sends it in the form of a motion picture to the communication objects. In addition, the video conference apparatus 1 receives and processes the picture data in the form of a motion picture, which is transmitted from a communication object, with the processor 3, and then, displays it on the monitor 4.

Furthermore, the video conference apparatus 1 outputs pictures, etc., transmitted from a communication object by connecting the processor 3 with a printer. Furthermore, an image scanner and a painting and calligraphy imaging apparatus are connected with the processor 3 so that binary pictures (hereinafter, referred to as "document pictures") and color still pictures (hereafter, referred to as "natural picture") input through this equipment can be sent to a communication object.

Furthermore, the video conference apparatus 1, similar to the case of the picture data, sends and receives audio signals by modulating the demodulating them between communication objects through the processor 3, and inputs and outputs these audio signals directly with external equipment and sends and receives these audio signals between the imaging section 5 and a remote commander 6.

The audio signal sent and received between this imaging section 5 and the remote commander 6 is sent and received through an infrared ray L1. In this way, the video conference apparatus 1 can collect voices of people who are present at a conference by connecting a microphone 8 to this remote commander 6. In addition, the voice of a communication object can be monitored through a speaker attached to a remote commander 6.

Furthermore, the video conference apparatus 1 sends and receives the remote control signal of the processor 3 and the imaging section 5 between the imaging section 5 and the remote commander 6, in addition to this audio signal. In this way, the video conference apparatus 1 can switch overall operation modes, the scale factor of the imaging section 5, etc., by selecting the menu displayed at the lower section of the display screen of the monitor 5 by operating the remote commander 6.

In this way, the video conference apparatus 1 is so arranged that the operation mode, etc., can be switched by a simple operation so as to improve overall operability.

Furthermore, in this embodiment, the remote commander 6 can be connected with a tablet. Two-dimensional coordinate data input through this tablet is sent to the imaging section 5 which outputs then this coordinate data to the processor 3. In this way, the video conference apparatus 1 can send and monitor line drawing data input by operating the tablet to a communication object as the need arises.

(1-1) Processor

As shown in FIG. 2, the processor 3 inputs a video signal SVI input from the imaging section 5 to an image input/output section 10, in which the video signal SV is converted into digital signal to generate a digital video signal which is compressed by an encoder/decoder 11.

In this process, the encoder/decoder 11 compresses this digital video signal according to a format regulated in CCITT (comite consultaif international telegraphique et telephonique) H.261 and outputs the image data D1 obtained as a result to a main processing section 12.

In this way, the video conference apparatus 1 can transmit the imaging result of the imaging section 5 effectively in the form of a motion picture.

On the contrary, of the picture data which is transmitted from a communication object through the line L, the picture data D1 of the motion picture, which is compressed according to the format regulated in CCITT H. 261, is input from the main processing section 12 to the encoder/decoder 11. The data is decompressed there, and then, converted into a video signal SVO by the image input/output section 10, and output to the monitor 4.

On the contrary, in cases where paintings and calligraphic works are imaged with a painting and calligraphy imaging apparatus 13 and their images are transmitted, the processor 3 converts a video signal output from the painting and calligraphy imaging apparatus 13 into a digital video signal by the image input/output section 10, and then, compresses the data with an image data processing section 14 and sends it from the main processing section 12 to a communication object as picture data.

In this way, the video conference apparatus 1 can input the natural image through the painting and calligraphy imaging apparatus 13 and transmit it to a communication object as the need arises.

At this time, the image data processing section 14 compresses the data of a natural picture, which is fetched by applying the method of data compression (JPEG: joint photographic experts group) of a predetermined format regulated with respect to a still picture, and sends the picture data D2, which is obtained as a result, to a communication object through the main processing section 12.

On the contrary, in cases where a document picture input through an image scanner 15 is transmitted to a communication object, the processor 3 inputs the picture data of a document picture into the image data processing section 14, and there, compresses the data according to the procedures regulated on facsimile machines.

Furthermore, the video conference apparatus 1 sends this compressed picture data D2 to a communication object through the main processing section 12. In this way, the video conference apparatus 1 can also transmit a document picture effectively.

On the contrary, in cases where the picture data of a natural picture and a document picture is transmitted from a communication object, the image data processing section 14 receives this picture data D2 through the main processing section 12 and decompresses it to its original picture, and afterwards, outputs it to a printer 16 in response to a user operation. In addition, the image data processing section 14 converts the picture data into a digital video signal and outputs it to the image input/output section 10, and there, converts it into a video signal and outputs to the monitor 4.

In this way, the video conference apparatus 1 is so arranged that natural pictures and document pictures, which are transmitted in the form of still pictures from a communication object, can be monitored on the monitor 4 in place of the motion picture of a communication object or in addition to this motion picture. In addition, they can be output to the printer 16 as the need arises.

Furthermore, after the natural picture and document picture are fetched and the data is compressed, in a series of processes to send it to a communication object, the image data processing section 14 can output this natural picture and document picture to the monitor 4 through the image input/output section 10. In this way, the video conference apparatus 1 can monitor natural picture and document picture fetched as required.

Furthermore, when the natural picture and document picture which are sent and received between communication objects are monitored by the monitor 4, the image data processing section 14 can display a line drawing image, which is input through a tablet 17, superimposed on the natural picture and the document picture. In this way, it is so arranged that the processing of drawing, etc., can be performed on the display screen of the document picture and the natural picture.

This is, the main processing section 12 can fetch coordinate data through a transmitter/receiver 19 by connecting the tablet 17 to the remote commander 6.

Furthermore, the main processing section 12 sends this coordinate data to a communication object in the format of line drawing data DW.

Furthermore, the main processing section 12 reproduces the pictures of a line drawing, which the user inputs on the tablet 17, according to this line drawing data DW, and then outputs this picture data from the image data processing section 14 to the image input/output section 10 in the format of digital video signal and superimposes it on the natural picture and document picture there, and then, displays them on the monitor 4.

In this way, the video conference apparatus 1 can make communications possible by mutually inputting line drawing, etc., on this document picture or natural picture while monitoring the same document picture or natural picture as that of a communication object that is, telewriting is made possible.

Furthermore, the processor 3 processes an audio signal which is input/output directly between external equipment, and audio signal which is input/output between transmitter/receiver 19, with an audio processing section 18.

This is, the video conference apparatus 1 receives infrared ray L1, which is sent from the remote commander 6, with a transmitter/receiver 19, which is built in the imaging section 5, and there demodulates audio signals and control commands.

The audio processing section 18 inputs an audio signal SA received by this transmitter/receiver 19 and an audio signal input directly from external equipment in digital signal form. The data is compressed according to the format regulated there in CCITT G.711 and G.722, and then output to the main processing section 12.

Furthermore, the audio processing section 18 inputs audio data transmitted from a communication object through the main processing section 12 and expands the data there, and then, outputs it to the transmitter/receiver 19 and at the same time outputs it to the external equipment.

In this way, in the video conference apparatus 1, it is so arranged that communication with a communication object can be made possible by simply connecting the microphone 8 to the remote commander 6 even if the video conference apparatus 1 is not connected with the processor 3.

The main processing section 12 sends picture data and audio data input in this way to a communication object according to the format regulated in CCITT H.221 and outputs data, which is transmitted from a communication object according to this format, to each circuit block by separating it into picture data, audio data, etc.

That is, in this embodiment, the processor 3 has connectors for the connection with optical fiber and connectors for the connection with the integrated service digital network (ISDN) on its rear side. By this, it is so arranged that communication can be made by connecting a maximum of two 384 [kbps] lines (that is, consisting of channel $H_0$) through an optical fiber and by connecting a 1536 [kbps] line and a 1920 [kbps] line (that is, consisting of channels $H_{11}$ and $H_{12}$). In addition, it is so arranged that communication can be made possible by simultaneously connecting two to six (i.e., maximum) 64 [kbps] lines for the INS net 64 (information network system net 64) as required, which is a type of integrated service digital network (ISDN).

The main processing section 12 inputs/outputs data between communication objects through this line L and outputs a control command which is input from the transmitter/receiver 19, and a control command to a bus BUS in response to a control command DC which is transmitted from a communication object. In this way, the operation of each circuit block can be switched as required.

This is, the encoder/decoder 11, image data processing section 14, and audio processing section 18 switch their operations in response to a control command, which is output from the main processing section 12 through the bus BUS. In this way, the video conference apparatus 1 switches the display image of the monitor 4, and furthermore, switches the type of data, etc., to be sent to a communication object.

For the transmission of this control command, it is so arranged that the processor 3 inputs/outputs picture data and audio data, which are input/output between the main processing section 12 and the encoder/decoder 11, image data processing section 14, and audio processing section 18, through a dedicated connection line. In this way, a series of data compression, etc., can be processed at high speed.

(1-1-1) Image Input/Output Section

Figure 3:
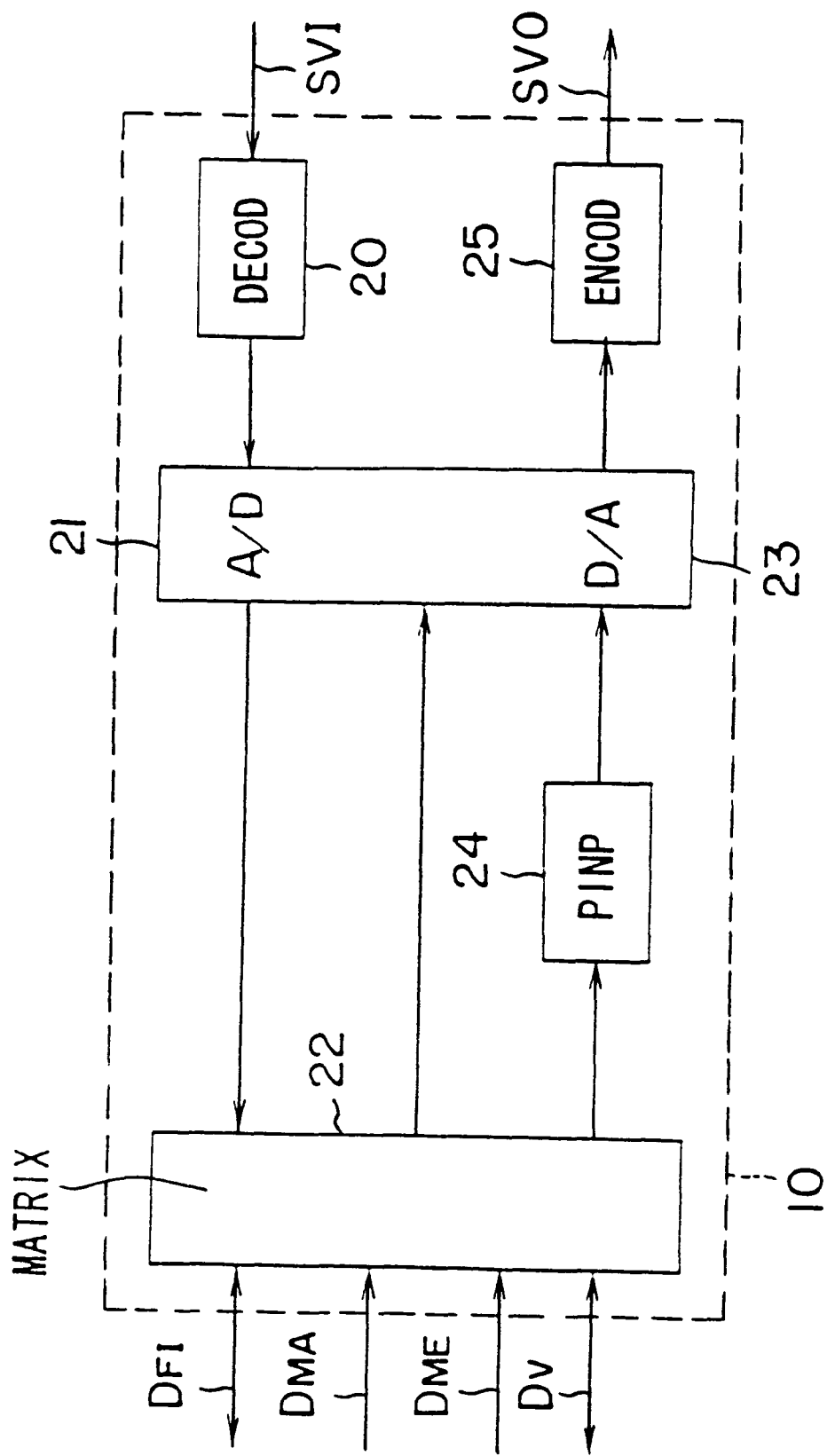
FIG. 3 is a block diagram illustrating the image input/output section.

As shown in FIG. 3, the image input/output section 10 inputs an NTSC-system video signal SVI from the imaging section 5 and the painting and calligraphy imaging apparatus 13 to a decoder 20 and there converts it into a brightness signal and a color difference signal.

An analog-to-digital converter (A/D) 21 converts these brightness signal and color difference signal into digital signal and then outputs them to the encoder/decoder 11 or the image data processing section 14 through a matrix circuit 22.

In this way, it is so arranged that the image input/output section 10 can fetch the picture data of a motion picture from the imaging section 5 as required and can fetch the picture data of a natural picture from the painting and calligraphy imaging apparatus 13.

Furthermore, the image input/output section 10 receives the picture data $D_V$ of a motion picture, which is transmitted from a communication object, and the picture data $D_{ME}$ of a menu, which is displayed on the monitor 4, from the encoder/decoder 11 to the matrix circuit 22, and furthermore, receives the picture data $D_{MA}$, which is output from the image data processing section 14, to the matrix circuit 22 and outputs the output data of this matrix circuit 22 to a digital-to-analog converter (D/A) 23.

At this time, the matrix circuit 22 selects and outputs picture data $D_V$, $D_{ME}$, and $D_{MA}$ in response to a user operation and synthesizes these picture data $D_V$, $D_{ME}$, and $D_{MA}$, and outputs them selectively.

The digital-to-analog converter 23 converts this picture data into an analog brightness signal and an analog color difference signal and converts these brightness signal and color difference signal into NTSC-system video signals SVO by the encoder 25 and then outputs them to the monitor 4.

In this way, when the picture data $D_V$ of the motion pictures, which are transmitted from a communication object, and the picture data $D_{ME}$ of a menu are selected in the matrix circuit 22, the image input/output section 10 can display the person attending a conference or the like of a communication object with the menu.

In addition, in place of this, when picture data $D_{MA}$, which is output from the image data processing section 14, is selected together with picture data $D_{ME}$, the image input/output section 10 can display the natural picture and document picture, which are transmitted from a communication object, and furthermore, the natural picture and document picture, which are fetched by this video conference apparatus 1, with the menu. Furthermore, the image input/output section 10 can display a document picture with a line drawing picture as required.

Furthermore, when the user selects the sub-screen display mode, the matrix circuit 22 outputs the picture data, which is selected on the sub-screen, to the digital-to-analog converter 23 through a sub-screen creation circuit (PINP) 24.

In this way, the video conference circuit 1 displays a small sub-screen in the main display screen as required so that motion pictures and document pictures, or furthermore, motion pictures and natural pictures can be monitored at the same time, for example.

In addition, the image input/output section 10 selects image data $D_{ME}$ in place of this by the matrix circuit 22 at the time of starting after the power is turned on, and displays the initial screen by this, thereby displaying a menu which can be selected.

Furthermore, in this embodiment, the image input/output section 10 outputs a video signal, which is input to the decoder 20, directly on the monitor 4, thereby monitoring even the result of image pick-up of the imaging section 5.

(1-1-2) Encoder/Decoder Section and Audio Processing Section

Figure 4:
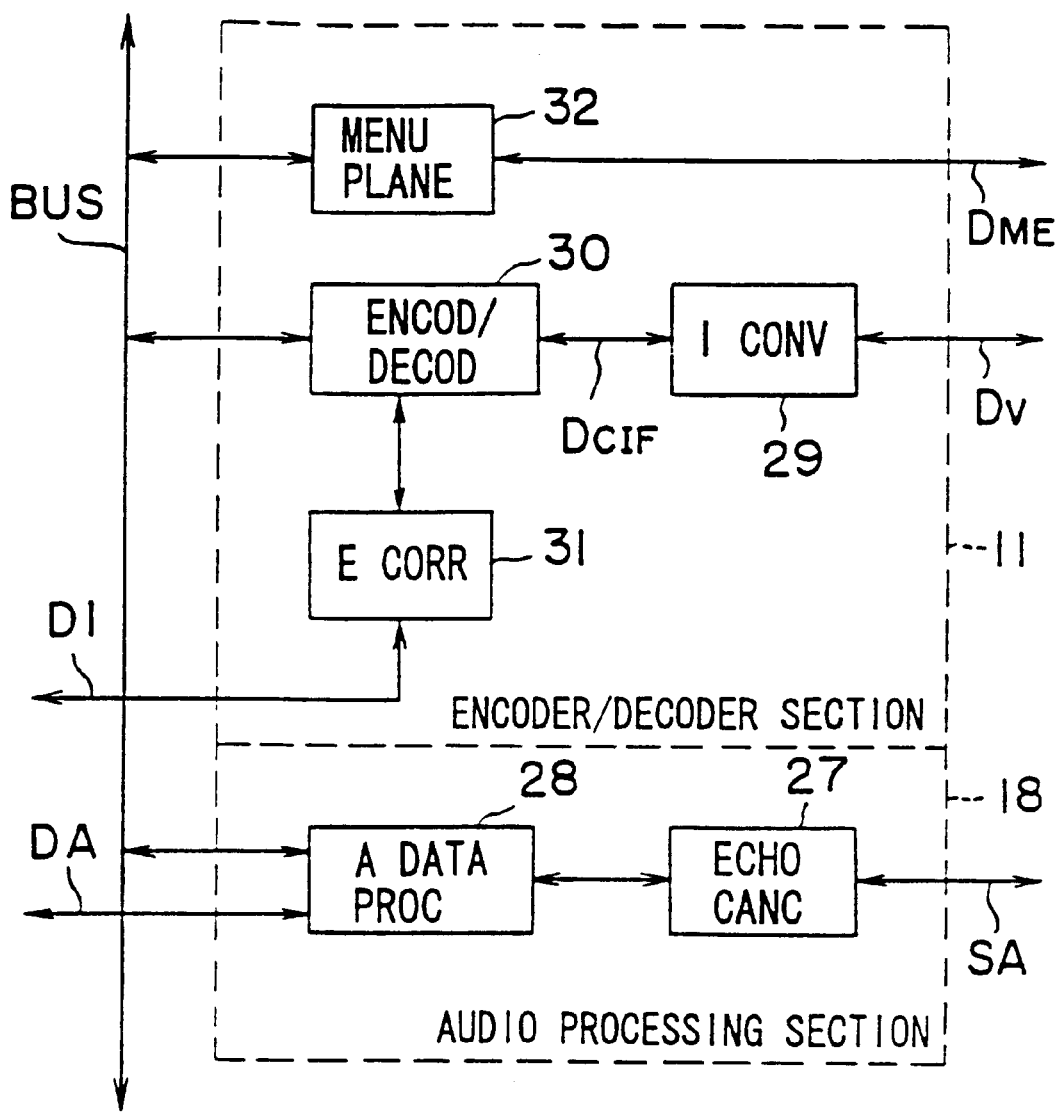
FIG. 4 is a block diagram illustrating the encoder/decoder section.

As shown in FIG. 4, the audio processing section 18 converts an audio signal SA, which is input from the transmitter/receiver 19 or an external equipment, into a digital signal by an echo canceler 27, and then, compresses the data by the audio data processor 28 according to the format regulated in CCITT G.711 and G.722, and outputs it to the main processing section 12.

Furthermore, the audio processing section 18 receives audio data DA, which is output from the main processing section 12, to the audio data processor 28, and expands the data there conversely to the case upon sending so as to restore its original audio data, and then, converts it into an analog signal and outputs it through the echo canceler 27.

At this time, the echo canceler 27 delays audio data, which is sent to a communication object, by temporarily storing it in a predetermined data storage means and carries out subtraction processing with audio data coming from a communication object, thereby reducing echoes which are generated when audio signals are sent and received using a stationary satellite.

On the other hand, the encoder/decoder 11 receives the picture data $D_V$ of the motion picture, which is imaged by the imaging section 5, to an image converter 29 through the image input/output section 10 and there carries out image conversion.

In this image conversion process, the image converter 29 converts this picture data $D_V$, which has the number of NTSC-format horizontal scanning lines and the frame frequency and formed in the format of brightness signal and color difference signal, into the picture data $D_{CIF}$, the number of horizontal scanning lines of which is 280 and the basic frame frequency of which is 30 [Hz], thereby generating image data $D_{CIF}$ subject to processing regulated in H.261.

On the other hand, an encoder/decoder 30 compresses this picture data $D_{CIF}$ according to the format regulated in H.261, outputs the picture data obtained as the result to an error correction circuit 31, adds an error-correcting code, and then, outputs to the main processing section 12.

In this way, the video conference apparatus 1 compresses data according to the H.261 format regulated by the CCITT Recommendation with respect to the picture data of the motion picture, which is input through the imaging section 5.

Furthermore, the error correction circuit 31 receives picture data D1, which is sent from a communication object, from the main processing section 12, and carries out error correction processing and outputs to the encoder/decoder 30. The encoder/decoder 30 expands this picture data $D_{CIF}$ and outputs to the image converter 29.

The image converter 29 interpolates this picture data $D_{CIF}$, thereby, conversely to the case upon sending, converting the number of horizontal scanning lines and the frame frequency of this picture data $D_{CIF}$ into the number of NTSC-format horizontal scanning lines and frame frequency and outputting them to the image input/output section 10.

In this way, the video conference apparatus 1 can monitor the picture data of the motion picture, which is transmitted according to the H.261 format.

A menu plane 32 is formed of a memory circuit in which the picture data is stored, and selectively outputs the stored picture data $D_{ME}$ to the image input/output section 10 in response to a control command input from the main processing section 12 through the bus BUS. In this way, the video conference apparatus 1 can display a selective menu on the display screen of the monitor 4 as required. This menu can be selected by the remote commander 6.

(1-1-3) Image Data Processing Section

Figure 5:
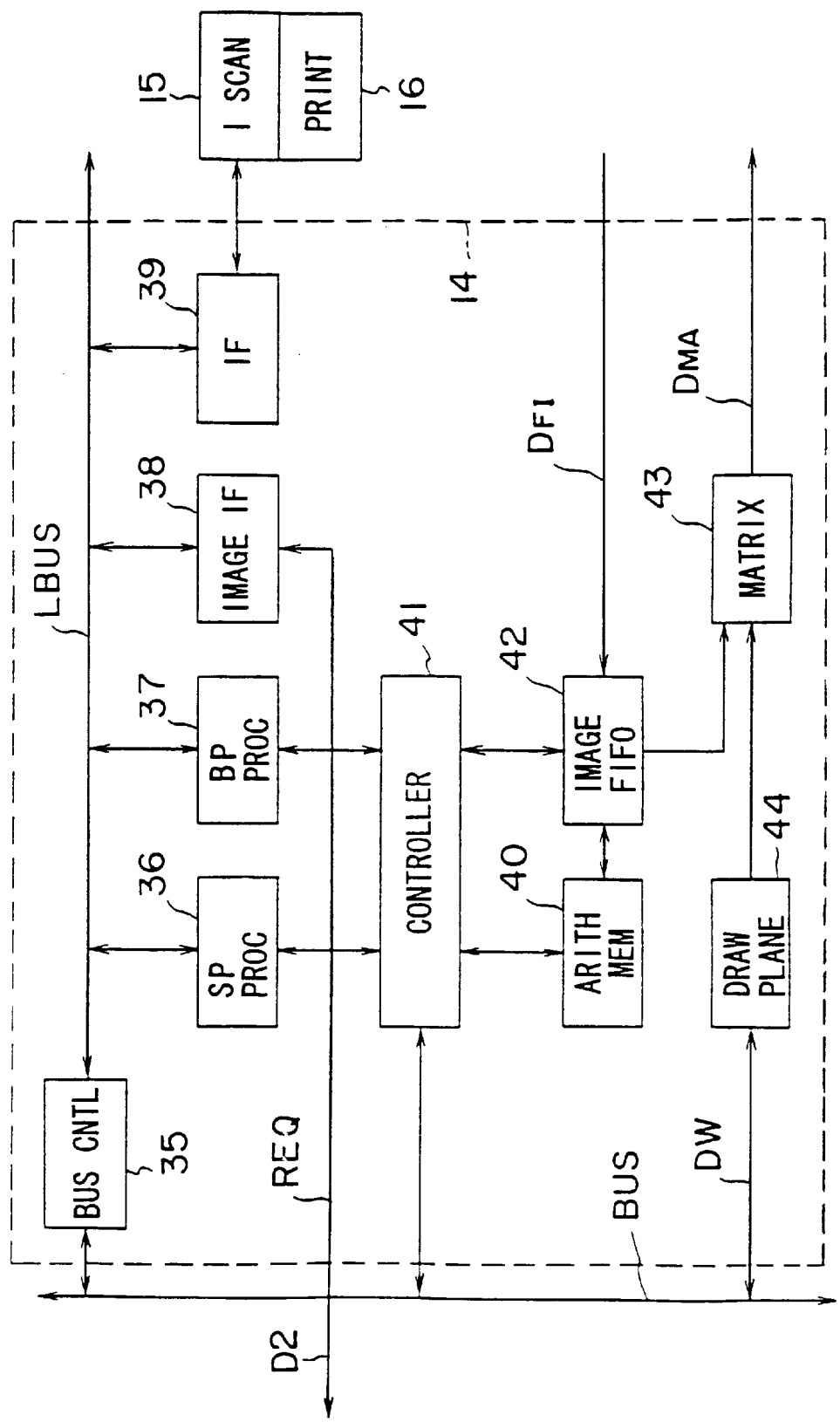
FIG. 5 is a block diagram illustrating the image data processing section.

As shown in FIG. 5, the image data processing section 14 connects a local bus LBUS with a bus BUS through a bus controller 35 and the processor 3 connects the main processing section 12 with this bus BUS.

On the other hand, the image data processing section 14 connects a still picture processor circuit 36, a binary picture processor circuit 37, an image interface circuit (image IF circuit) 38, and an interface circuit (IF) 39 with the local bus LBUS.

By this, when a control command is input from the main processing section 12 to the local bus LBUS through the bus controller 35, the image data processing section 14 separates the local bus LBUS from the bus BUS. In this way, the still picture processor circuit 36, binary picture processor circuit 37, image interface circuit 38, and interface circuit 39 can execute a predetermined data processing by independently accessing the arithmetic memory 40.

This is, the interface 39 consists of a SCSI (small computer system interface) system data input/output circuit. The interface 39 sequentially, inputs the picture data of document pictures, which are input through the image scanner 15, and stores them in the arithmetic memory 40. In addition, the interface 39 outputs the picture data of document pictures, etc., which are stored in the arithmetic memory 40, to the printer 16.

The binary image processor 37 drives a controller 41 to access to the arithmetic memory 40, thereby compressing the picture data of document pictures, which are stored in the arithmetic memory 40, according to the format regulated regarding facsimile machines and outputting the picture data obtained as a result to the image IF 38.

On the contrary, the binary picture processor 37 sequentially fetches and expands the picture data on the communication object side, which is output from the image IF 38, thereby restoring the picture data of document pictures, which are compressed and transmitted, and storing this restored picture data in the arithmetic memory 40.

On the other hand, the still picture processor 36 compresses the picture data of natural pictures, which are stored in the arithmetic memory 40, by applying the data compression technique regulated on the natural pictures, and outputs the picture data obtained as a result to the image IF 38.

On the contrary, the still picture processor 36 fetches the picture data of a communication object from the image IF 38 and expands it, thereby restoring the picture data of the natural pictures, which are compressed and transmitted, and storing them in the arithmetic memory 40.

In this way, the video conference apparatus 1 uses the arithmetic memory 40 by switching it for the natural picture or document picture to compress or expand natural pictures or document pictures.

The image IF 38 inputs/outputs the picture data D2 of natural picture and document pictures between the image IF 38 and the still picture processor 36, binary picture processor 37, and main processing section 12 according to the protocol, thereby resending the picture data D2 in response to a resend request sent from the communication object.

Furthermore, the image IF 38 outputs a restart marker code, etc., which is required for the determination of this resend request, by adding this picture data D2. Furthermore, for the picture data D2 coming from a communication object, the image IF 38 detects this restart marker code and outputs a resend request as required.

The controller 41 controls the arithmetic memory 40 in response to a request from the still picture processor 36 and the binary picture processor 37, thereby inputting/outputting desired picture data between the still picture processor 36, the binary picture processor 37, and the arithmetic memory 40.

Furthermore, the controller 41 switches the operation in response to a control command, which is input form the main processing section 12 through the bus BUS, thereby outputting the picture data of the arithmetic memory 40 to the image input/output section 10 through a picture FIFO (first in first out) 42 consisting of a memory circuit and monitoring natural pictures, document pictures, etc., which are stored in the arithmetic memory 40.

When these document pictures, etc., are output to the image input/output section 10, the memory controller 41 generates them by switching the address data in response to a control command, which is output from the main processing section 12, thereby displaying document pictures, etc., which are stored in the arithmetic memory 40, with a desired scale factor, and furthermore, scrolling, rotating, and displaying them on the monitor 4.

In this way, the video conference apparatus 1 can freely switch display of document pictures, etc., in response to a control command, which is transmitted from a communication object, and furthermore, in response to the user operation of the remote commander 6.

When these documents, etc., are output to the image input/output section 10, the picture FIFO 42 outputs the picture data through a matrix circuit 43 which adds the picture data of the line drawing stored in a drawing plane 44 and the picture data output from this picture FIFO 42 and outputs them in the telewriting operation mode.

In this way, the video conference apparatus 1 can display the line drawing pictures on the natural pictures and document pictures together.

That is, this drawing plane 44 stores the picture of this line drawing according to the line drawing data input through the tablet and the line drawing data transmitted from a communication object by that the main processing section 12 write the picture data.

In this way, the video conference apparatus 1 can telewrite on the document picture and the natural picture.

Furthermore, the controller 41 switches the operation of the picture FIFO 42, thereby fetching the result of the pick-up image of the painting and calligraphy imaging apparatus 13, which is input through the image input/output section 10, into the arithmetic memory 40 through the sequential picture FIFO 42 and compressing and transmitting this picture data using the still picture processor 36.

(1-1-4) Main Processing Section

Figure 6:
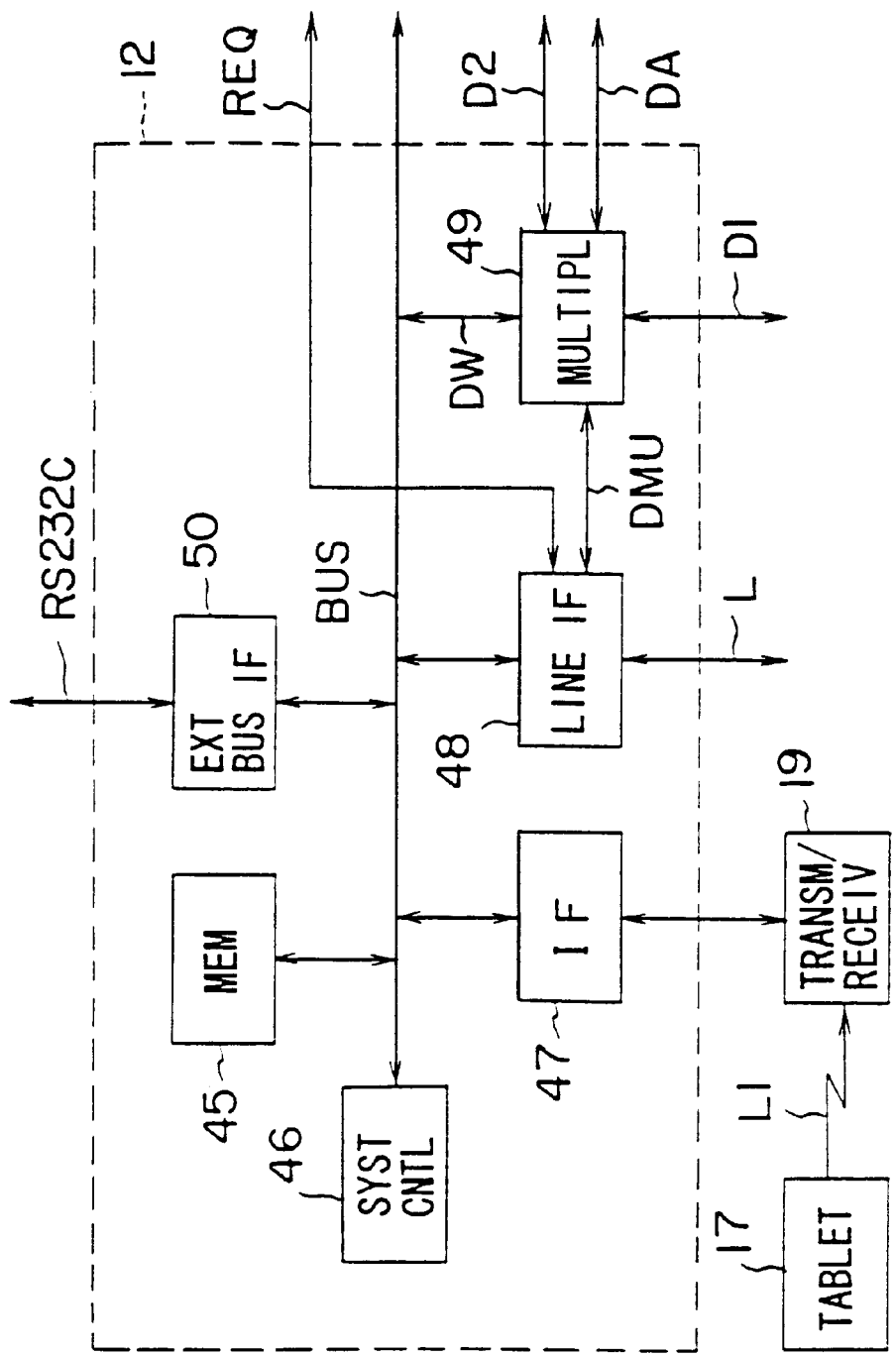
FIG. 6 is a block diagram illustrating the main processing section.

As shown in FIG. 6, the main processing section 12 executes the procedures stored in a memory circuit 45 using a system controller 46 to control the overall operation of the video conference apparatus 1.

This is, the system controller 46 detects the operation of the remote commander 6 through an interface (IF) 47, thereby driving a line interface (line IF) circuit 48 in response to the selective operation of the user and connecting a line with a desired communication object.

That is, the line interface 48 is connected with a connector located at the back of the processor 3, thereby enabling desired data to be sent/received to/from a communication object.

Furthermore, the system controller 46 executes a predetermined protocol in this state of being connected with a communication object, and upon setting up the format of data to be transmitted, issues a control command to the encoder/decoder 11, image data processing section 14, audio processing section 18, etc., and starts communication.

At tis time, the system controller 46 makes a multiplexer 49 start, thereby multiplexing the picture data D1 and D2 and the audio data DA, which are output from the encoder/decoder 11, image data processing section 14, and audio processing section 18, using the multiplexer 49 according to the H.221 format to generate multiplexed data DMU, and to send this multiplexed data DMU to a communication object through the line interface 48.

Furthermore, the multiplexer 49 inputs, on the contrary, the multiplexed data DMU, which is transmitted from a communication object, through the line interface 48 and outputs this to each circuit block by separating it into the picture data D1 and D2 and the audio data DA.

Furthermore, when the user designates switching of the operation mode during communication with a communication object or when the user switches the operation mode on the communication object side by monitoring the multiplexed data DMU coming from the communication object, the system controller 46 switches the operations of the encoder/decoder 11, image data processing section 14, and audio processing section 18 in response to this switching, thereby transmitting natural pictures, etc., in place of motion pictures, and mutually sending/receiving line drawing data, etc., as required.

Therefore, the system controller 46 controls overall operation and fetches the two-dimensional coordinate data, which is input by operating the tablet 17, at a predetermined cycle, thereby expressing the line drawing of straight lines, etc., with a series of this coordinate data, outputting this line drawing data DW to the image data processing section 14, and displaying it on the monitor 4 as well as outputting it to the multiplexer 49.

In this way, the video conference apparatus 1 allocates this line drawing data DW to a part of the multiplexed data DMU so as to mutually send/receive the data.

Furthermore, in the embodiment, the main processing section 12 is connected with external RS232C interface equipment through an external bus interface (external bus IF) 50, and thereby controlling the overall operation through this external equipment. Thus, the video conference apparatus 1 is connected with a separate controller as required to control overall operation.

(1-2) Bus Controller

Figure 7:
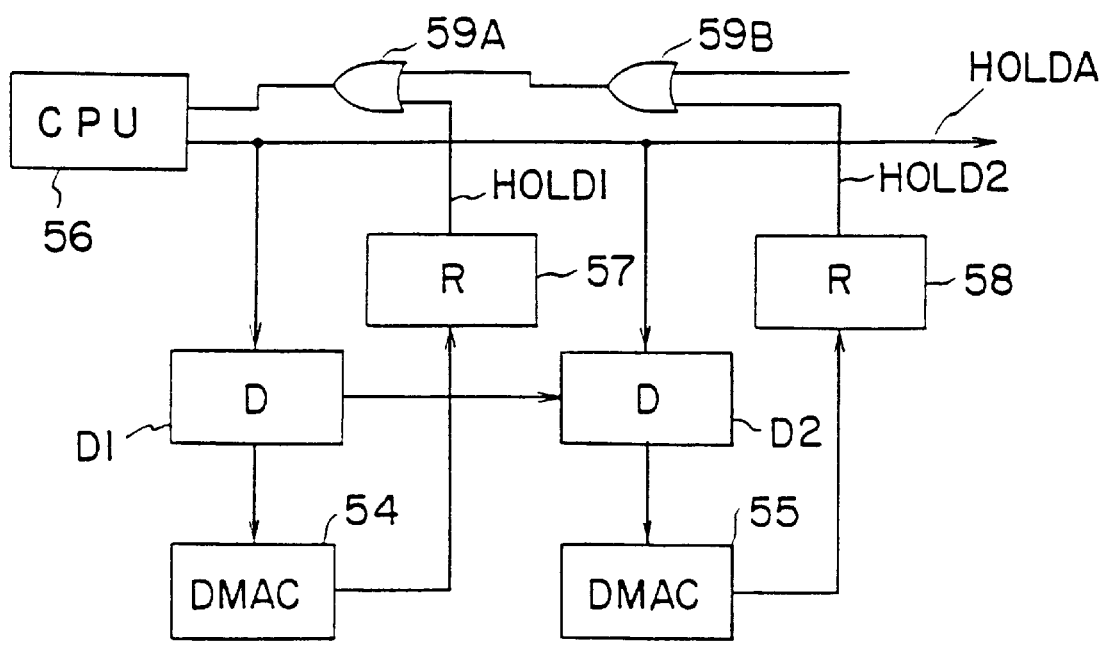
FIG. 7 is a block diagram for the explanation of the processing of the central processing unit.

As shown in FIG. 7, a method to connect direct memory access controllers (DMAC) 54 and 55 with the processors consisting of the still image processor 36 and binary picture processor 37, etc., and connect these direct memory access controllers 54 and 55 with a central processing unit (CPU) 56 consisting of a system controller can be considered as a method to control overall operation using one system controller 46, for example. (Japanese Patent Application Publication No. 67653/1987)

That is, the central processing unit 56 is connected with a bus common to the direct memory access controllers 54 and 55. The direct memory access controllers 54 and 55 issue requests for bus use HOLD1 and HOLD2 to the central processing unit 56 in order to ask permission for bus occupancy.

The direct memory access controllers 54 and 55 stores once these requests for bus use HOLD1 and HOLD2 in register circuits (R) 57 and 58 output them through OR circuits 59A and 59B. The OR circuits 59A and 59B put these requests for bus use HOLD1 and HOLD2 together in one request for bus use and output to the central processing unit 56.

The central processing unit 56 outputs a bus use authorizing signal HOLDA to the direct memory access controllers 54 and 55 through predetermined delay circuits (that is, consisting of a daisy chain circuit (D)) when the occupancy of the bus is authorized in response to these requests for bus use HOLD1 and HOLD2.

Even if this technique is used, the circuit blocks of the system controller 46, still picture processor 36, etc., however, occupy the bus BUS alternately through time sharing, thus delaying overall processing time for that portion.

More specifically, the system controller 46 cannot access the bus BUS while natural pictures are being processed with the still picture processor 36, for example. In cases where the coordinate data, which is input from the tablet 17, is processed with the system controller 46, for example, it will take time for the processing of coordinate data for that portion.

A method of assigning a dedicated central processing unit to the local bus LBUS separately can be considered as a method of solving this problem, but, in this case, the number of chips for the central processing unit becomes two chips, resulting in the complication of the overall configuration and making the size of that portion greater.

Figure 8:
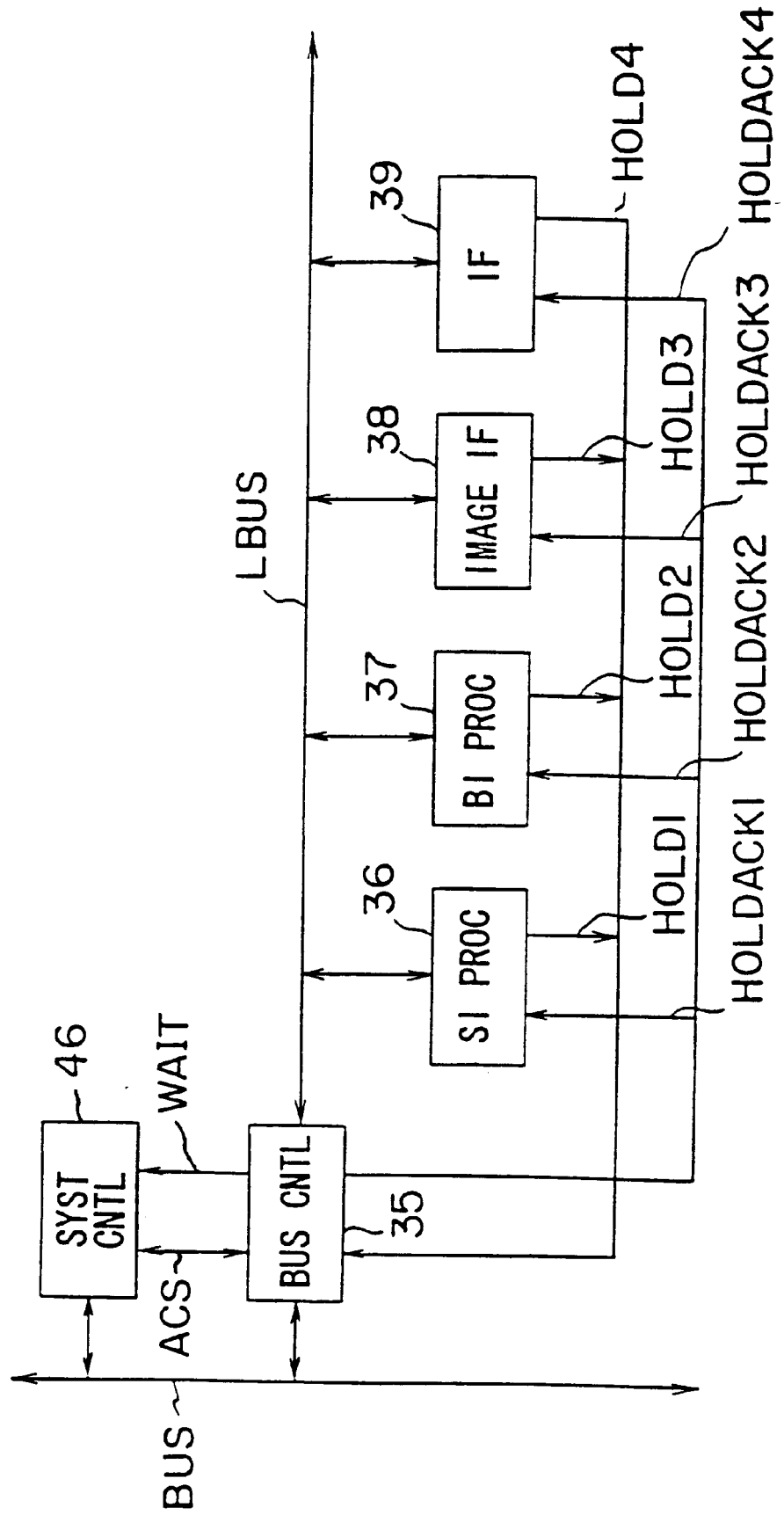
FIG. 8 is a block diagram for the explanation of bus switching.

Therefore, in this embodiment, as shown in FIG. 8, overall operation can be controlled with one central processing unit (that is, consisting of the system controller 46) by switching the occupancy of the local bus LBUS between the system controller 46 and the still picture processor 36, binary picture processor 37, etc.

That is, the still picture processor 36, binary picture processor 37, image interface 38, and interface 39 each have a direct memory access controller, thereby enabling access to the arithmetic memory 40 directly through the local bus LBUS.

In this way, when the still picture processor 36, binary picture processor 37, image interface 38, and interface 39 each start with the input of a control command from the system controller 46, they access the arithmetic memory 40 independently so that the data processing in response to the control command can be executed.

The bus controller 35 holds the local bus LBUS and the bus BUS in a connection state so that any one of the system controller 46 and the still picture processor 36, binary picture processor 37, image interface 38, and interface 39 can use this local bus LBUS when the local bus LBUS is not being used by any one of the still picture processor 36, binary picture processor 37, image interface 38, or interface 39.

When an access request ACS to access any one of the still picture processor 36, binary picture processor 37, image interface 38, or interface 39 is input from the system controller 46, the bus controller 35 outputs hold act signals HOLDACK1 to HOLDACK4, thereby setting circuit blocks other than the still picture processor 36, binary picture processor 37, image interface 38, or interface 39 responding to the access request in a standby mode.

When a circuit block designated with an access request ACS starts up in response to a following control command and occupancy requests HOLD1 to HOLD4 for the local bus LBUS are output from this circuit block, the bus controller 35 separates the connection between the bus BUS and the local bus LBUS, thereby allowing the started circuit block to occupy the local bus LBUS.

In this way, when the system controller 46 issues a command to the still picture processor 36 and starts the processing of natural pictures or issues a command to the binary picture processor 37 and starts the processing of document pictures, and furthermore, when the image IF 38 and interface 39 start input/output of picture data, the connection between the bus BUS and the local bus LBUS is separated, thereby executing various processes in parallel to these processings.

Therefore, the video conference apparatus 1 can simplify overall system configuration, make system compact, and furthermore, prevent delay of processing speed from happening by controlling overall operation with one central processing unit.

In addition, the system controller 46 can execute various processes without having any restrictions on the operation of the still picture processor 36, etc. Therefore, for that portion, the assignment of the memory map of the system controller 46 can be selected freely and the degree of design freedom can be improved.

In this kind of processing, the processing status of each circuit block has to be monitored with the system controller 46 as required.

However, it becomes difficult to monitor the processing status if the occupancy of the local bus LBUS is authorized to the started circuit block until a processing series has been completed.

In cases where natural pictures are processed, some 500 [kbytes] of data has to be transferred. If the occupancy of the local bus LBUS is authorized until a processing series has been completed, the system controller 46 cannot access the still picture processor 36, etc., for that period of time.

Figures 9A, 9B, 9C, 9D:
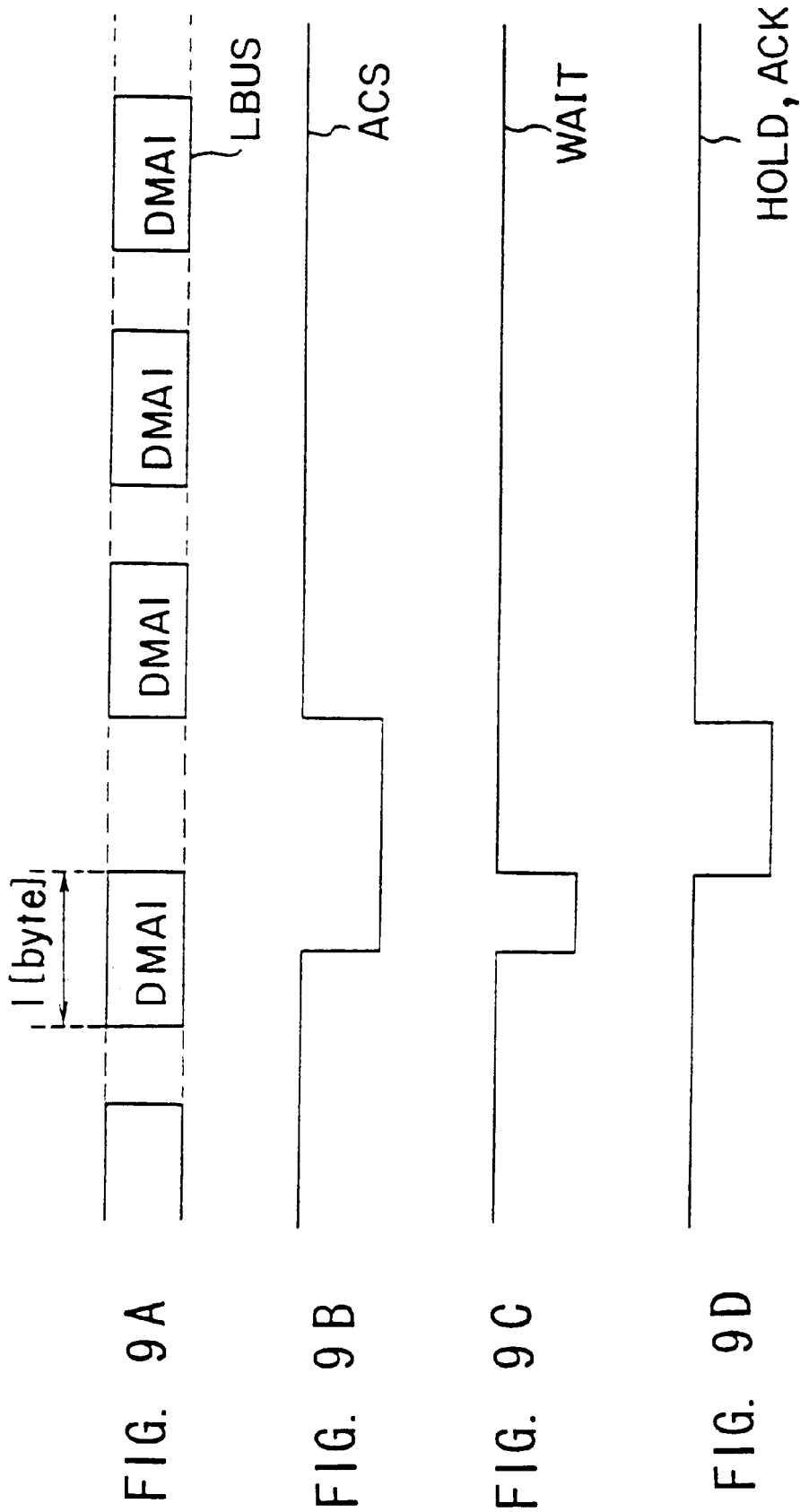
FIGS. 9A to 9D are diagrams of signal waveforms for the explanation of the operation.

Therefore, as shown in FIGS. 9A to 9D, each circuit block 36 to 39 occupies the local bus LBUS (FIG. 9A) and processes data in units of 1 [byte], while the bus controller 35 sends a wait signal WAIT to the system controller 46 (FIG. 9C) and holds the system controller 46 in standby mode, when an access request ACS is input from the system controller 46 (FIG. 9B).

In this state, data processing has been completed in units of 1 [byte] in each circuit block 36 to 39, each circuit block 36 to 39 makes the hold signals HOLD1 to HOLD4 fall and the bus controller 35 makes the wait signal WAIT rise to authorize the access of the system controller 46 when these hold signals HOLD1 to HOLD4 fall.

At the same time, the bus controller 35 makes a hold act signal HOLDACK rise to set the operating circuit block in standby mode (FIG. 9D) and connects the bus BUS with the local bus LBUS.

In this way, the system controller 46 can, for example, determine how far the data processing has been completed by accessing the still picture processor 36 and whether or not it is operated normally. When the access is complete, an access request ACS is given rise to.

In this way, the bus controller 35 makes the hold act signal HOLDACK fall to cancel the standby state of the operating circuit block and this circuit block restarts the following process.

(1-3) Control of telewriting

In this embodiment, the system controller 46 switches the overall operation mode to drawing mode when the user operates the mouse connected to the remote commander 6, matches the drawing menu to the cursor on the display screen, and clicks the mouse.

In cases the document pictures or natural pictures identical to the communication object are displayed on the monitor 4, when the setting is switched to this drawing mode, the system controller 46 switches to telewriting operation mode and then the line data, which is input mutually with the communication object is displayed on these document pictures or natural pictures. In this way, communication can be made with the communication object by drawing line drawings on the document pictures or natural pictures.

That is, the system controller 46 sends/receives document pictures or natural pictures to/from a communication object in response to the operation selected by the user. In cases where common document pictures or natural pictures are stored in the arithmetic memory 40, the picture data, which is stored in the arithmetic memory 40 in advance, is output to the picture FIFO 42, thereby displaying document pictures or natural pictures on the monitor 4.

This display of document pictures or natural pictures is executed when the system controller 46 issues a control command to the controller 41 in response to a control command sent from a video conference apparatus of a communication object in response to the user operation of the communication object or in response to the operation of the remote commander 6.

Furthermore, it is so arranged that the system controller 46 enables the menu for enlargement, condensation, scroll, and rotation to be selected when the document pictures or natural pictures are displayed and then the menu screen is displayed at the same time by issuing a control command to the menu plane 32.

In this way, the system controller 46 switches the address data by issuing a control command to the controller 41 to access the arithmetic memory 40 and stores the enlarged, condensed, scrolled, or rotated document pictures corresponding to the menu, in which the picture data of this arithmetic memory 40 is transferred to the picture FIFO 42 again and selected when the menu for enlargement, condensation, scroll, and rotation is selected on the communication object side or this video conference apparatus 1 side.

In this way, the video conference apparatus 1 improves operability by switching the display of the document picture as required.

On the contrary, in drawing mode, the system controller 46 fetches the coordinate data, which is input through the tablet 17, at a predetermined cycle (a cycle of 20 samplings in one second, for example), thereby inputting line drawing of straight lines, etc., which are drawn on the tablet 17 by the user, as a series of point coordinate.

Furthermore, the system controller 46 converts this fetched coordinate data into line drawing data DW by adding a predetermined controlled code, and outputs this line drawing data DW to the multiplexer 49.

In this way, the system controller 46 transmits this line drawing data DW to a communication object.

Furthermore, the system controller 46 inputs picture data to the drawing plane 44 according to this line drawing data DW, thereby displaying the line drawing picture, which is input by the user, on the monitor 4.

In this way, the video conference apparatus 1 can display line drawing on these document pictures and natural pictures when document pictures or natural pictures are displayed in advance.

Furthermore, the system controller 46 inputs the line drawing data DW coming from a communication object through the multiplexer 49 and forms line drawing pictures according to the line drawing data DW coming from this communication object similar to the line drawing data DW, which is input through the tablet 17, thereby mutually inputting and displaying identical document pictures and natural pictures so that telewriting can be made possible.

At this time, telewriting can be made possible by switching the display of the document picture as required because the display of the document picture can be enlarged, condensed, rotated, and scrolled. By this, the video conference apparatus 1 can further improve operability compared to conventional ones.

Meanwhile, when it is so arranged that document pictures can be enlarged, rotated, etc., in the telewriting mode, a case in which the display of the document picture is switched on the communication object side can be considered when the user on the video conference apparatus 1 side is inputting a line drawing.

Figure 10:
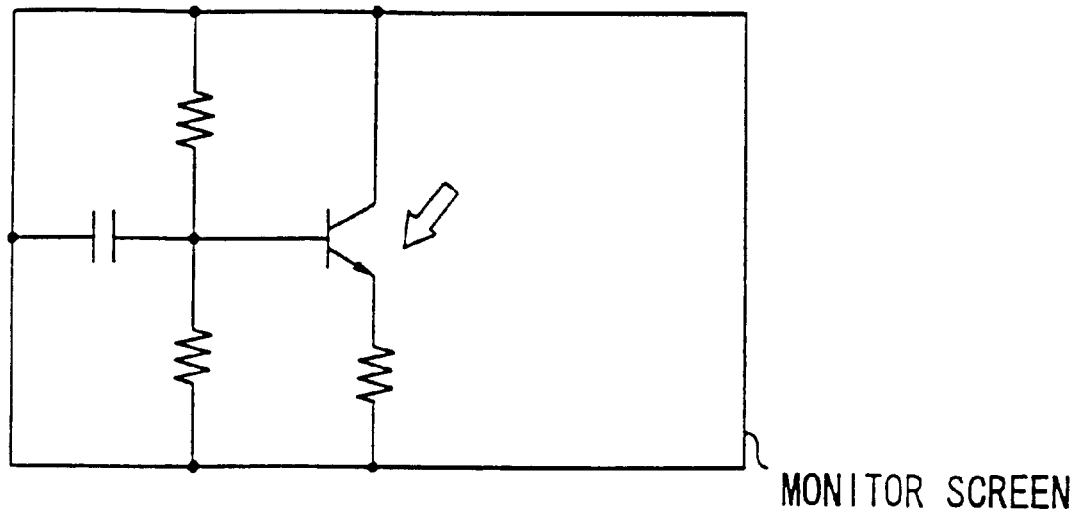
FIG. 10 is a schematic diagram for the explanation of the operation of telewriting.
Figure 11:
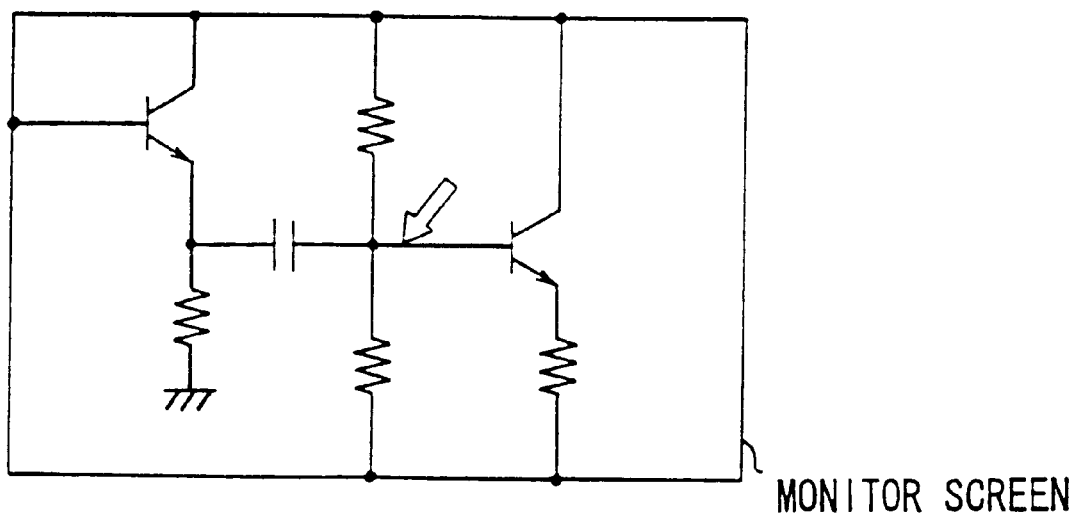
FIG. 11 is a schematic diagram illustrating a non-conformance state between the document picture and the line drawing.

In cases where a document picture consisting of a circuit diagram, such as shown in FIG. 10, is displayed, for example, when the document picture is scrolled on the communication object side, even if an arrow is input to designate the transistor on the document picture on this video conference apparatus 1 side, the line drawing data expressing this arrow may arrive after the line picture data expressing this arrow scrolls the document picture in some cases, as shown in FIG. 11. In this case, the arrow designates an output end of a capacitor not the transistor on the communication object side.

Furthermore, in this case, the same condition occurs on the video conference apparatus 1 side also, and moreover, a similar condition occurs not only when the display is scrolled, but also when the enlargement, condensation, or rotation of the document picture is carried out.

That is, if it is so arranged that document pictures can be enlarged, condensed, rotated, etc., in the telewriting mode, a case in which the document picture may not match the line drawing, etc., which is input by the user, may occur.

In such a situation, the user who is unfamiliar with operation cannot use this video conference apparatus 1 freely.

Figure 12A:
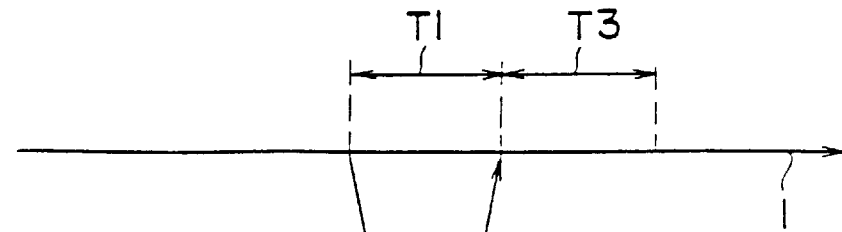
FIGS. 12A and 12B are schematic diagrams illustrating a protocol to eliminate non-conformance between the document picture and the line drawing.
Figure 12B:
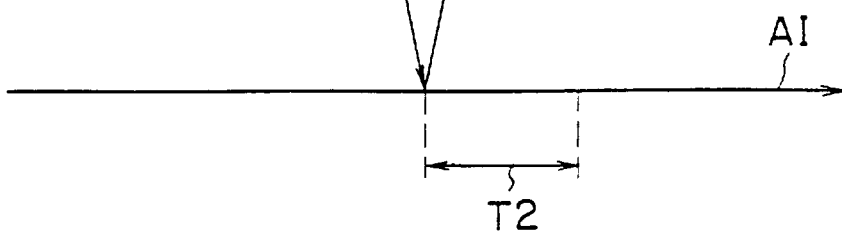

Therefore, in this embodiment, as shown in FIGS. 12A and 12B, when the user designates switching of the display of a document picture, the system controller 46 sends a document control request command REQA consisting of a request of switching the document picture to a communication object without immediately switching the display of document picture (FIG. 12A) and waits for a response command ACK responding to this document control request command REQA to be input from the communication object AI (FIG. 12B).

Furthermore, since the line drawing data DW, etc., (hereafter, referred to as "telewriting information"), which is input from a communication object AI, consists of the telewriting information, which is input on the original document screen on the communication object AI side for a period of time in which a response command ACK is input from the document control request command REQA, the system controller 46 judges that the telewriting information coming from the communication object AI for this period of time T1 is effective and updates the picture data of the drawing plane according to this telewriting information, thereby displaying the line drawing data sent from the communication object AI on the document picture, the display of which is not yet switched.

In this way, when the display of the document picture is switched, the video conference apparatus 1 displays the original document picture until acknowledgement is obtained from the communication object AI and displays the telewriting information, which is input from the communication object AI on the original document picture for this period of time, thereby effectively avoiding inequality between the document picture and the line drawing, etc., which is input by the user.

Furthermore, the system controller 46 suspends inputting of coordinate data for this period of time T1 and stops inputting of telewriting information from the tablet 17. When a respond command ACK is transmitted from the communication object AI side, the display of the document picture is switched in the following period of time T3 so as to respond to a document control request command REQA.

In this way, the system controller 46 restarts the input of telewriting information and sends it to the communication object AI after the display of the document picture is switched in response to the user operation.

In this way, in the video conference apparatus 1, inequality of the document picture and the line drawing, which is input by the user, can be avoided effectively even if the display of the document picture is switched.

Furthermore, in the period of time T3 in which the display of the document picture is switched, the system controller 46 temporarily stores the telewriting information, which is transmitted from the communication object AI side, in the buffer memory. When the switching of display is complete, the picture data of the drawing plane 44 is updated according to the temporarily held telewriting information. By this, the line drawing data, which is transmitted from the communication object AI, is displayed on the switched document picture.

That is, the telewriting information, which is input from the communication object following the input of a response command ACK, can be judged as the telewriting information input on the document picture in which the display is switched. In this way, the system controller 46 can superimpose the picture of this line drawing on the document picture in which the display is switched and effectively avoid inequality of the document picture and the line drawing, which is input by the user.

On the other hand, when a document control request command REQ is input from a communication object (in this case, in FIGS. 12A and 12B, the video conference apparatus 1 is on the communication object AI side), the system controller 46 issues a response command ACK, and then, suspends input of coordinate data and stops input of telewriting information. The video conference apparatus 1 then switches the display of the document picture so as to respond to a document control request command REQA, and after that, restarts input of telewriting information and sends it to a communication object.

That is, if the display is switched in this way, a case in which the display of the document picture is switched suddenly in the middle of user input of line drawing can be considered. This may cause the erroneous input of line drawing with a user who is unfamiliar with the operation.

For this reason, in the embodiment, the system controller 46 suspends input of line drawing data DW for a predetermined period of time T2 after the display of the document picture is switched. In this way, even in the case of erroneous user operation, wasteful input of data DW, which is improperly operated, can be prevented from happening.

The system controller 46 stores and holds the telewriting information, which is transmitted from a communication object, in the buffer memory temporarily for a period of time T2 from the input of a document control request command REQA to the completion of switching the display of the document picture. The system controller 46 updates the picture data of the drawing plane 44 according to the telewriting information, which is held temporarily, and displays the line data transmitted from the communication object AI.

That is, the telewriting information, which is input after a document control request command REQA is input, is judged to be the telewriting information input on the document picture in which the display is switched. Thus, after a document control request command REQA is input, the system controller 46 displays the telewriting information on this display picture after the display is switched, thereby effectively avoiding inequality of the document picture and the line drawing input by the user.

In this way, even a user who is unfamiliar to the operation can freely transport and use a video conference apparatus.

Furthermore, telewriting can be performed without interrupting communication with a communication object by temporarily storing the telewriting information in the buffer memory at the time of switching the document picture even if it takes time to switch the display thus enabling improvement in operability for that portion.

Figure 13:
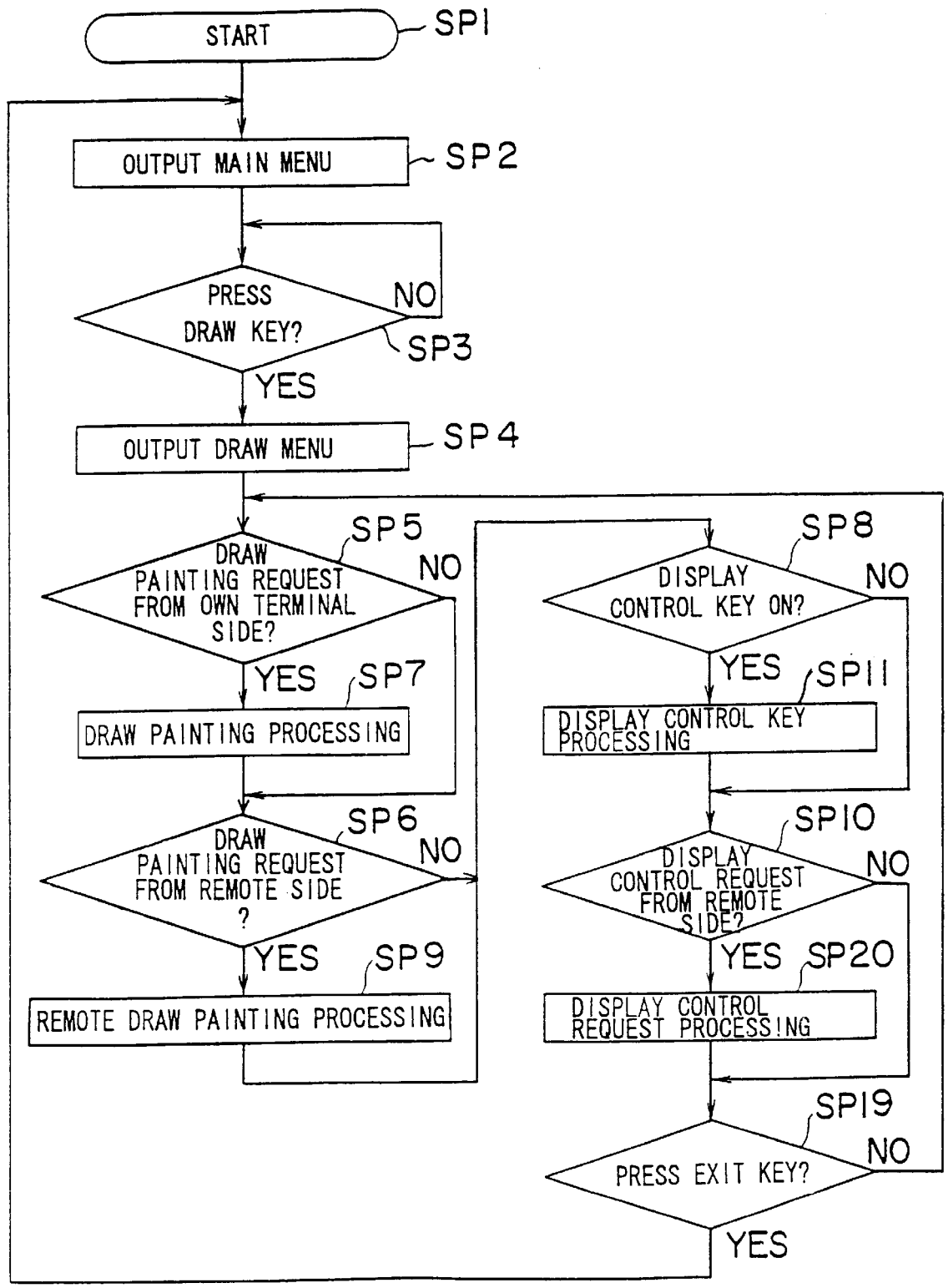
FIG. 13 is a flowchart illustrating procedures thereto.

In this way, in cases where telewriting is carried out with a communication object, the system controller 46 controls overall operation by executing the procedure shown in FIG. 13.

That is, the system controller 46 shifts from step SP1 to step SP2 when the power is turned on and displays the main menu, which is the initial screen.

This main menu is to display a list of communication objects, which is registered in advance for the selection of communication objects. When the user selects a communication object and clicks the mouse, the system controller 46 drives the line interface 48, and connects the line L with a communication object, and then, displays a menu for the selection of an operation mode. When the user or a communication object designates an operation mode in this state, the system controller 46 switches from the overall operation mode to the designated operation mode.

In this way, when the user or a communication object selects the transmission display of the document picture or the natural picture, the system controller 46 fetches the document picture or the natural picture into the arithmetic memory 40, and then, transmits the picture data of this document picture or natural picture to a communication object. In addition, in place of this, the system controller 46 stores the picture data of the document picture or the natural picture, which is transmitted from a communication object, in the arithmetic memory 40.

Furthermore, the system controller 46 outputs a control command to the controller 41 and displays this document picture or natural picture on the monitor 4, and then, shifts to step SP3 and judges whether or not the user has selected the drawing (expressed with DRAW in FIG. 13) operation mode.

When a negative result is obtained here, the system controller 46 repeats step SP3. When the user selects an operation mode of transmission of motion picture, etc., at this time, the mode is switched to the operation mode corresponding to overall operation.

When the user selects the drawing menu, the system controller 46 proceeds to step SP4 because a positive result has been obtained in step SP3. The system controller 46 then switches the menu screen on the monitor 4 to the drawing menu screen, and after that, proceeds to step SP5.

The system controller 46 judges whether or not the user has selected a menu for input of straight line, input of curve, erase of line drawing, etc., and whether a drawing request has been input from the remote commander 6 in response to this. If a negative result is obtained here, the system controller 46 proceeds directly to step SP6, but if a positive result is obtained here, the system controller 46 proceeds to step SP7.

In this step SP7, the system controller 46 adds a control code to the coordinate data, which is input one after another in response to the menu selected by the user, generates telewriting information DW, sends this telewriting information DW to a communication object, and updates the picture data of the drawing plane according to this telewriting information DW.

In this way, the system controller 46 executes the drawing processing. When a document control request command REQA is input from a communication object during this process, the system controller 46 executes the protocol mentioned above with respect to FIGS. 12A and 12B, thereby effectively avoiding inequality of the document picture and the line drawing input by the user.

When the user stops inputting line drawing, control goes to step SP6 and the user of the communication object here selects a menu for input of a straight line, input of a curve, erasure of a line drawing, etc. The system controller 46 judges by this whether or not the drawing request has been input from the communication object.

When a negative result is obtained here, the system controller 46 proceeds directly to step SP8, but when a positive result is obtained here, the system controller 46 proceeds to step SP9.

In this step SP9, the system controller 46 updates the picture data of the drawing plane according to the telewriting information DW, which is input in succession from the communication object, thereby executing the remotely controlled drawing process, which is controlled by the communication object. The system controller 46 then proceeds to step SP8.

Next, the system controller 46 judges whether or not the display control key consisting of a menu for enlargement, condensation, scroll, rotation, etc., has been selected. When a negative result is obtained here, the system controller 46 proceeds directly to step SP10. When a positive result is obtained here, the system controller 46 proceeds to step SP11.

Figure 14:
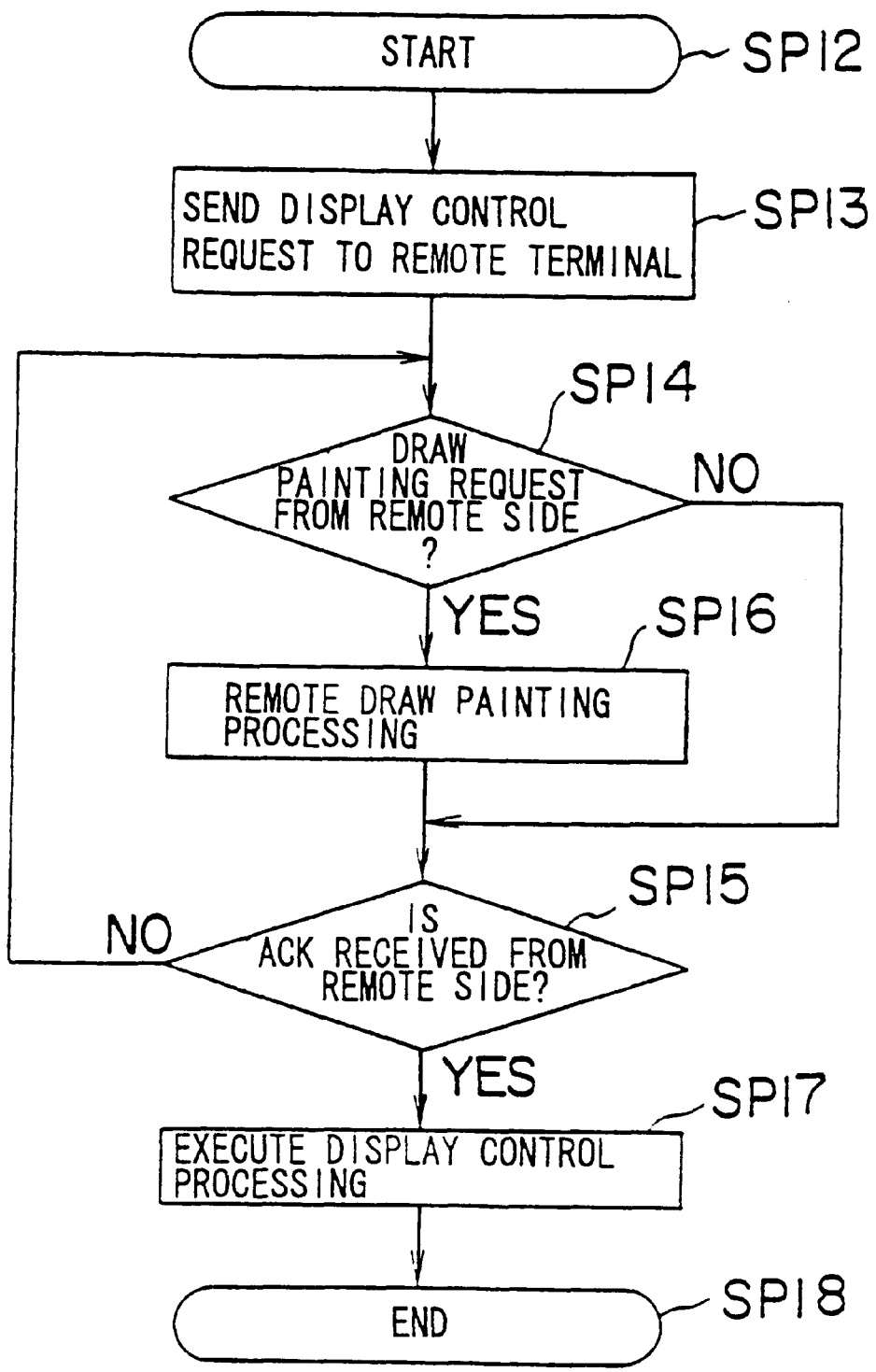
FIG. 14 is a flowchart for the explanation of the processing of the display control key.

In this step SP11, the system controller 46 executes the display control key shown in FIG. 14, thereby executing the protocol mentioned above with respect to FIGS. 12A and 12B.

That is, the system controller 46 proceeds from step SP12 to step SP13, and sends a document control request command REQA to a communication object there. Then, the system controller 46 proceeds to step SP14 and judges whether or not a drawing request has been input from the communication object.

When a negative result is obtained here, the system controller 46 proceeds directly to step SP15. When a positive result is obtained here, the system controller 46 proceeds to step SP16 and executes the drawing process of the remote control.

That is, the system controller 46 judges the telewriting information coming from the communication object to be valid and updates the picture data of the drawing plane 44 according to this telewriting information, thereby displaying the line drawing data, which is transmitted from the communication object AI, on the document picture in which the display is not yet switched.

In this way, the system controller 46 proceeds to step SP15 after the telewriting information coming from the communication object has been processed for a period of time T1, and there judges whether or not a response command ACK has been input from the communication object.

When a negative result is obtained here, the system controller 46 returns to step SP14. When a positive result is obtained here, the system controller 46 proceeds to step SP17, switches the display of the document picture in response to the operation of the display control key, and then completes this procedure in the following step SP18.

When the process of this display control key is complete, the system controller 46 proceeds to step SP10 and judges whether or not a document control request command REQA has been input from the communication object. When a negative result is obtained here, the system controller 46 proceeds to step SP19. When a positive result is obtained here, the system controller 46 proceeds to step SP20.

Figure 15:
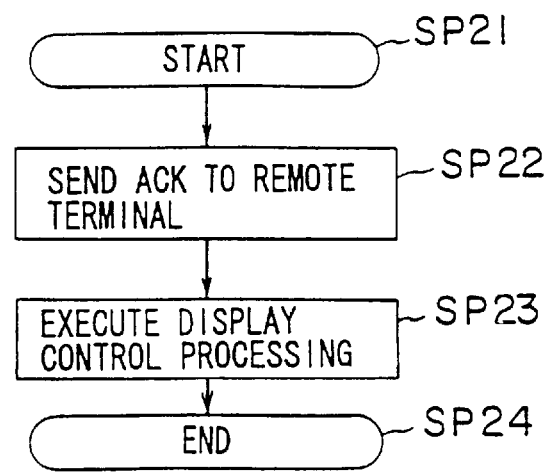
FIG. 15 is a flowchart for the explanation of the processing of the display control request.

In this step SP20, the system controller 46 executes the display control request process shown in FIG. 15, thereby executing the protocol mentioned above with respect to FIGS. 12A and 12B.

That is, the system controller 46 proceeds from step SP21 to step SP22 and sends a response command ACK to a communication object there. After the display of the document picture is switched in response to a document control request command REQA in the following step SP23, the system controller 46 proceeds to step SP24 and completes this procedure.

In this way, the system controller 46 judges whether or not the EXIT menu for designating the end of this drawing mode has been selected in the following step SP19. When a negative result is obtained here, the system controller 46 proceeds to step SP7. When a positive result is obtained here, the system controller 46 returns to step SP2.

(1-4) Processing of picture data (1-4-1) Arithmetic memory

In this embodiment, the picture data processing section 14 uses the arithmetic memory 40 for both the natural picture and document picture, thereby simplifying the overall configuration.

Figure 16:
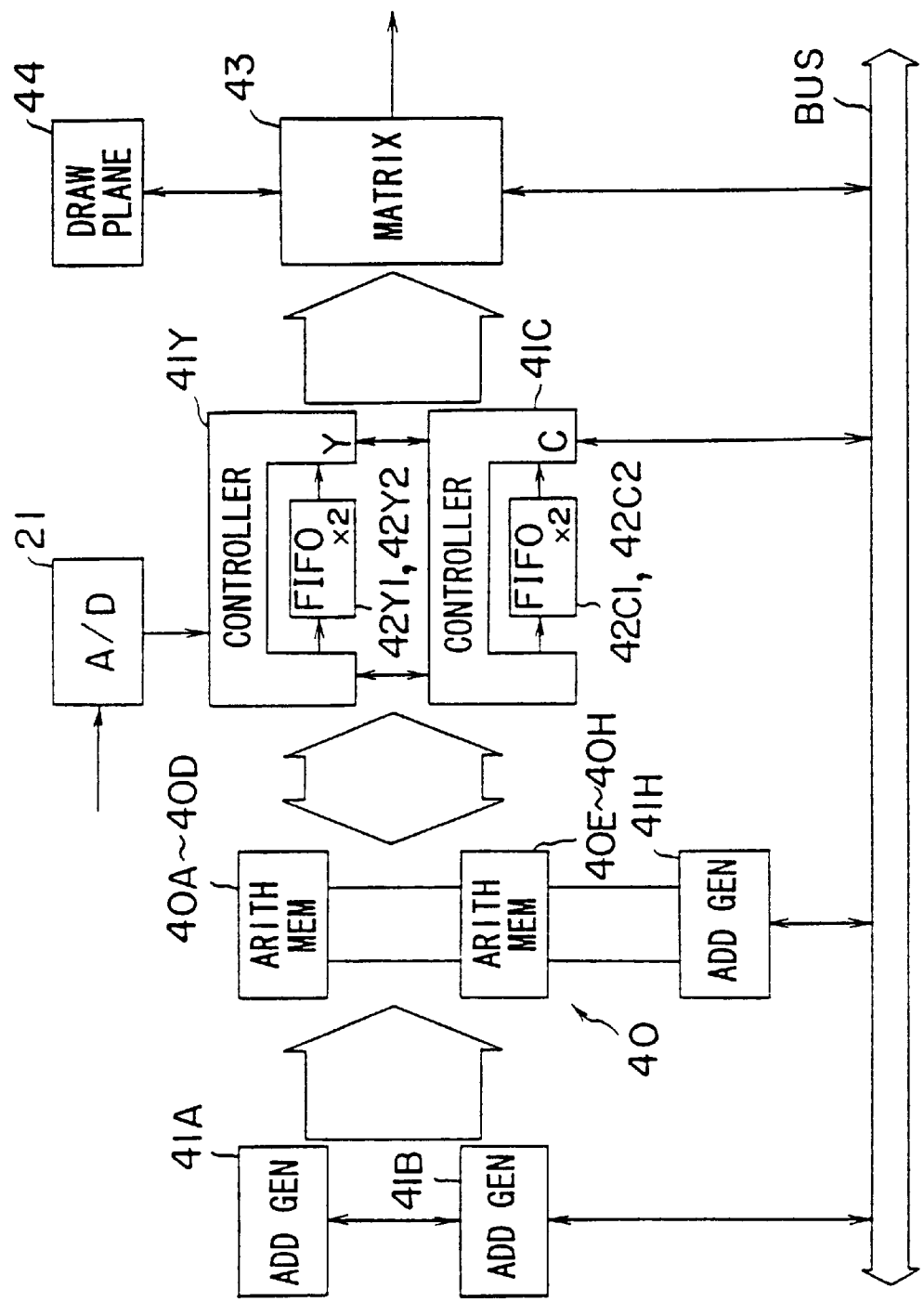
FIG. 16 is a block diagram illustrating a peripheral circuit of the arithmetic memory.

That is, as shown in FIG. 16, the arithmetic memory 40 is formed with eight 8-bit 128 [kbytes] memories 40A to 40H. The natural picture and document picture can be stored by switching the address data using the address generators 41A and 41B forming the memory controller 41.

Figure 17:
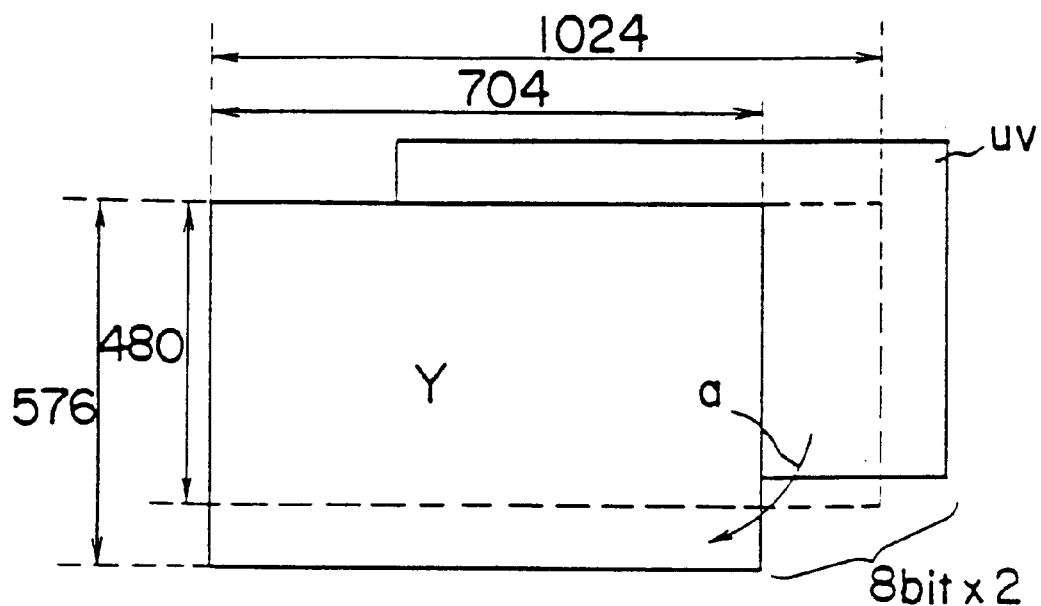
FIG. 17 is a schematic diagram for the explanation of the assignment of the memory space in the case of a natural picture.

That is, as shown in FIG. 17, in cases where the NTSC-system brightness signal is stored, the arithmetic memory 40 needs an area for storing the picture data of seven hundred and four pixels in the horizontal direction and four hundred and eighty pixels in the vertical direction.

On the other hand, in cases where the PAL-system brightness signal is stored, the arithmetic memory 40 needs an area for storing the picture data of seven hundred and four pixels in horizontal direction and five hundred and seventy six pixels in vertical direction.

On the other hand, for the color difference signal, degradation of resolution is not recognized visually compared to the brightness signal. Therefore, an area for storing the picture data of one half the number of pixels, which are required for the brightness signal with respect to the U and V components, respectively, becomes necessary.

That is, in cases where the NTSC-system and PAL-system natural pictures are stored, the arithmetic memory 40 requires a memory capacity of 8 bits×704×576×2 for the brightness signal and the color difference signals U and V.

On the other hand, in this embodiment, since document pictures up to A-4 size are fetched with a resolution of 8 [lines/mm], a memory capacity of 2376 dots (in the horizontal direction)×1728 dots (in the vertical direction) becomes necessary.

Therefore, in this embodiment, when the natural pictures are stored, the arithmetic memory 40 assigns a memory space of 1024×480 so as to respond to the horizontal direction and vertical direction of the natural picture, forms a memory space 16 bits deep, and fetches the picture data of the brightness signal and color difference signal.

Furthermore, it is so arranged that both PAL-system and NTSC-system picture data can be stored by assigning surplus memory space in the horizontal direction to the memory space in the vertical direction which is short on memory such as shown by the arrow a.

Figure 18:
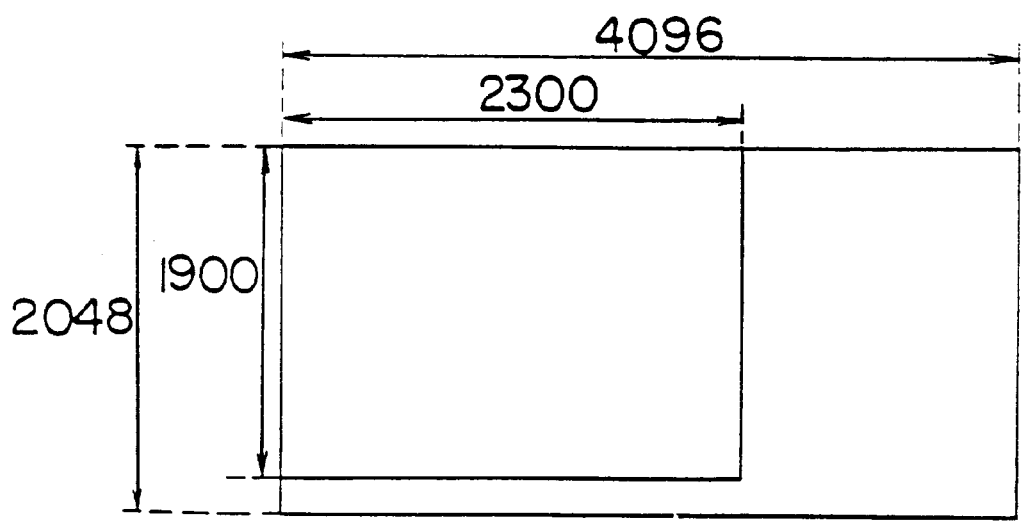
FIG. 18 is a schematic diagram for the assignment of the memory space in the case of the document picture.

On the other hand, as shown in FIG. 18, in cases where the document picture is stored, the arithmetic memory 40 forms a memory space so as to lay out eight memories with a depth of 1 bit in plane, thereby storing binary picture data of up to 4096×2048 pixels.

In this way, the video conference apparatus 1 stores natural pictures and document pictures by switching the address data of the arithmetic memory 40 so that both the natural picture and document picture can use the arithmetic memory 40.

For this, the address generators 41A and 41B sequentially generate the address data corresponding to the odd fields and even fields of the display picture, respectively. At this time, the picture data corresponding to the memory space, which is preset in advance, is stored by switching the address data for the natural picture and document picture.

That is, in the natural picture, for the brightness signal Y, the address generators 41A and 41B generate the address data of memories 40A to 40H so that the first and second memories 40A and 40B store the picture data consecutively by turns in the odd field and generate the address data of memories 40A to 40H so that the fifth and sixth memories 40E and 40F store the picture data consecutively by turns in the even field, as shown in FIG. 19.

On the other hand, for the color difference signal, the address generators 41A and 41B generate the address of memories 40A to 40H so as to store the picture data of U and V components in the third and fourth memories 40C and 40D, respectively, in the odd field with respect to the picture data, which is sequentially input in the order of a raster scan, and generate the address data of memories 40A to 40H so as to store the picture data of U and V components in the seventh and eighth memories 40G and 40H in the even field.

In this way, it is so arranged that the address generators 41A and 41B can simply generate address data when a display picture is formed by transferring picture data to the picture FIFO 42, or when the picture data is transferred to the still picture processor 36 and compressed there, or moreover when the picture data is fetched through the picture FIFO 42 or the still picture processor 36.

On the other hand, in the case of document pictures, as shown in FIG. 20, the address generators 41A and 41B generate address data so as to sequentially and circulatively assign the first to eighth memories 40A to 40H to each line for the document pictures.

In this way, the address generators 41A and 41B can simply generate address data when the picture data is input/output to/from the binary picture processor 37, or when the picture data is transferred to the picture FIFO 42 to form a display picture, or moreover when the picture data is fetched through the image scanner 15.

Furthermore, the address generators 41A and 41B have two-system address generators each corresponding to the vertical direction and horizontal direction of the display picture and generate address data by complementarily switching these address generators, thereby enabling a display picture rotated 90° to be simply formed when the picture data is transferred to the picture FIFO 42 and the display picture is formed.

On the other hand, the picture FIFO 42 is formed of FIFO 42Y1 and 42Y2 for the odd field and even field of the brightness signal and FIFO 42C1 and 42C2 for the odd field and even field of the color difference signal. It is so arranged that, when a natural picture is displayed, the picture data corresponding to these four FIFO 42Y1 to FIFO 42C2 is transferred from the arithmetic memory 40 and stored, and moreover, the picture data is transferred from the analog-to-digital converter 21 and stored, and this stored picture data is output to the matrix 43 through the controller 41Y and 41C to form a display picture.

In cases where the document picture is displayed, the picture FIFO 42 converts the corresponding binary picture data into 8-bit picture data by the controller 41Y and stores in FIFO 42Y1 to 42Y2 for the brightness signal.

Furthermore, in cases where the document picture is displayed, the picture FIFO 42 delays the picture data for 1 line portion and stores it in FIFO 42C1 and 42C2 for the remaining color difference signal, thereby sequentially outputting the picture data, which is stored in FIFO 42C1 and 42C2 for the color difference signal, with a timing delayed 1 line portion more than the corresponding picture data stored in FIFO 42Y1 and 42Y2 for the brightness signal, and simultaneously outputting the consecutive 3-line picture data from the picture FIFO 42.

In this way, it is so arranged that the picture data processing section 14 can reduce flickering of the display picture by outputting data after add processing has been carried out on this 3-line picture data by the flicker reduction circuit (built in the controller 41).

Therefore, the controllers 42Y and 42C forming a part of the controller 41 can control the operations of FIFO 42Y1 and 42Y2, and FIFO 42C1 and 42C2 for the brightness signal and color difference signal, respectively.

Furthermore, it is so arranged that the controllers 42Y and 42C feed back the output data of FIFO 42Y1 and 42Y2, as well as FIFO 42C1 and 42C2, to the input side and operates with the output data of the arithmetic memory 40 using the built-in data processing circuit and stores it again, thereby converting the natural picture, which is transmitted in the PAL-system or NTSC-system, to the NTSC-system or PAL-system so as to form a display picture.

Furthermore, the controllers 42Y and 42C execute feedback processing and add processing for the document picture, thereby maintaining the scale factor in length and width of the display picture at a constant value whichever system monitor 4, PAL-system or NTSC-system, is connected.

That is, there are cases where this kind of video conference apparatus 1 uses a PAL-system monitor on the communication object side and an NTSC-system monitor 4 on this side for telewriting.

In this case, the video conference apparatus 1 has to hold the scale factor in length and width of the display picture identical to that of the communication object and to form an identical display picture.

For this reason, in this embodiment, in cases where the communication object forms a display picture with a PAL-system monitor, the video conference apparatus 1 switches the display of the display picture so that a display picture identical to that of the communication object is formed on a connected NTSC-system monitor 4, thereby maintaining the aspect ratio of the display picture identical to that of the communication object.

Similarly, in cases where the communication object forms a display picture on an NTSC-system monitor and when a PAL-system monitor 4 is connected, the video conference apparatus 1 maintains the aspect ratio of the display picture at a constant value so that a display picture which is identical to that of the communication object is formed.

In this way, the video conference apparatus 1 switches the operation mode of the image converter 29 by executing the NTSC-system and PAL-system picture conversion processing using the FIFO 42 allowing the PAL-system, and/or NTSC-system monitor 4, and the imaging section 5 to be easily and freely connected, thus improving operability for the portion.

With the above construction, by changing the memory space of the arithmetic memory in the document picture and the still picture, the arithmetic memory can be shared in the document picture and the still picture so that the whole construction can be simplified.

(1-4-2) Processing of document picture

Figure 21:
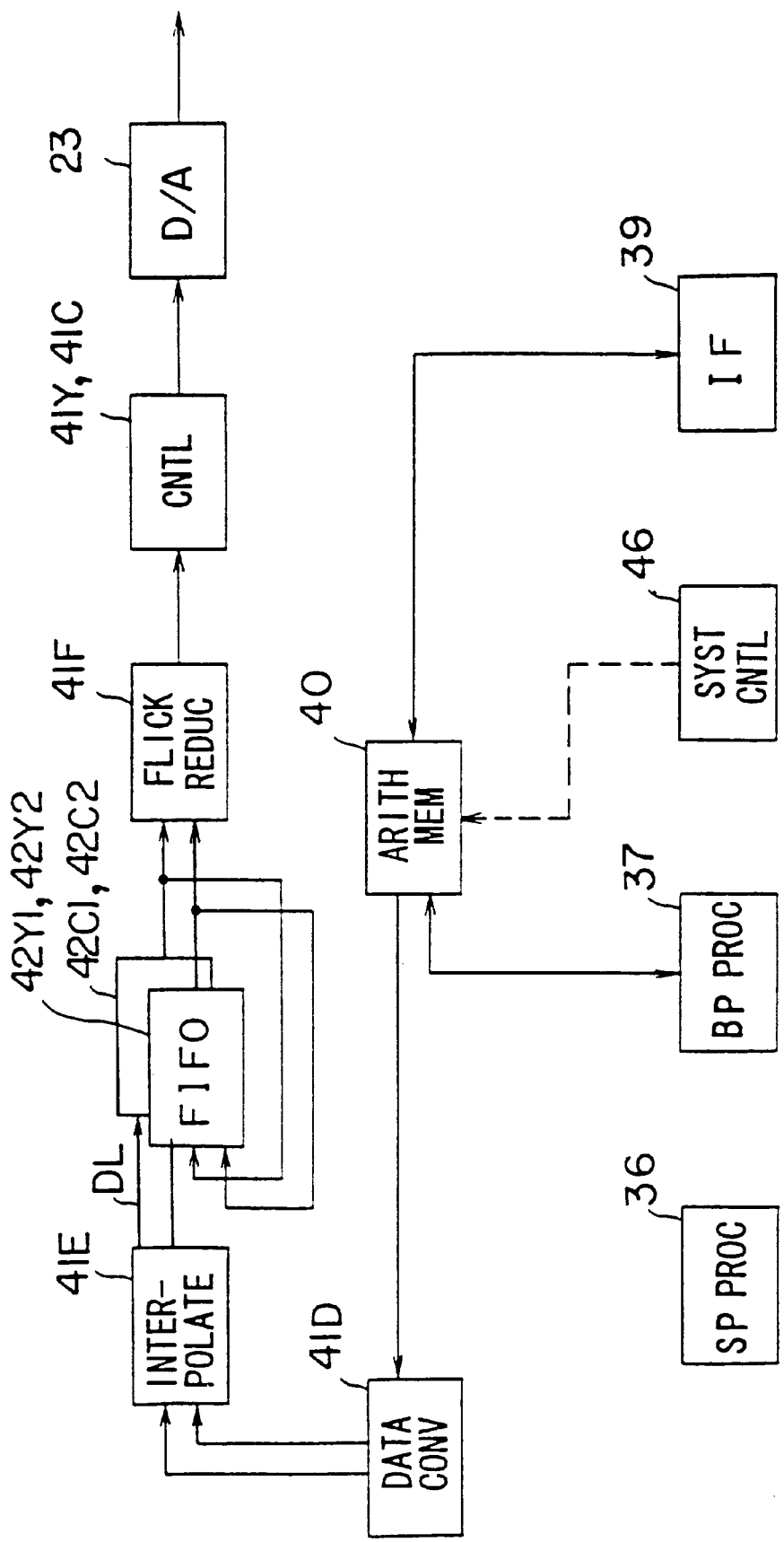
FIG. 21 is a block diagram for the explanation of the processing of the document picture.

As shown in FIG. 21, the arithmetic memory 40 sequentially inputs and stores the picture data, which is sequentially input line by line from the image scanner 15 through the interface 39, and then, outputs the picture data stored in a predetermined order to the binary picture processor 37, thereby compressing the data of the document picture and sending it to a communication object.

Furthermore, the picture data of the document picture, which is transmitted from a communication object, is decompressed by the binary picture processor 37, stored sequentially, and output to the interface 39 at a predetermined timing, thereby outputting this document picture to the printer 16.

In cases where this document picture is displayed, the arithmetic memory 40 sequentially outputs the picture data to the FIFO 42 according to the address data, which is generated by the address generators 41A and 41B.

At this time, the address generators 41A and 41B display the document picture at a predetermined scale factor by switching the address data to be generated, and also display the document picture by rotating or scrolling it.

At this time, since the number of pixels of the monitor 4 is smaller than that of the document picture, the arithmetic memory 40 reduces the number of pixels using the data converter 41D and stores the picture data in the FIFO 42. At this time, the binary data is converted into multi-data using the data converter 41D so that a display picture without incongruity can be formed.

That is, in cases where a display picture is formed by reducing the number of pixels, a method of supplementing insufficient resolution by thinning out the picture data can be considered, but in this case where a diagonal straight line, etc., is displayed with notched lines there is a shortcoming in the display picture being displayed unnaturally.

For this, in this embodiment, the straight line, etc., are displayed smoothly by compensating the resolution, in which the number of pixels is reduced and degraded, by gradation, thereby enabling natural display pictures to be displayed.

That is, in cases where the document picture is displayed, the address generators 41A and 41B sequentially generate address data in response to the display mode of scale factors, etc., selected by the user, thereby transferring the picture data to the FIFO 42 in real-time.

At this time, the data converter 41D converts 16 binary picture data into one multi-picture data so as to assign 16 pixels of the document picture to 1 pixel of the display screen, thereby displaying an A4-size document picture on the whole display screen. In this way, a display picture with a scale factor of "1" is formed.

Figure 22:
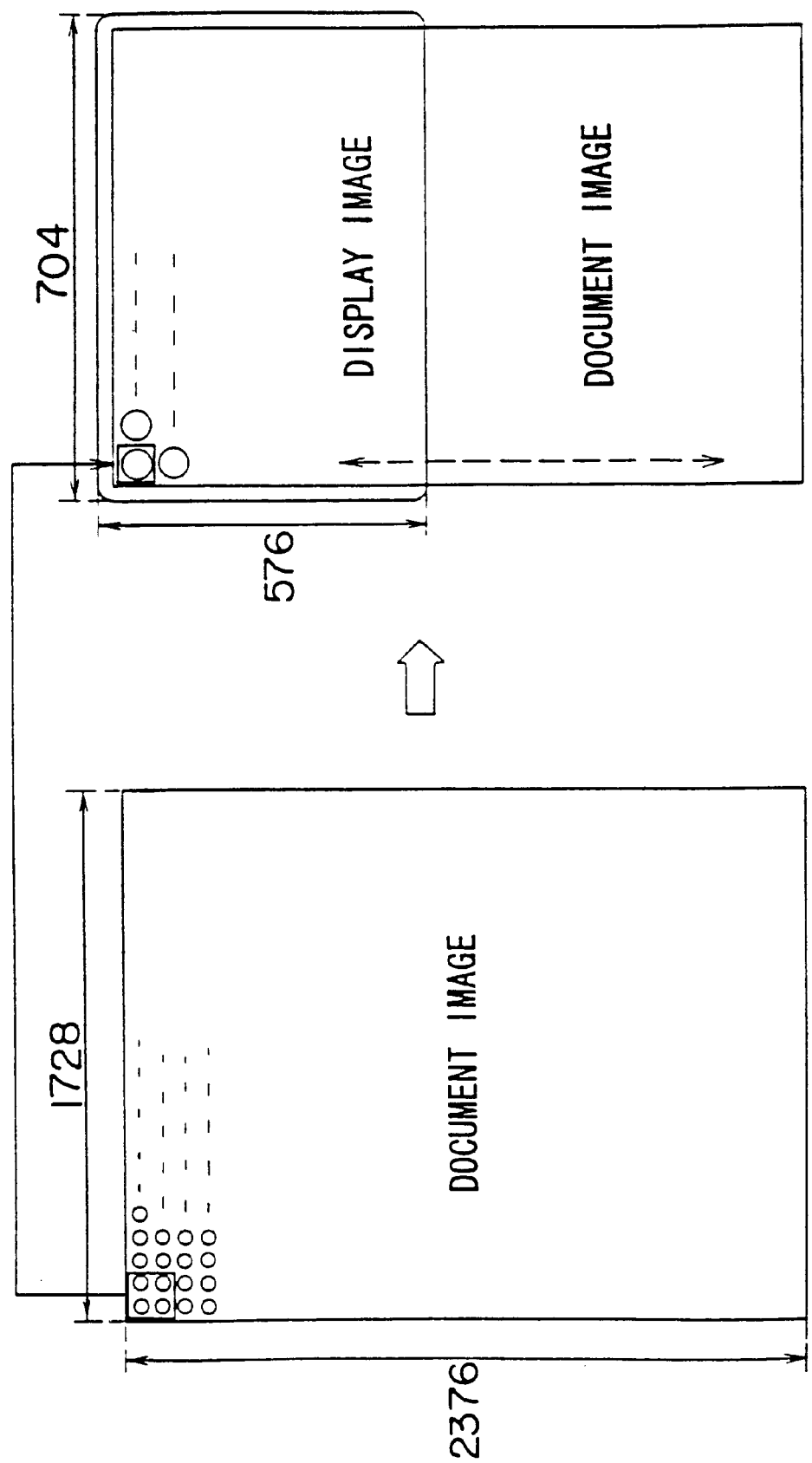
FIG. 22 is a schematic diagram for the explanation of the display of the document picture.

As shown in FIG. 22, when the user selects a display mode with a scale factor of "2", the data converter 41D converts four binary picture data into one multi-picture data so as to assign four pixels of the document picture to one pixel of the display picture, thereby displaying a part of the document picture on the monitor 4, and forms a display picture with a scale factor of "2".

Furthermore, when the user selects a display mode with a scale factor of "4", the data converter 41D converts the input of one unit of binary picture data into one unit of multi-picture data so that one pixel of the document picture corresponds to one pixel of the display picture, thereby displaying part of the document picture on the display screen and forming a display picture with a scale factor of "4".

At this time, as shown in FIGS. 23A to 23E, when a display picture is formed with the scale factor of "2", for example, corresponding to FIG. 22, the data converter 41D adds the binary picture data of four pixels to be converted into one pixel of the display screen and detects how many white pixels exist in these four pixels.

Figure 23:
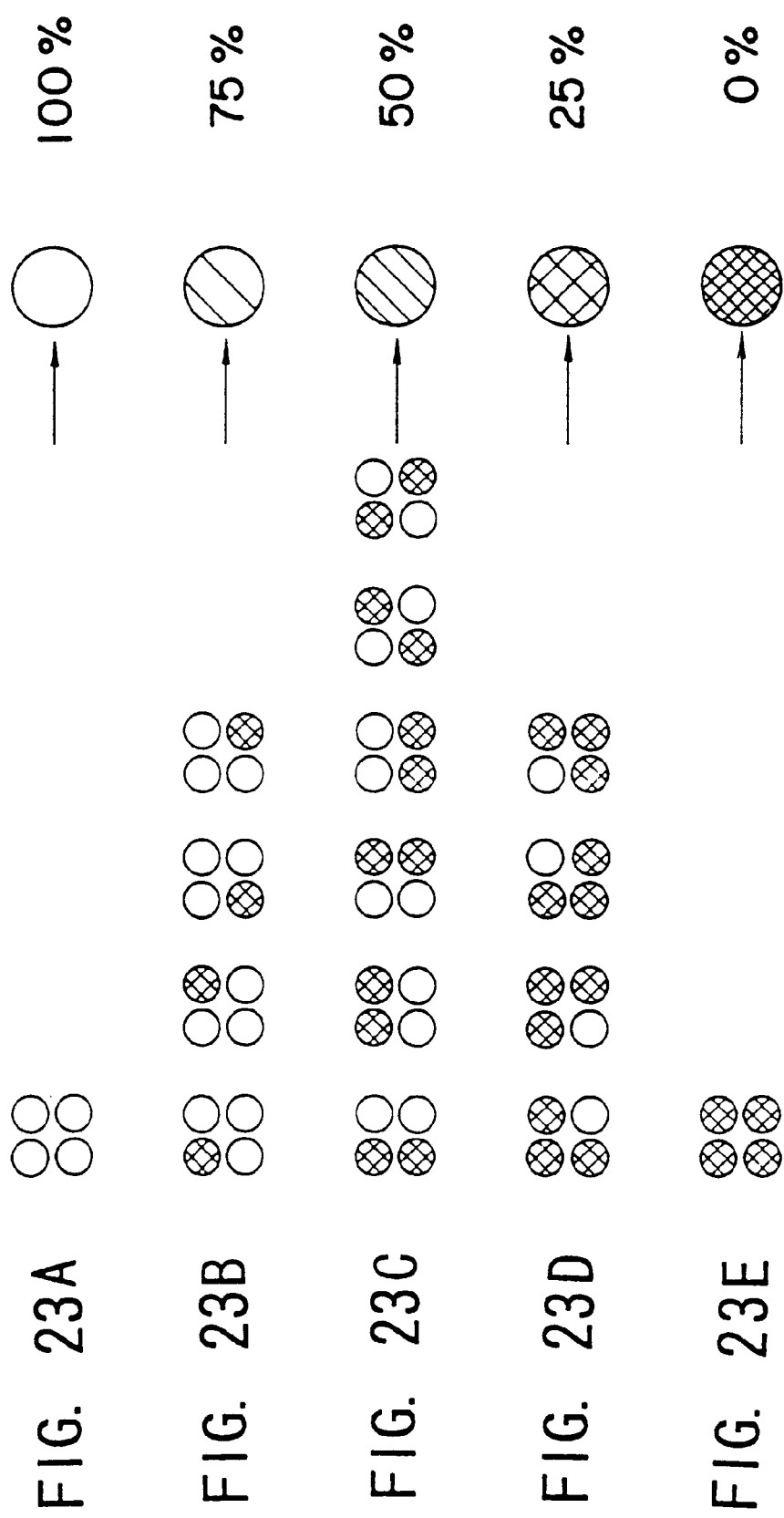
FIGS. 23A to 23E are schematic diagrams for the explanation of the conversion of the binary data into multi-value data.

Furthermore, the data converter 41D normalizes this addition result, thereby setting the brightness level of the corresponding multi-picture data at the white level (that is, consisting of a 100 [%] brightness level) when all four pixels are at the white level (FIG. 23A).

In cases where three out of four pixels are at the white level (FIG. 23B), the data converter 41D sets the brightness level of the corresponding multi-picture data at a 75 [%] brightness level so that the number of white-level pixels corresponds to the number of whole pixels. In cases where two out of four pixels are at the white level (FIG. 23C), the data converter 41D sets, similarly, the brightness level of the corresponding multi-picture data at a 50 [%] brightness level.

Furthermore, in cases where one out of four pixels is at the white level (FIG. 23D), or moreover, in cases where all four pixels are at the black level, the data converter 41D sets the brightness level of the corresponding multi-picture data at a 25 [%] and 0 [%] brightness level, respectively, thereby converting the binary picture data into multi-picture data and outputting it.

Furthermore, in the case of a display mode with the scale factor of "1", the data converter 41D adds and normalizes 16 picture data and converts 16 binary picture data into 16-gradation multi-picture data by converting these 16 binary picture data into one multi-picture data.

Furthermore, in cases where a display picture is formed with a scale factor of "4", the data converter 41D sets the corresponding multi-picture data at a 100 [%] or 0 [%]

brightness level when this binary picture data is at the white level or the black level, respectively, by converting one unit of binary picture data into one unit of multi-picture data.

In this way, when the document picture is displayed, the picture data processing section 14 adds the picture data corresponding to one pixel of the display screen, and normalizes it so that smooth, successive display pictures can be formed. In this way, it is so arranged that natural display pictures can be displayed by compensating for insufficient resolution of the monitor through gradation.

As shown in FIG. 20 above, in this embodiment, since the picture data of the document picture is sequentially and circulatively assigned line-by-line to the eight memories 40A to 40H, the address generators 41A and 41B can simultaneously read the succeeding 8-line picture data by selecting these eight memories 40A to 40H and outputting the common address data.

Furthermore, in the case of the document picture, since the picture data is formed of binary data, the picture data for eight pixels can be read at one time from the 8-bit memories 40A to 40H.

Figure 24:
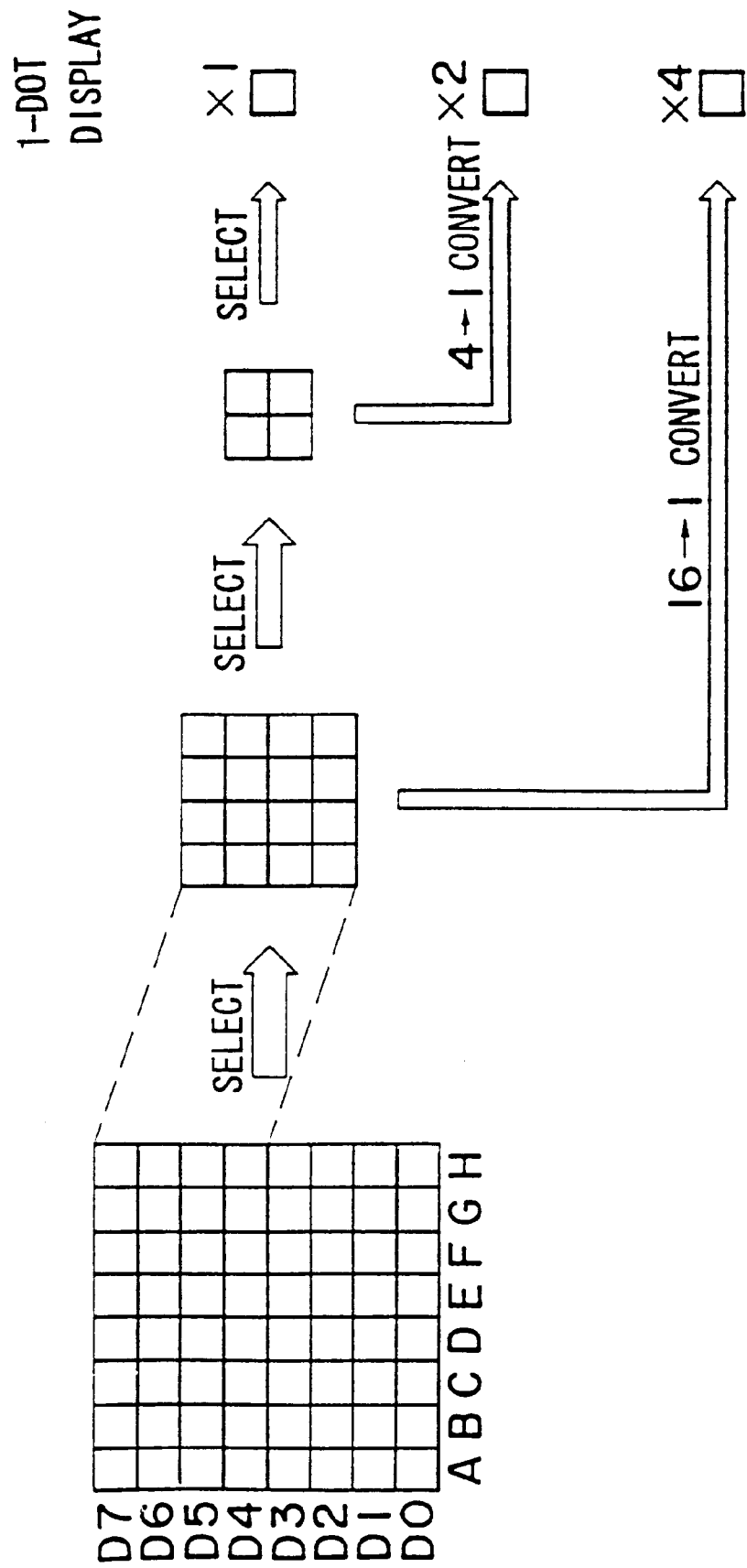
FIG. 24 is a schematic diagram for the explanation of the enlarged display of the document picture.

In this way, as shown in FIG. 24, the arithmetic memory 40 can simultaneously output the picture data of 64 pixels, which is a part of area of the square form of the document picture. In addition, in FIG. 24, the pixels corresponding to the memories 40A to 40H are expressed with symbols A to H, respectively, and the pixels corresponding to the output of each bit are expressed with D0 to D7.

In this way, the address generators 41A and 41B output the picture data for 64 pixels in batch to the data converter 41D, and the data converter 41D converts this picture data for 64 pixels formed with 16 pixels×4 blocks into the multi-picture data of 4 pixels×4 blocks and the multi-picture data of 1 pixel×4 blocks and outputs them.

That is, when the user selects a display mode with a scale factor of "4", the data converter 41D assigns the binary picture data with a block of 16 pixels to the multi-picture data for 16 pixels. When the user selects a display mode with a scale factor of "2", the data converter 41D divides one block of 16 pixels into areas of 4 pixels×4 blocks and assigns the binary picture data with each block of 4 pixels to every one pixel of the display screen.

Furthermore, when the user selects a display mode with a scale factor of "1", the data converter 41D assigns one block of 16 pixels to every one pixel of the display screen.

In this way, the address generators 41A and 41B can switch the area of the document area to be assigned to the display screen by merely switching the address data generation start value, and moreover, the display screen can be scrolled by sequentially switching this start value. In addition, the document picture can be displayed at a desired scale factor merely by sequentially updating the address data in response to the processing speed of the data converter 41D.

The data converter 41D can form a display picture with a desired scale factor by merely selectively inputting the picture data, which is input sequentially, and converting it into multi-picture data.

In this way, in the picture data processing section 14, these address generators 41A and 41B and a data converter 41D can be easily formed by a logical circuit, thereby allowing the processing of the binary picture data in real-time by converting it into multi-picture data. In addition, in the video conference apparatus 1, a desired document picture can be displayed with a simple configuration for that portion as a whole.

In addition, in cases where the picture data of the document picture is input/output between the binary picture processor 37 and the interface 39, the address generators 41A and 41B selectively and circulatively generate the address data by sequentially selecting the first and eighth memories 40A to 40H, thereby sequentially inputting/outputting the picture data line by line through the easy generation of the address data.

(1-4-3) Image Conversion

As mentioned above, in this kind of video conference apparatus 1, the document picture is displayed with the PAL-system display screen in some cases. In this embodiment, to display a display picture identical to that of a communication object on the monitor 4, interpolation processing is executed by the data interpolator 41E.

That is, the effective screens in the PAL system and NTSC system are formed with five hundred and seventy six and four hundred and eighty vertical lines, respectively, thereby the six line display picture in the PAL system is displayed as the five lines of the NTSC system.

Therefore, when a document picture identical to that of a communication object is monitored and when the communication object and the video conference apparatus 1 are monitoring this document on a PAL-system monitor and a NTSC-system monitor, respectively, the display screen with an aspect ratio identical to that of the communication object can be formed by converting picture data for six lines output from the arithmetic memory 40 into picture data for five lines and storing it in the FIFO 42 by applying the interpolation processing technique.

On the contrary, when the communication object and the video conference apparatus 1 are monitoring the same document picture on a NTSC-system monitor and a PAL-system monitor, respectively, the display screen with an aspect ratio identical to that of the communication object can be formed by converting the picture data for five lines output from the arithmetic memory 40 into the picture data for six lines, and storing it in the FIFO 42.

Even in cases like this where the system of the communication object is different from that of the monitor, if the display picture can be formed at mutually identical aspect ratio, communication can be made smoothly without paying attention to the display position of the picture data to be transmitted separately when telewriting is carried out on the displayed document picture.

That is, when binary picture data is converted into multi-picture data by applying the above technique, the data converter 41D simultaneously converts the picture data of two adjoining lines into multi-picture data and outputs it.

Figure 25:
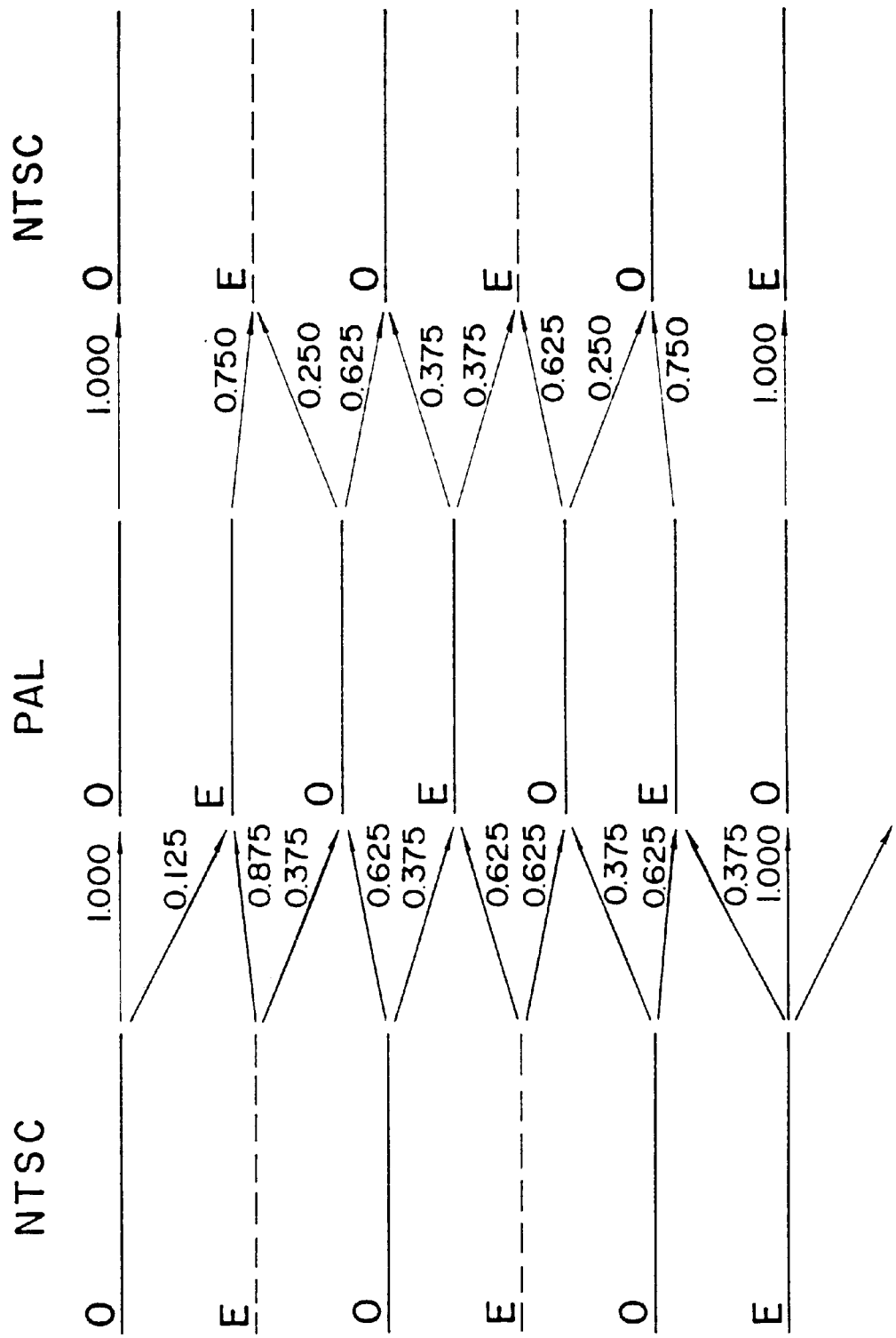
FIG. 25 is a schematic diagram for the explanation of the PAL-NTSC system image conversion.

FIG. 25 shows the change of the picture data from the NTSC system to the PAL system and from the PAL system to the NTSC system by arrows. In cases where the communication object uses an NTSC-system or a PAL-system monitor and the video conference apparatus 1 is connected with a PAL-system or an NTSC-system monitor, the interpolator 41E performs weighting addition on the picture data of two adjoining lines by switching the weighting coefficient, thereby generating PAL-system or NTSC-system picture data so that a screen identical to that of he communication object can be obtained.

That is, in cases where the communication object uses an NTSC-system monitor and the video conference apparatus 1 is connected with a PAL-system monitor, the interpolator 41E stores the output data of the data converter 41D in the FIFO 42 as it is with respect to the first line of the odd field (expressed with symbol "O") while the interpolator 41E generates picture data by performing weighting addition on the picture data of the first line of the odd field and the first line of the even field at a weighting addition ratio of 0.125:

0.875 with respect to the first line of the following even field (expressed with the symbol "E").

On the contrary, when the communication object uses a PAL-system monitor and the video conference apparatus 1 is connected with an NTSC-system monitor, the interpolator 41E stores the output data of the data converter 41D in the FIFO 42 as it is with respect to the first line of the odd field while the interpolator 41E generates picture data by performing weighting addition on the picture data of the first line of the even field and the second line of the odd field with a weighting addition ratio of 0.750:0.250 with respect to the first line of the following even field (expressed with the symbol "O").

Figure 26:
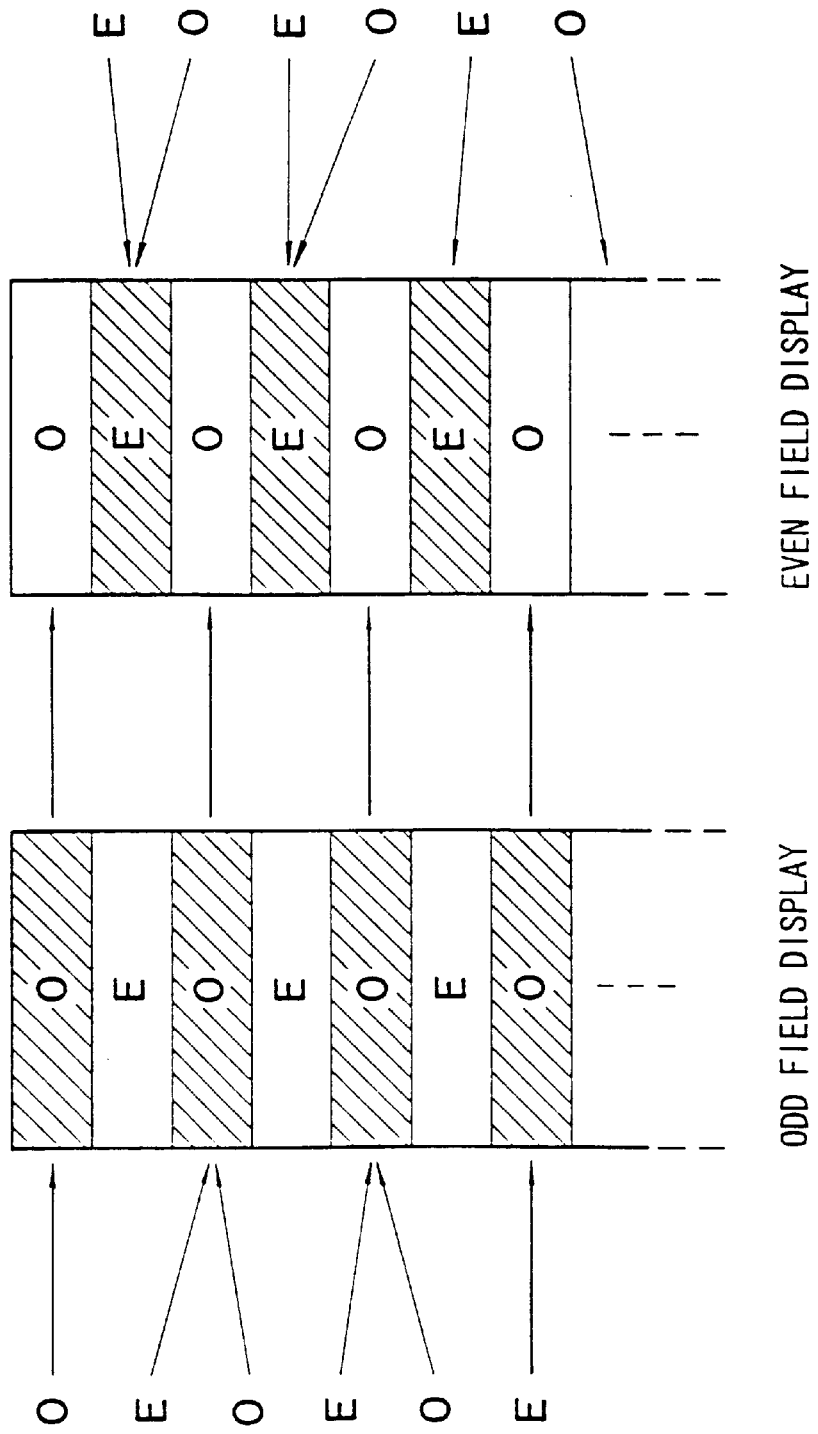
FIGS. 26A and 26B are schematic diagrams for the explanation of the storage of the picture data of the FIFO.

When a picture data is generated by performing weighting addition in this way and stored in the FIFO 42, as shown in FIGS. 26A and 26B, the interpolator 41E generates picture data of the odd field only for a period of the first one field and stores this picture data in the FIFO 42 (FIG. 26A).

On the other hand, the interpolator 41E generates picture data by performing interpolation processing on the picture data of the even field only and stores this picture data in the FIFO 42 (FIG. 26B).

On the other hand, the FIFO 42 sequentially stores the picture data of the odd field output from the interpolator 41E for a period of the first one field and sequentially inputs the picuture data of the even field output from the interpolator 41E for a period of the following one field, as well as feeds back the stored picture data of the odd field to the input side and sequentially stores it again.

In this way, it is so arranged that the picture data processing section 14 converts the number of lines for the picture data and stores the picture data obtained as a result in the FIFO 42 for a period of one field, thereby processing the picture data sequentially output from the arithmetic memory 40E so as to allow the number of lines to be easily converted.

That is, the data converter 41D can generate multi-picture data for two lines at the same time by synchronization with the writing timing for the FIFO 42 by reading 64 units of picture data from the arithmetic memory 40 at one time.

In this way, the interpolator 41E can generate the picture data of an even field and an odd field in units of one field in turns by synchronization with the writing timing for the FIFO 42 through performing interpolation processing by inputting the multi-picture data for these two lines in parallel.

Since the picture data output from the FIFO 42 forms a display picture by outputting the picture data of the odd fields and the even fields by turns with an interlace timing, a display picture can be formed by writing the picture data of each line of the odd fields and the even fields by turns in the FIFO 42 with a wait tie identical to the case where the process of this conversion is not carried out.

For this reason, in cases where such a conversion process is not carried out, the interpolator 41E outputs the picuture data for two lines, which is simultaneously output form the data converter 41D in parallel to the picture FIFO 42 as it is. The picture FIFO 42 simultaneously inputs/outputs this picture data for two lines in parallel and selectively outputs it with the flicker reduction circuit 41F, thereby allowing the image data of the even field and the odd field to be selectively output.

Furthermore, this kind of weighting addition process can be easily formed by constructing a logical circuit. Therefore, an interpolator 41E can be formed in a logical circuit and the output data of the arithmetic memory 40 can be transferred in real-time, thereby allowing the operability of the video conference apparatus 1 as a whole to be improved with a simple configuration.

In addition, when the conversion of this number of lines is complete, the image data processing section 14 interrupts the writing from the arithmetic memory 40, but continues sequential output of the picture data from the FIFO 42. At this time, it is so arranged that the display picture can be continuously displayed by feeding back the output data of the FIFO 42 to the input side and storing it again.

In this way, the video conference apparatus 1 feeds back the picture data of the FIFO 42 and sequentially and circulatively outputs it while continuing display, as well as enables the arithmetic memory 40 to be used for other processing as required, unless the user does not input a designation of display switch, such as scroll, again.

Here, when the output data of the FIFO 42 is fed back to the input side and stored again in this way, of the picture data stored in the FIFO 42, the picture data of the FIFO 42 for only a part of the area of the display picture can be updated with the picture data stored in the arithmetic memory 40.

By using this principle, when the user selects a window display mode, the controllers 41Y and 41C feed back the picture data of the area only, which is input by the user by designating it, store it again in the FIFO 42, and rewrite the remaining area with the picture data of the arithmetic memory 40.

In this way, the picture data processing section 14 diverts a PAL-to-NTSC system conversion means for enlargement, etc., of part of the area of the document picture and displays it as required.

In addition, a plurality of document pictures can be displayed in indexed form such as the multi-picture screen by sequentially fetching the document pictures in the arithmetic memory 40 again and by sequentially updating part of the area of the FIFO 42, thereby further improving the operability with a simple configuration.

Here, in cases where the number of lines is converted between the PAL system and the NTSC system, a method can be considered for generating an image regulated in CIF consisting of an intermediate format similar to that of the image converter 29 and for converting this image into a PAL-system and NTSC-system image. However, in this method, the picture of an intermediate format has to be formed, resulting in the deterioration of picture quality for that portion.

Thus, in this embodiment, in the picture data processing section 14, degradation of picture quality can be effectively avoided by directly converting the number of lines between the PAL system and the NTSC system without forming the picture of such an intermediate format.

With the above construction, the picture data of two line are simultaneously read out from the arithmetic memory and are superimpose-added to generate the picture data of one line, and the picture data is stored in the FIFO 42 in every even-numbered fields and odd-numbered fields. Thus, the image data can be converted between the PAL-system and the NTSC-system with simple construction, and beside, the same display image as the transmission object can be displayed so as to apply to the document picture.

The embodiment discussed above has dealt with the case where the arithmetic memory is shared for the document image and the natural image. However, this invention is not limited to this, but can be widely applied to the case where each independent memory is used.

(1-4-4) Reduction of Flickering

Here, in cases where the document picture is displayed in this way, there are some cases where one line of the odd fields is displayed in black and the lines of the even fields adjacent to this line are displayed in white. In such cases, flickering occurs.

In particular, there is a shortcoming in the PAL system in that this flickering is conspicuous because the frame frequency is lower compared to that of the NTSC system.

Furthermore, the resolution of this kind of document picture is very high. Therefore, there are characteristics in that the brightness level changes suddenly between the adjacent lines and flickering is consipicuous.

Therefore, in this embodiment, the image data processing section 14 is so arranged as to reduce flickering with the flicker reduction circuit 41F.

Figure 27:
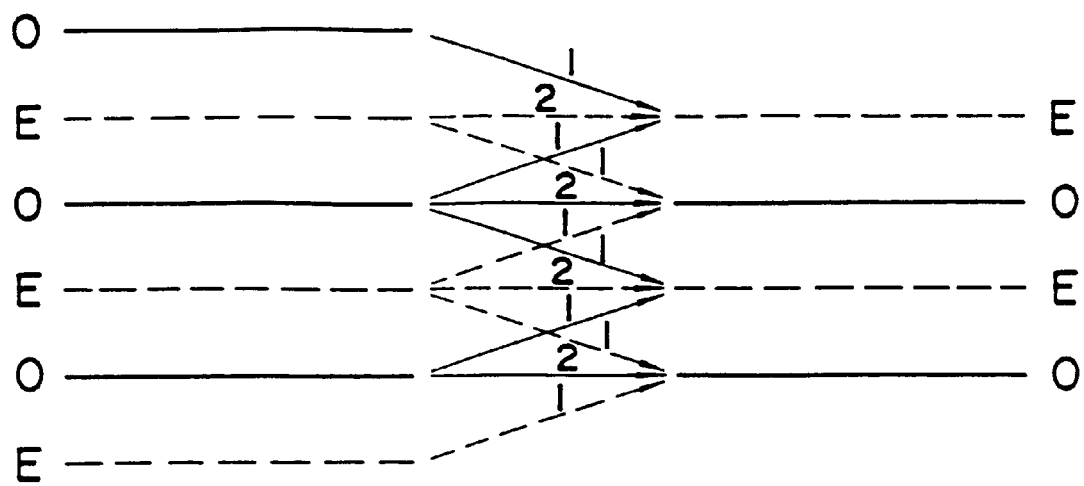
FIG. 27 is a schematic diagram for the explanation of the reduction of flickering.

The principle of this flicker reduction is that, as shown in FIG. 27, the brightness component of two lines vertically adjacent to a central line can be mixed by performing weighting addition on the picture data of consecutive three lines, thereby reducing the sudden change in the brightness level between the even field and the odd field.

For this reason, when the picture data is output to the FIFO 42Y1 and FIFO 42Y2 for the brightness signal, the inpterpolator 41E separately generates a picture data DL, which is delayed by one line, in addition to the picture data of the consecutive two lines and stores this picture data DL in the FIFO 42C1 and FIFO 42C2 for the color difference signals.

In this way, the FIFO 42 simultaneously outputs the picture data, which is stored by delaying this one line portion, and the picture data of consecutive two lines of an odd field and an even field to the flicker reduction circuit 41F, thereby sequentially outputting the picture data of three consecutive lines in the order of raster scan.

The flicker reduction circuit 41F generates picture data for the central line by mixing the brightness component of vertically adjacent two lines in the brightness component of the central line by 25[%] each by performing weighting addition on the picture data of these three lines at a ratio of 1:2:1 and outputs the picture data of this central line.

In this connection, in cases where the conversion process for the number of lines is not executed, the flicker reduction circuit 41F selectively outputs the picture data to be simultaneously output from the FIFO 42 in parallel by generating the picture data for this central line.

On the other hand, in cases where the conversion process for the number of lines is executed, the flicker reduction circuit 41F selectively outputs the picture data for the odd fields from the output data of the FIFO 42 by interrupting the flicker reduction processing with respect to the first field and then executes this flicker reduction process from the following field.

In this way, even in cases where the document picture is displayed, the image data processing section 14 reduces the sudden change in the brightness level between the adjoining lines and flickering can be reduced effectively.

Figure 28:
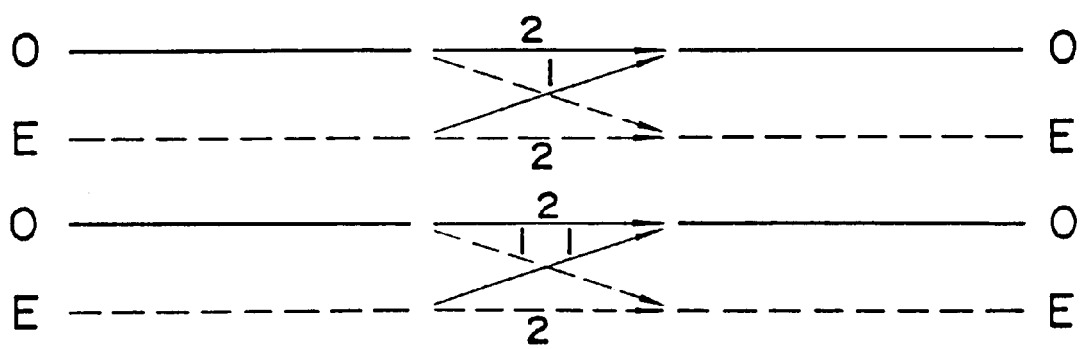
FIG. 28 is a schematic diagram for the explanation of the case of reducing the flickering by using two lines.

In this connection, a method of mixing the brightness component between the adjoining two lines, as shown in FIG. 28, can be considered for reducing the sudden brightness change between the adjoining lines. But, the lowering of resolution by one half cannot be avoided in this method.

With the above construction, the picture data of continuous three lines are simultaneously outputted from the FIFO mixing the components of upper and lower lines to the center line. Thus, even when the document picture is displayed by applying the interlace method, the sudden brightness change between the even-numbered and the odd-numbered fields can be reduced thereby to reduce the flickering.

The embodiment discussed above has dealt with the case where the flickering is reduced in the document picture represented by the binary picture data. However, this invention is not limited to this, but is widely applicable to the case where, for example, the color still picture having high resolution which is input through the image scanner is displayed by applying the interlace method.

Further, the embodiment discussed above has dealt with the case where this invention is applied to the video conference apparatus. However, this invention is not limited to this, but is widely applicable to a image processor for image processing the document picture.

(1-4-5) Recording of Line Drawing

In this connection, when telewriting is performed as described in this embodiment, there is a shortcoming in that, if the picture of the drawing plane 44 and the picture of the FIFO 42 are superimposed on one another, when the scale factor of the display picture is switched on the video conference apparatus 1 or the communication object side, or moreover, when the display picture is scrolled, the display of the line drawing input so far and the display of the document picture may lose consistency with each other.

A method of forming a memory space identical to that of the document picture in the drawing plane 44, enlarging and scrolling the picture of this drawing plane 44 following enlargement and scrolling of the document picture can be considered as a method for solving this problem, but in this case the structure of the drawing plane 44 is made larger. In addition, the structure of the peripheral circuits of the drawing plane becomes more complicated.

Therefore, in this embodiment, when the user switches the scale factor of the display screen in a state in which the picture of the line drawing is input to the drawing plane 44, and moreover, when the display picture is scrolled or rotated, the system controller 46 outputs the picture data of the line drawing, which is stored in the drawing pane 44, to the arithmetic memory 40 and overwrites this line drawing on this document picture as shown by the broken line in FIG. 21.

That is, the system controller 46 sequentially reads the picture data of the line drawing, etc., from the drawing plane 44 and controls the address generator 41H (FIG. 16) according to the scale factor of the display of the document picture and the display position, thereby converting the coordinate of this picture data, and storing it in the arithmetic memory 40. When all the pictures are stored in the arithmetic memory 40, the content of the drawing plane is cleared.

In this way, even in cases where the document picture is enlarged, scrolled, or rotated, the video conference apparatus 1 can display the line drawing, which has been input so far, at the display position on the original document picture as it is, thereby improving operability.

Furthermore, the line drawing can be freely erased and rewritten by holding the picture data of a line drawing in the drawing plane 44 until the document picture is enlarged, scrolled, or rotated, and the content of the drawing plane 44 is updated as required.

With the above construction, the picture of the drawing plane is written in the document picture stored in the arithmetic memory, so that even when the display of the document picture is changed, the line drawing can be kept in the position where the line drawing is input. Therefore, usage is improved.

(1-4-6) Processing of Natural Picture

Figure 29:
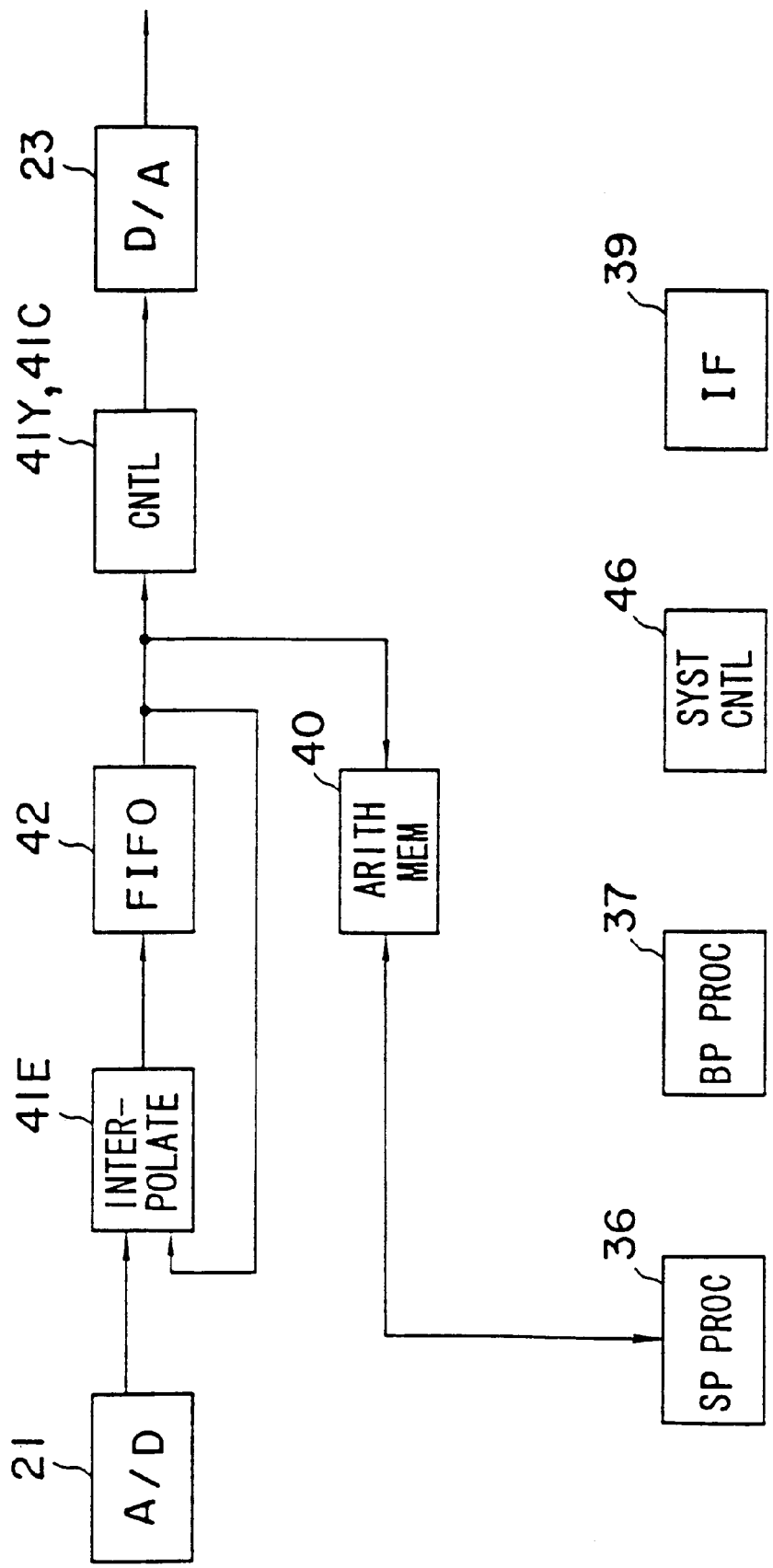
FIG. 29 is a block diagram for the explanation of the input/output of the natural picture.

On the other hand, when natural pictures are processed, the image data processing section 14 sequentially inputs the digital video signal, which is input from the analog-todigital converter 21, to the FIFO 42 through the interpolator 41E, as shown in FIG. 29.

At this time, the FIFO 42 feeds back the output data to the interpolator 41E. In addition, the interpolator 41E generates picture data by sequentially adding and averaging between fed back picture data and the picture data output from the analog-to-digital converter 21, and sequentially outputs this added and averaged picture data to the FIFO 42.

In this way, when natural pictures are picked up, the FIFO 42 can remove the noise component in which the signal level changes between fields and store the image data in which the noise is reduced by repeating this feedback process.

Thus, the image data processing section 14 outputs the picture data, which is stored in this FIFO 42, to the digital-to-analog converter 23 through the controllers 41Y and 41C, thereby allowing the fetched natural pictures to be monitored, and moreover, allowing it to be output to the still picture processor 36 through the memory 40 so as to send it to a communication object.

On the other hand, in the case of the picture data of natural pictures which are sent from a communication object, the image data processing section 14 can form a display picture by transferring picture data in real-time to the FIFO 42, similar to the case of the document picture after storing the picture data once in the arithmetic memory 40 through the still picture processor 36.

Here, the still picture processor 36 slices the picture data in units of 8 pixels x 8 pixels by applying orthogonal conversion, and then processes it.

Therefore, in this embodiment, in cases where the address generators 41A and 41B transfer the picture data of a natural picture to the still picture processor 36, they select the first and second memories 40A and 40B alternately and transfer the picture data of the brightness signal for eight pixels in the horizontal direction to the still picture processor 36, and then, alternately select the fifth and sixth memories 40E and 40F and transfer the picture data of the brightness signal for 8 pixels in the horizontal direction of the following lines to the static image processor 36 (FIG. 19).

After the transfer of this picture data in units of 8 pixels is repeated for eight lines in the vertical direction, the address generators 41A and 41B select the third memory 40C and transfer four units of picture data (equivalent to the 8-pixel portion of the brightness signal) in the horizontal direction to the still picture processor 36, and then select the seventh memory 40G and transfer four units of picture data in the horizontal direction to the still picture processor 36.

After the picture data for an 8-line portion in the vertical direction has been transferred by alternately switching these third and seventh memories 40C and 40G, the picture data for an 8-line portion in vertical direction is similarly transferred to the still picture processor 36 by alternately switching the fourth and eighth memories 40D and 40H.

In this way, even in cases where the address data is processed by switching it for the natural picture and document picture, the picture data processing section 14 can easily output the picture data of a natural picture in units of 8 pixels x 8 pixels to the still picture processor 36 by generating the address data.

In this way, the still picture processor 36 can process the picture data, which is sequentially input, by fetching it in time series, thus making it possible to simplify the structure for that portion. In addition, in the image data processing section 14 as a whole, the address data can be easily generated, thereby allowing the structure to be simplified for that portion.

On the other hand, in cases where the picture data, which is output from the still picture processor 36, is input, the address generators 41A and 41B generate address data similarly to the case where the picture data is output to the still picture processor 36, thereby enabling the image data processing section 14 to store the picture data, which is sequentially demodulated by the still picture processor 36, in the arithmetic memory 40 in time series and allowing the overall structure to be simplified for that portion.

Figure 30:
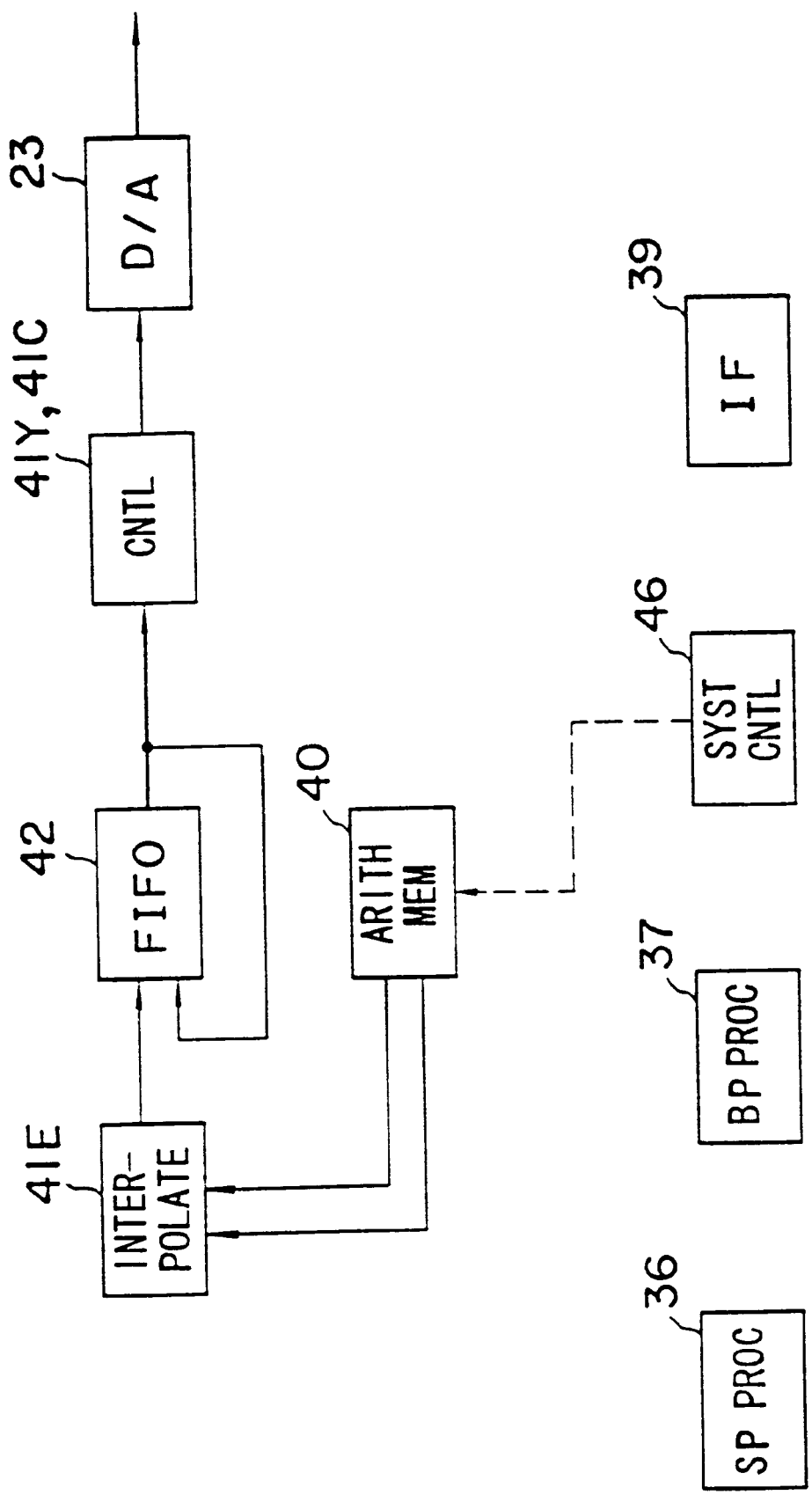
FIG. 30 is a block diagram for the explanation of the display of the natural picture.

On the other hand, in cases where the picture data, which is sent from a communication object and stored in the arithmetic memory 40, is displayed, as shown in FIG. 30, the image data processing section 14 simultaneously selects the image data of two consecutive lines and outputs it to the interpolator 41E.

Here, in cases where the transmission system of the picture data of a natural picture transmitted from a communication object is different from that of the monitor 4, the system controller 46 performs weighting addition on these two units of picture data, similar to the case in which the PAL-NTSC system picture conversion process is carried out.

The FIFO 42 processes this picture data for every odd field and every even field, similar to the case in which the PAL-NTSC system picture conversion processing is carried out with respect to the document picture.

In this way, the video conference apparatus 1 can perform the PAL-NTSC system image conversion process with respect to natural pictures, similar to the case where the number of lines of a document picture is converted and displayed, thereby allowing the overall configuration to be further simplified.

Furthermore, the video conference apparatus 1 is so arranged as to feed back the data output from the FIFO 42 and store it again with respect to the natural picture as well, thereby allowing a multi-picture screen and a window display screen to be formed with respect to the natural picture also, similar to the case of the document picture. In addition, it is so arranged that the picture of the line drawing from the system controller 46 can be stored in the arithmetic memory 40 so that the line drawing can be overwritten on the natural picture.

Therefore, even users who are unfamiliar to the operation can operate the device without distinguishing between natural pictures and document pictures, thereby allowing the video conference apparatus 1 to be easily transported as well as improving operability for that portion.

(1-5) Data Transfer (1-5-1) Format of Transmission Data

Here, the format regulated in CCITT H.221, which is applied to this video conference apparatus 1, is regulated according to the transmission speed, and all audio data, etc., is transmitted by taking frames succeeding at 125 [μsec] as a unit.

That is, in this format, in cases where a plurality of lines with a transmission speed of 64 [kbps] are used, the channel of each line is prescribed as channel B, and in cases where a plurality of lines with a transmission speed of 384 [kbps] are used, these lines are prescribed as channel $H_0$, and in cases where lines with a transmission speed of 1536 [kbps] and 1920 [kbps] are used, they are prescribed as channel $H_{11}$ and $H_{12}$, respectively.

In this format, for each channel, the succeeding 16 frames form a multiframe, and furthermore, the succeeding 2 multiframes form a sub-multiframe, and eight units of these sub-multiframes succeeds sequentially circulatively, thereby forming a channel.

Figure 31:
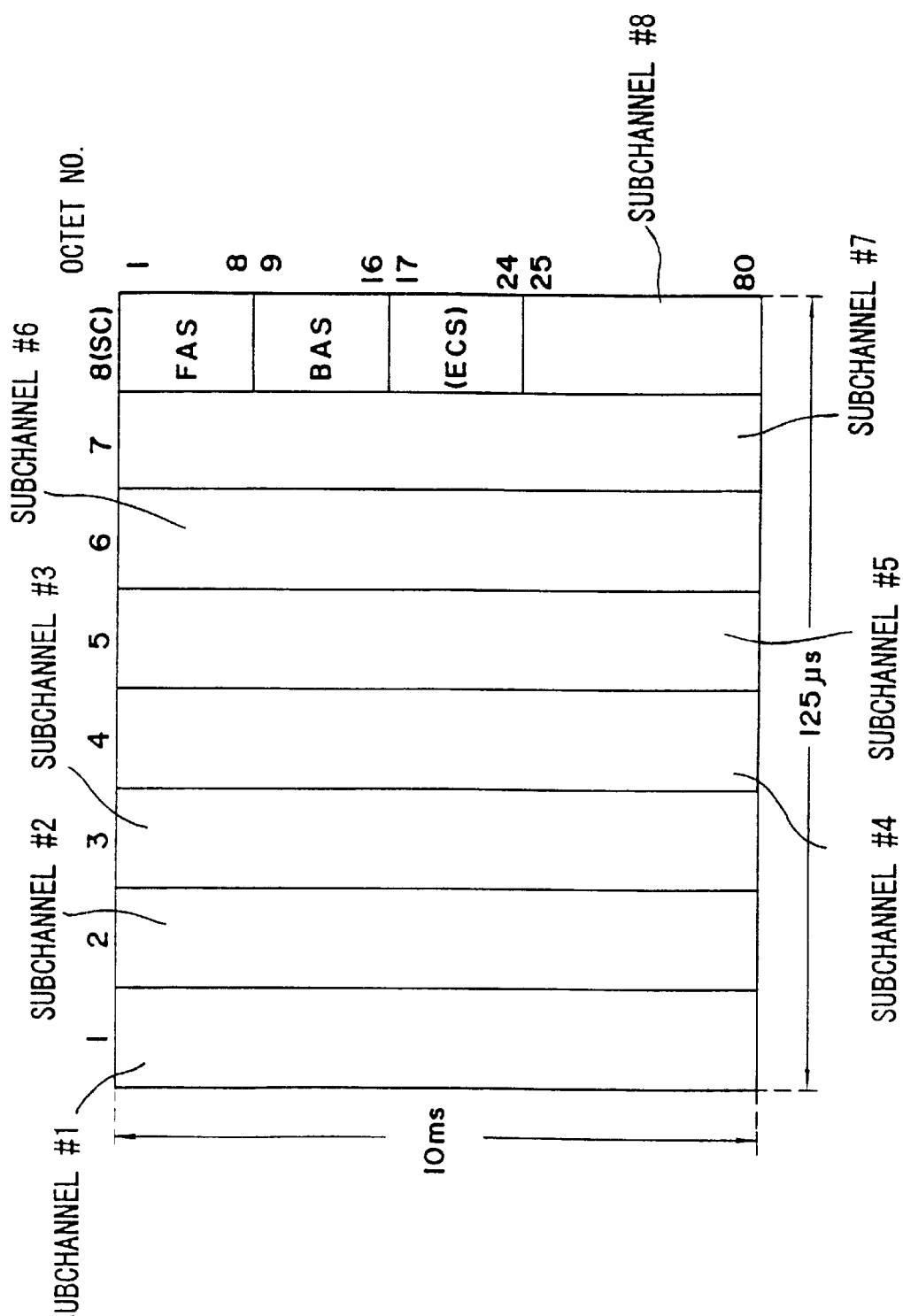
FIG. 31 is a schematic diagram illustrating the structure of channel B.

As shown in FIG. 31, in channel B, 8-bit serial data succeeds for 10 [msec] at a cycle of 125 [μsec] to form one-frame data. This 8-bit unit data is expressed with octet numbers while each bit column of these 8 bits is expressed with subchannels.

Of these subchannels, the eighth subchannel is called the service channel (SC). In cases where the picture data of a motion picture and audio data are transmitted, this subchannel is formed of a frame synchronous signal (FAS), bit rate assignment signal (BAS), encrypt control signal (ECS), and the remaining capacity.

Of these, the encrypt control signal is assigned to the 17th to 24th bits of the service channel as required so that it can be used as its control code when the encrypted data is transmitted.

On the other hand, the bit rate assignment signal is assigned to the 9th to 16th bits of the service channel. In cases where the data is transmitted using a plurality of channels, the bit rate assignment signal is designed to express its structure. Thus, a data transmitter for transmitting this kind of data can reliably receive the data transmitted by taking this bit rate assignment signal as a reference. In addition, it is so arranged that this bit rate assignment signal can also be used for control and notification.

On the other hand, the frame synchronous signal is assigned to the first to eighth bits of the service channel and assigned to the identification data of multiframes, sub-multiframes, and frames as well as the identification data of lines, thereby allowing compensation for the time lag etc., between the channels in cases where the data is transmitted using a plurality of channels, as well as the bit boundary of the data in each frame to be accurately detected.

In this way, in cases where the data is transmitted using channel B, the video conference apparatus 1 connects lines only for a desired number of lines within a range of up to six lines, and simultaneously sends 64 [kbps] data to this connected line in parallel, thereby allowing the data to be transmitted easily at various transmission speeds by easily connecting with an ISDN line, etc., as a whole.

Figure 32:
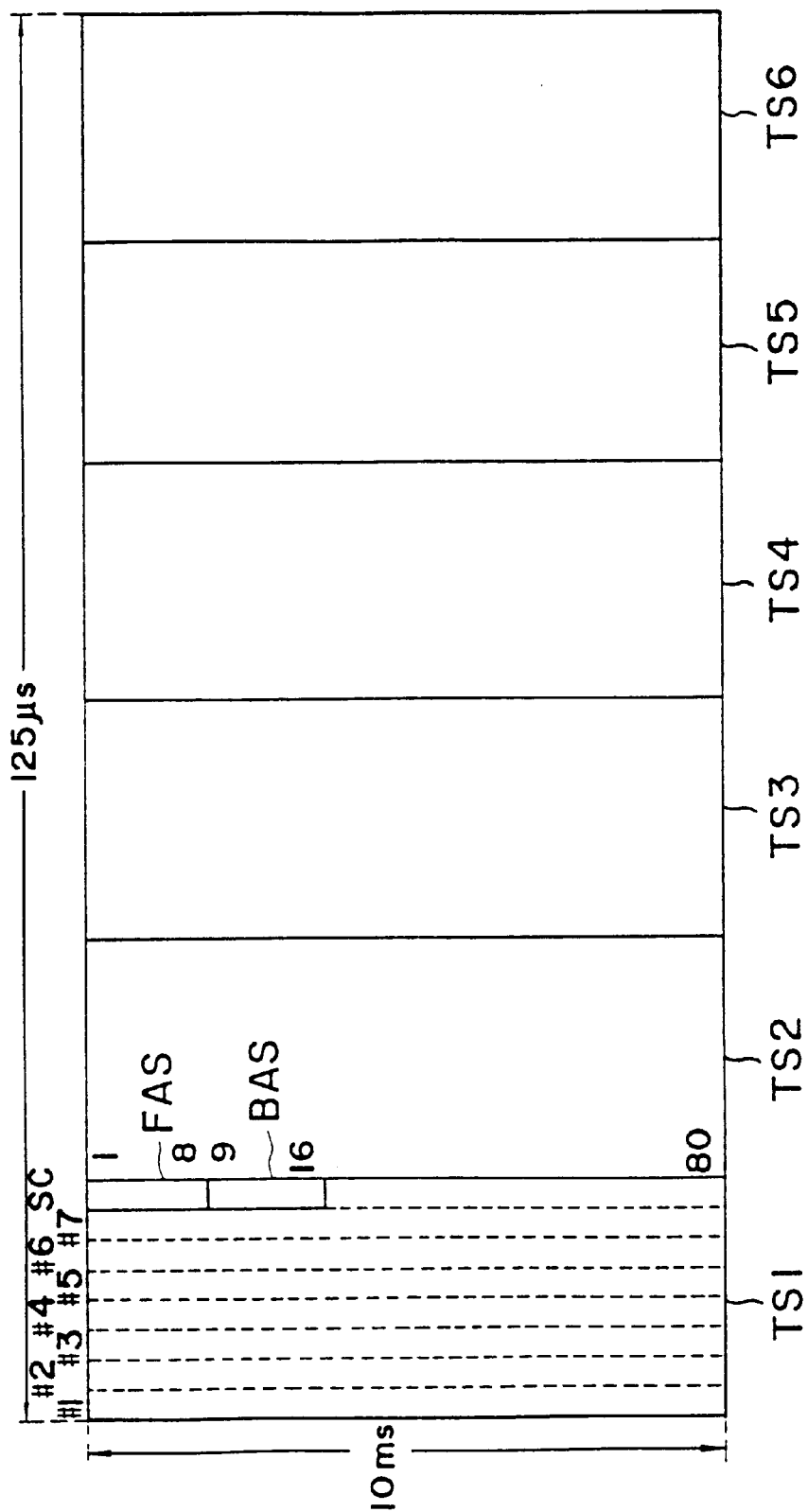
FIG. 32 is a schematic diagram illustrating the structure of channel $H_0$.

On the other hand, as shown in FIG. 32, channel $H_0$ is formed so that one frame corresponds to six frames of channel B, and the serial data of forty eight bits (8 bits x 6) with a cycle of 125 [$\mu$sec] succeeds for 10 [msec] to form one-frame data, and each bit column of 48 bits x 6 is expressed with a subchannel.

Furthermore, in channel $H_0$, the eighth subchannel is assigned to the service channel. Channel $H_0$ is so arranged that the frame synchronous signal is assigned to the bits from the first bit to the eighth bit of this service channel and the bit rate assignment signal is assigned to the bits from the 9th bit to the 16 bit.

In this way, in channel $H_0$, a plurality of lines are connected, similar to the case of channel B, so as to be able to transmit desired data. In the case of the video conference apparatus 1 of this embodiment, up to two lines can be connected.

On the other hand, channels $H_{11}$ and $H_{12}$ are formed so that one frame of each channel corresponds to twenty four frames and thirty frames of channel B, respectively, similar to the case of channel $H_0$. The serial data of a hundred and ninety two bits and two hundred and forty bits succeeds at a cycle of 125 [$\mu$sec] for 10 [msec] to form one-frame data, thereby enabling the data to be transmitted at a transmission speed of 1536 [kbps] and 1920 [kbps].

The video conference apparatus 1 assigns areas of motion picture data, audio data, low-speed transfer data (hereafter referred to as "LSD data"), and high-speed transfer data (hereafter referred to as "HSD") to each frame, and moreover, switches these area according to the operation mode, thereby transmitting the picture data of natural pictures and document pictures, line drawing data, etc.

That is, the video conference apparatus 1 assigns the picture data of natural pictures and document pictures and the line drawing data to the HSD data and transmits them, as well as assigns the data of personal computers, etc., which is input through the external bus IF 50.

In this connection, the video conference apparatus 1 uses bits below the bit rate assignment signal of the 8th subchannel to transmit data with respect to the control command at the time of drawing, the control command for switching operation mode, etc.

Figure 33A:
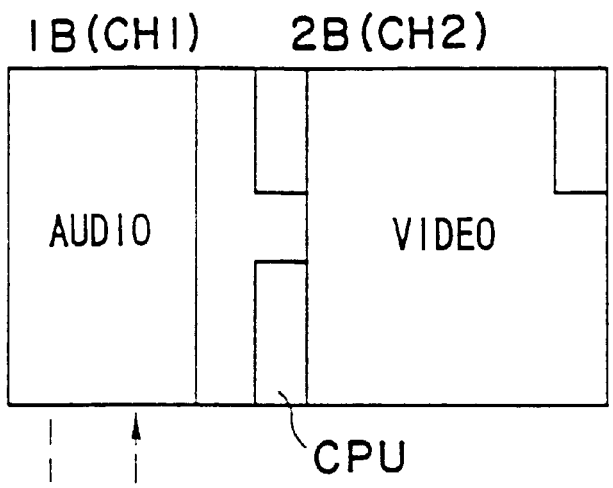
FIGS. 33A to 33C are schematic diagrams for the explanation of the data transmission in the case where two lines of channel B are used.
Figure 33B:
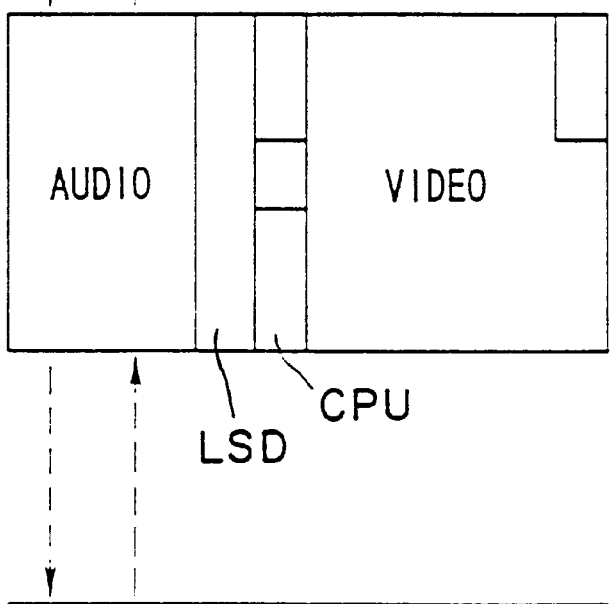
Figure 33C:
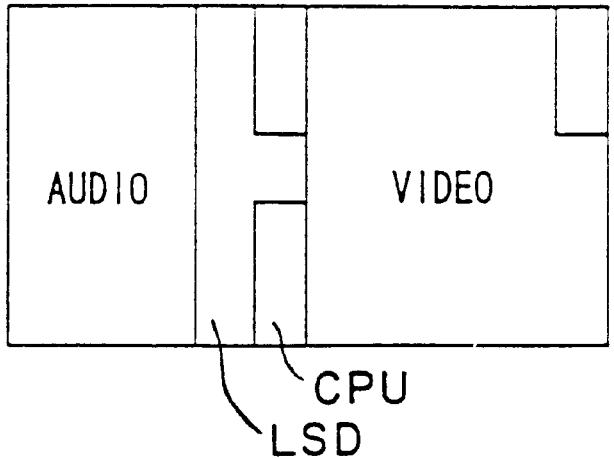

As shown in FIGS. 33A to 33C, for the switching of this data area, in cases where data is transmitted using two lines for channel B, the areas of audio data and motion picture data (represented by video) are assigned according to the format regulated in H.221 and the remaining area is switched according to the user operation with a command sent from a communication object. In this case, the symbol CPU stands for data sent/received between the system controller 46 and the system controller of a communication object (FIGS. 33A to 33C).

Figure 34A:
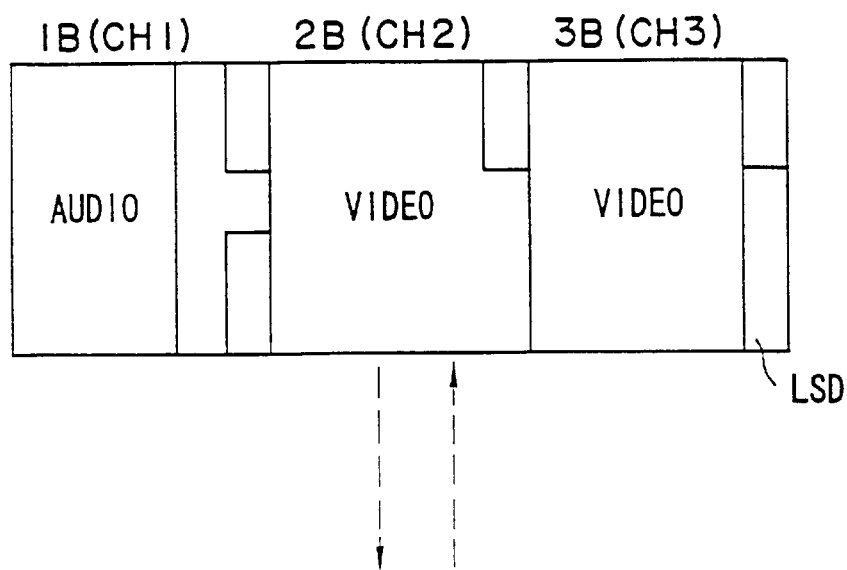
FIGS. 34A and 34B are schematic diagrams for the explanation of the data transmission in the case where three lines of channel B are used.
Figure 34B:
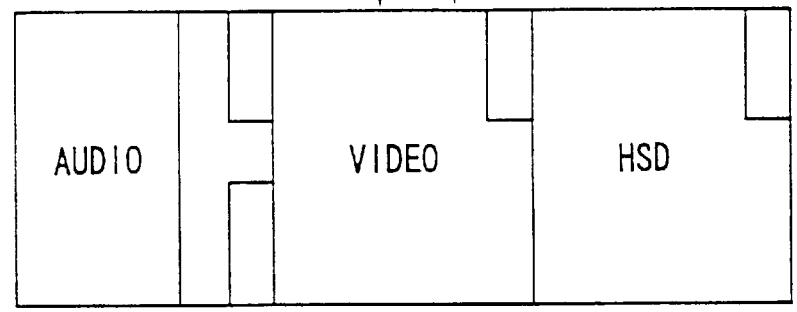

On the other hand, as shown in FIGS. 34A and 34B, in cases where data is transmitted using three lines for channel B, the audio data and motion picture data are assigned to the first and second lines (represented by 1B and 2B) according toe the format regulated in H.221 and the motion picture or the HSD data is assigned to the remaining lines (represented by 3B) (FIGS. 34A and 34B).

Furthermore, as shown in FIGS. 35A and 35B, in cases where data is transmitted using six lines for channel B, the audio data and motion picture data are assigned to the first and second lines 1B and 2B according to the format regulated in H.221, and the HSD data is assigned to the remaining lines (FIG. 35A and 35B). Furthermore, data is assigned similar to the case of channel $H_0$, channel $H_{11}$, and channel $H_{12}$.

In this way, the video conference apparatus 1 can transmit various type of data by switching the operation mode as required.

In this connection, in cases where a plurality of this type of data communication circuits are used or the line is congested, etc., a plurality of lines may be connected with a communication object through separate routes in some cases.

That is, there is a case where one line among a plurality of lines is connected with a communication object through a submarine cable and another line is connected through a geostationary satellite. In cases where a line is connected through a geostationary satellite, for example, even in cases where a line is connected between Japan and the U.S.A., there is a case that the connection is made sequentially through a geostationary satellite over the Indian Ocean and through a geostationary satellite on the Atlantic Ocean.

Therefore, in cases where data is transmitted using a plurality of lines, the phase of the data transmitted from a communication object may shift greatly between the lines.

In this connection, in cases where the motion picture data and audio data are transmitted, H.221 can compensate for phase shift between channels by using frame synchronous signals.

However, in cases where data other than the motion picture data or audio is transmitted, there is a characteristic that frame synchronous signals, etc., are not prescribed because it is assumed that independent data is transmitted to each line.

Therefore, like the video conference apparatus 1 of this embodiment, in cases where the picture data of a document picture is assigned to the HSD data and is transmitted using a plurality of lines, it becomes difficult to compensate phase shift and it also becomes difficult to identify the line itself. As a result, a correct document picture may not be reproduced.

For this reason, in this embodiment, even in cases where data other than the motion picture data or audio data is transmitted, a frame is formed by assigning the frame synchronous signal, bit rate assignment signal, and encrypt control signal similar to the case where motion picture data and audio data are transmitted.

In this way, even in cases where various types of data other than motion picture data and audio data are transmitted using a plurality of lines, phase shift can be reliably compensated for. Furthermore, data can be restored correctly by identifying the line in which the data is transmitted.

(1-5-2) Multiplexer (1-2-2-1) Generation of Mutliplexed Data

In cases where various types of lines are connected, the data transmission speed of the video conference apparatus 1 has to be switched according to the line to be connected within a range between 64 [kbps] and 1920 [kbps] (max.).

For this reason, the video conference apparatus 1 has to switch the data mapping of each frame, according to the operation mode, to multiplex picture data, audio data, etc.

In this case, if it is so arranged that the multiplexing clock frequency is switched according to this transmission speed, the configuration becomes complicated for that portion and the time required for processing also increases.

Therefore, in this embodiment, the video conference apparatus 1 is so arranged to multiplex the picture data, etc., using a single frequency clock by forming a time slot and multiplexing the data to be transmitted, thereby allowing the overall configuration to be simplified.

Figure 36:
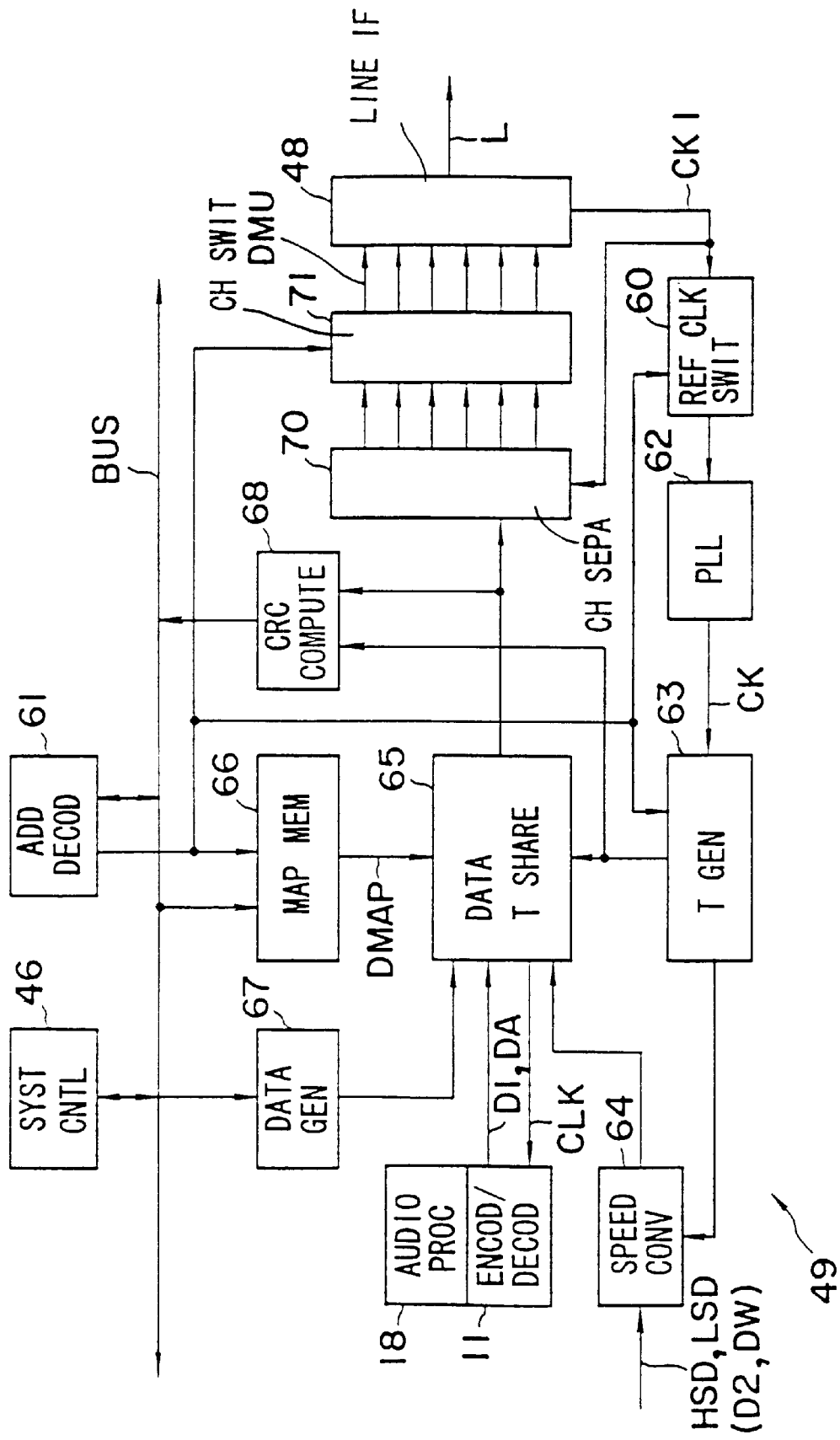
FIG. 36 is a block diagram illustrating the sender of a multiplexer.

That is, as shown in FIG. 36, the multiplexer 49 gives the bit clock the octet clock CK1 from the line interface 48 to a reference clock switching circuit (reference CLK switching) 60 and the operation of the reference clock switching circuit 60 is switched by the output data of the address decoder 61 there.

In this way, the multiplexer 49 drives a PLL circuit 62 with the output signal of the reference clock switching circuit 60, thereby generating a predetermined frequency clock CK synchronized with the bit clock of this line even if lines with various transmission speeds are connected.

In the case of this embodiment, the frequency of this clock CK is selected at the frequency of 2048 [kHz], thirty two times that of the bit clock 64 [kHz] of channel B. In this way, the multiplexer 49 operates by taking this clock CK as a reference and holds the clock frequency necessary for multiplexing at a single frequency.

Figure 37A:
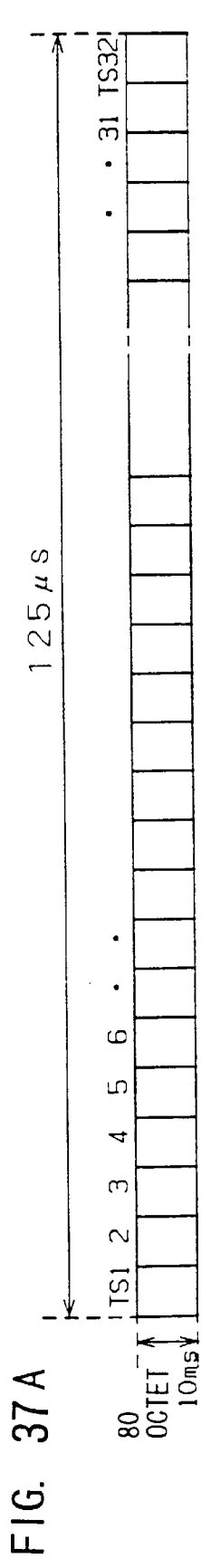
FIGS. 37A and 37B are schematic diagrams for the explanation of the time slot in the case where six lines of channel B are used.
Figure 37B:
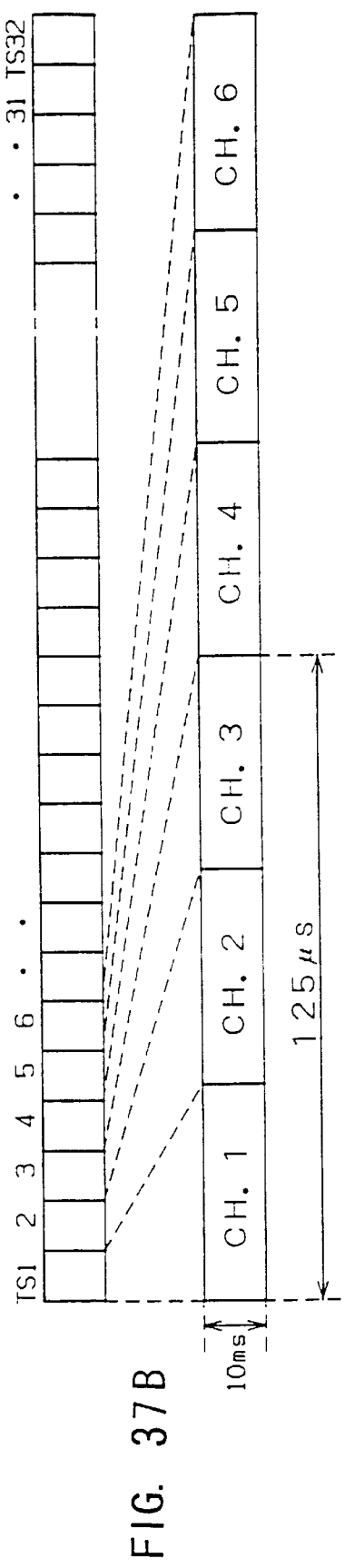
Figures 41A, 41B:
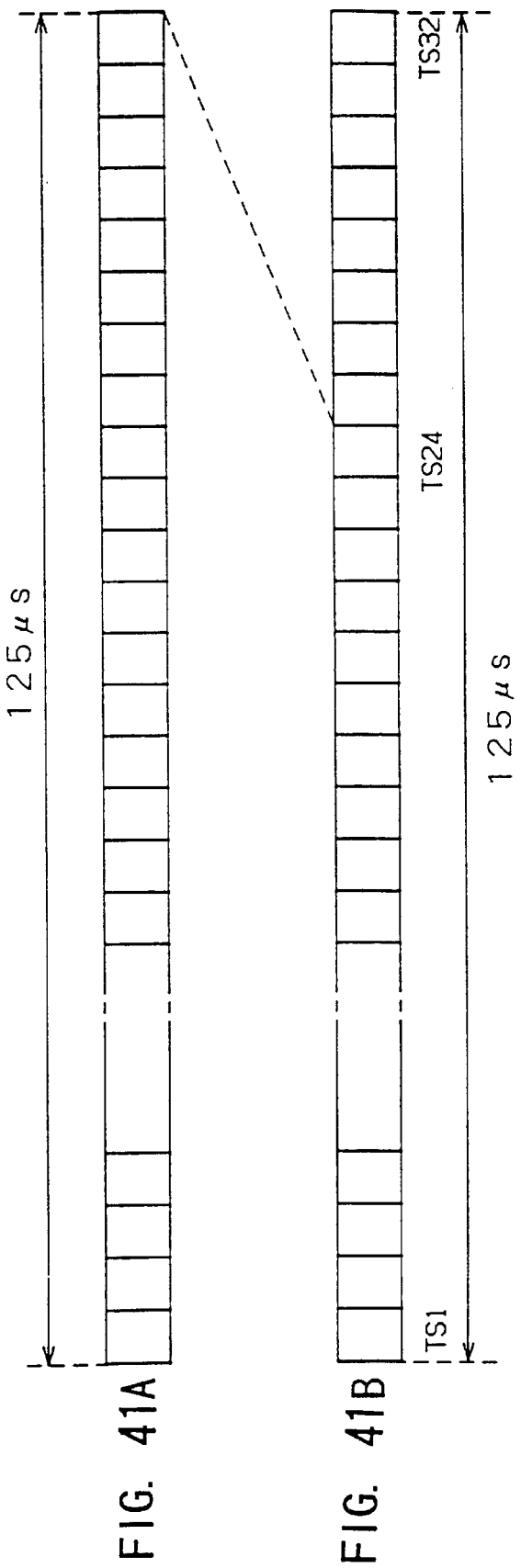
FIGS. 41A and 41B are schematic diagrams for the explanation of the time slot in the case where channel $H_{11}$ is used.

That is, as shown in FIGS. 37A and 37B, the multiplexer operates by taking this clock CK as a reference, thereby forming time slots TS1 and TS32 so that these thirty two time slots succeed at a cycle of 125 [μsec] and assigning 8-bit data corresponding to one octet of each frame of channel B to each time slot TS1 to TS32, respectively.

In this way, in cases where six lines of channel B are connected, the multiplexer 49 generates one serial data in which picture data, etc., is sequentially multiplexed by mapping in units of eight bits to the first to sixth time slots TS1 to TS6 of the time slots TS1 to TS32 and outputs this serial data to each line by sequentially switching it, thereby outputting the multiplexed picture data, etc., by switching to a predetermined line.

On the other hand, in the case of channel $H_0$, as shown in FIGS. 39A and 39B, the multiplexer 49 sends 48-bit data at a cycle of 125 [μsec], thereby assigning the first to sixth time slots TS1 to TS6 to the line of the first channel and then assigning the seventh to 12th time slots TS7 to TS12 to the line of the second channel.

In this case, the multiplexer 49 generates one unit of serial data by sequentially mapping data in units of eight bits to these time slots TS1 to TS12 and outputs this serial data by sequentially switching to each line just as in the case of channel B, thereby outputting the multiplexed image data, etc., to a predetermined line.

Furthermore, in the case of channel $H_{11}$ and channel $H_{12}$, the multiplexer 49 generates one unit of serial data in which picture data, etc., is mapped by assigning the first to 24th time slots TS1 to TS24 and the first to thirtieth time slots TS1 to TS30 to the lines, respectively, and outputs the multiplexed picture data, etc., by outputting this serial data to the lines.

That is, the multiplexer 49 forms thirty two time slots TS1 to TS32 at a cycle of 125 [μsec], assigns data in units of eight bits to these time slots TS1 to TS32 according to the transmission speed of the data output to the line, and generates one unit of serial data. In cases where the transfer rate of the data output to the line is switched, the transfer rate of the data is switched by switching the time slots which the data occupies, thereby allowing the transfer rate of the data to be easily switched by driving with a single clock CK.

Therefore, in the video conference apparatus 1, the overall configuration can be simplified and made compact for that portion.

For this reason, the timing generator 63 generates a reference signal for fetching data to each time slot by taking the clock CK of this frequency 2048 [kHz] as a reference and controls the operations of the speed converter 64, data timesharing circuit 65, and CRC computation circuit 68 based on this reference signal.

On the other hand, the data time sharing circuit 65 sequentially fetches image data, etc., by taking the mapping data DMAP, which has a memory space for forming the time slot mentioned above and is output from the mapping memory 66, as a reference and mapping them, thereby generating one serial data in which the motion picture data, etc., is sequentially assigned to the time slots and multiplexed.

At this time, the mapping memory 66 switches the mapping data DMAT according to the control data output from the address decoder 61 while the address decoder 61 switches this control data in response to the control command output from the system controller 46.

In this way, it is so arranged that the multiplexer 49 switches the mapping of the data time sharing circuit 65 in response to the line connected, and furthermore, in response to the operation mode of the video conference apparatus 1.

The data generator 67 inputs the data for the frame synchronous signal and the bit rate assignment signal from the system controller 46 and outputs it to the data time sharing circuit 65 at a predetermined timing, thereby mapping this frame synchronous signal and bit rate assignment signal to a predetermined location corresponding to the service channel.

The data time sharing circuit 65 sends a clock CK to the audio data processor 18 and the encoder/decoder 11 with a timing for mapping the audio data and picture data, respectively, and the audio data processor 18 and the encoder/decoder 11 outputs the audio data and picture data to the data timesharing circuit 65 by taking this clock CLK as a reference.

On the other hand, the speed converter 64 is constituted of a random access memory circuit and inputs the line drawing data DW, the picture data D2 of natural pictures and document pictures, etc., which are input from the image data processor 14, external bus interface 50, etc., as HSD data and LSD data, converts the transmission speed, and outputs them as a timing for the mapping of the data time sharing circuit 65.

At this time, the timing generator 63 switches the operation of the speed converter 64 according to the output data of the address decoder 61, thereby mapping and outputting the HSD data and LSD data to the corresponding time slots.

In this way, the data timesharing circuit 65 maps the data needed for the time slots and sequentially and circulatively outputs the data mapped in the order of the first to 32nd time slots in units to octet numbers by taking a clock output from the timing generator 63 as a reference.

The CRC computation circuit 68 fetches this output data, generates a CRC error correction code which consists of acyclic code, and outputs this error correction code to the data generator 67 through the bus BUS and the system controller 46. The data generator 67 maps this error correction code at the same time when the data of the frame synchronous signal and bit rate assignment signal are mapped to the data time sharing circuit 65.

In this way, the multiplexer 49 can generate an error correction code by switching the timing of the operation of the CRC computation circuit 68 according to the circuit and drive the CRC computation circuit 68 at a single frequency, thereby allowing the overall configuration to be simplified for that portion.

In this connection, this CRC error correction code is generated by utilizing the free time of the time slots in which data is not assigned.

In this way, the video conference apparatus 1 forms a maximum of thirty two time slots for the necessary thirty (max.) time slots to secure free time. It is also so arranged that the video conference apparatus 1 can generate a CRC error correction code by effectively using this free time and process data with a simple configuration as a whole, even in cases where the transmission speed is switched.

The channel separator 70 switches and outputs the output data of this data time sharing circuit 65 to a channel corresponding to the line. The channel switching circuit 71 switches and outputs the output data of this channel separator to a channel set by the user and at this time converts the transmission speed of the output data into the transmission speed of each channel and then outputs it.

In this way, the multiplexer 49 multiplexes picture data, etc., with a predetermined bit boundary so as to generate a multiplexed data DMU and outputs this multiplexed data DMU from the line interface 48.

At this time, the multiplexer 49 can switch mapping by switching the mapping data DMAP, which is output from the mapping memory 66, thereby enabling the mapping of motion picture data, HSD data, etc., to be switched according to the operation mode.

Furthermore, the mapping memory 66 has the first and second memory spaces so that mapping can be switched quickly by following the switching of this operation mode, and is so arranged that mapping can be switched by switching the output of the mapping data DMAP by switching these first and second memory spaces.

(1-5-2-2) Separation of Multiplexed Data

With respect to the multiplexed data, which is transmitted from a communication object and input through the line interface 48, the multiplexer 49 generates one unit of serial data by assigning this multiplexed data to the time slots in reverse to the time of sending, and then, outputs to each circuit block separately, thereby operating with a single frequency clock and simplifying the overall configuration.

In addition, in cases where six lines of channel B are connected, or moreover, in cases where two lines of channel $H_0$ are connected, the multiplexer 49 forms time slots similar to the case mentioned above regarding FIGS. 37A, 37B, 38A, and 38B.

In this way, as shown in FIGS. 39A, 39B, 40A, and 40B, in cases where one line for channel B and for channel $H_0$, respectively, are connected, the multiplexed data DMU is assigned to the time slot TS1 and the first to sixth time slots TS1 to TS6, respectively, as well as separated into the picture data, etc., while in cases where channels $H_{11}$ and $H_{12}$ are connected, as shown in FIGS. 41A, 41B, 42A, and 42B, the multiplexed data DMU is assigned to the first to 24th time slots TS1 to TS24 and the first to 30th time slots TS1 to TS30, respectively, and separated into image data, etc.

(1-5-2-3) Principle of Phase Shift Detection

In cases where data is transmitted using a plurality of lines, the phase, which is shifted greatly between the lines, of the data transmitted from a communication object has to be compensated for.

For this, there is a method for compensating for this phase shift by setting a predetermined reference and detecting a phase shift between this reference and each line for each line, but in this method, the overall configuration becomes complicated.

Figure 43:
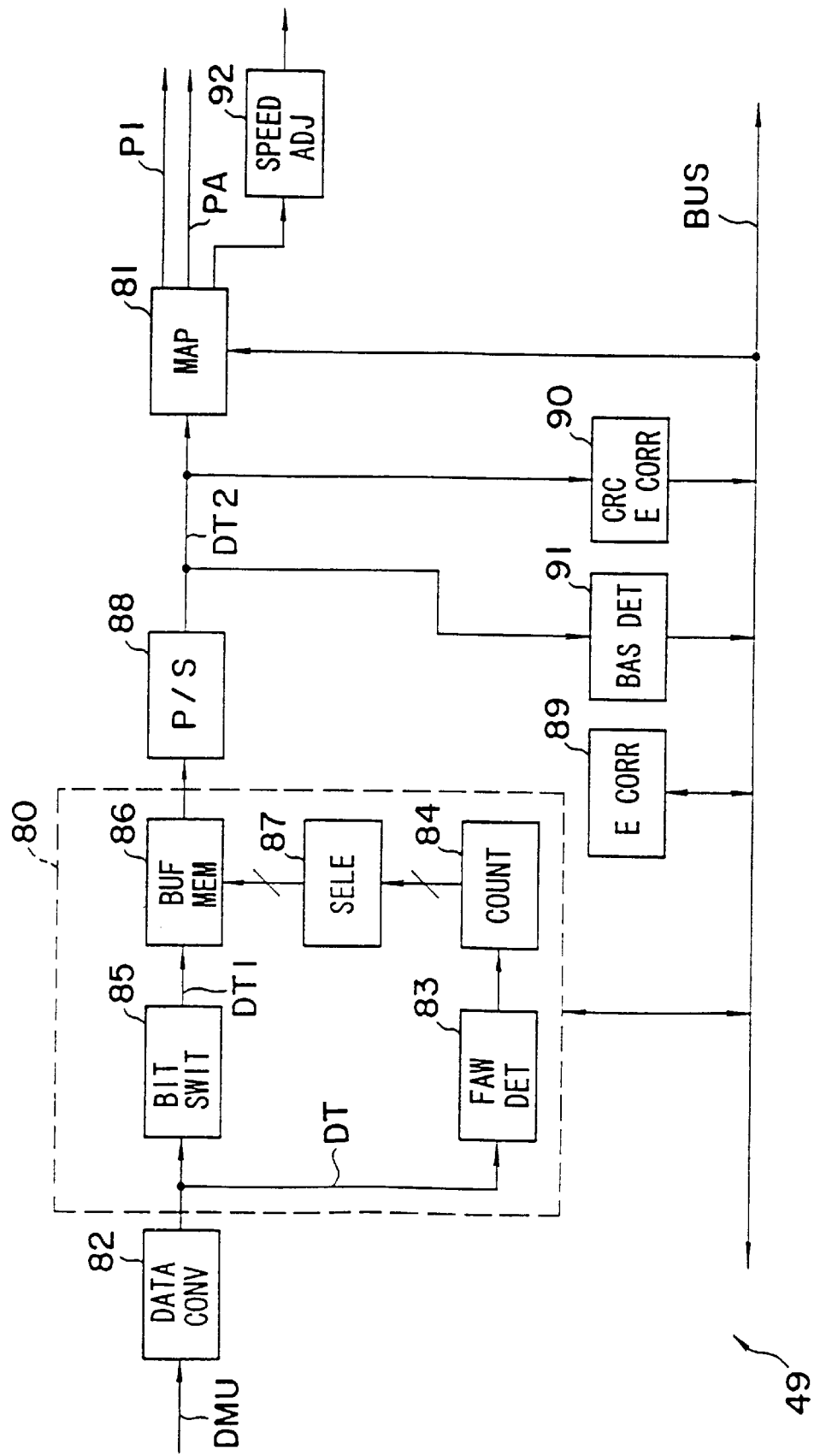
FIG. 43 is a block diagram illustrating the receiver of a multiplexer.

Therefore, as shown in FIG. 43, the multiplexer 49 compensates this kind of phase shift with the phase shift compensator, and then, forms the time slots with the mapping circuit 81 and separates the data.

Figure 44:
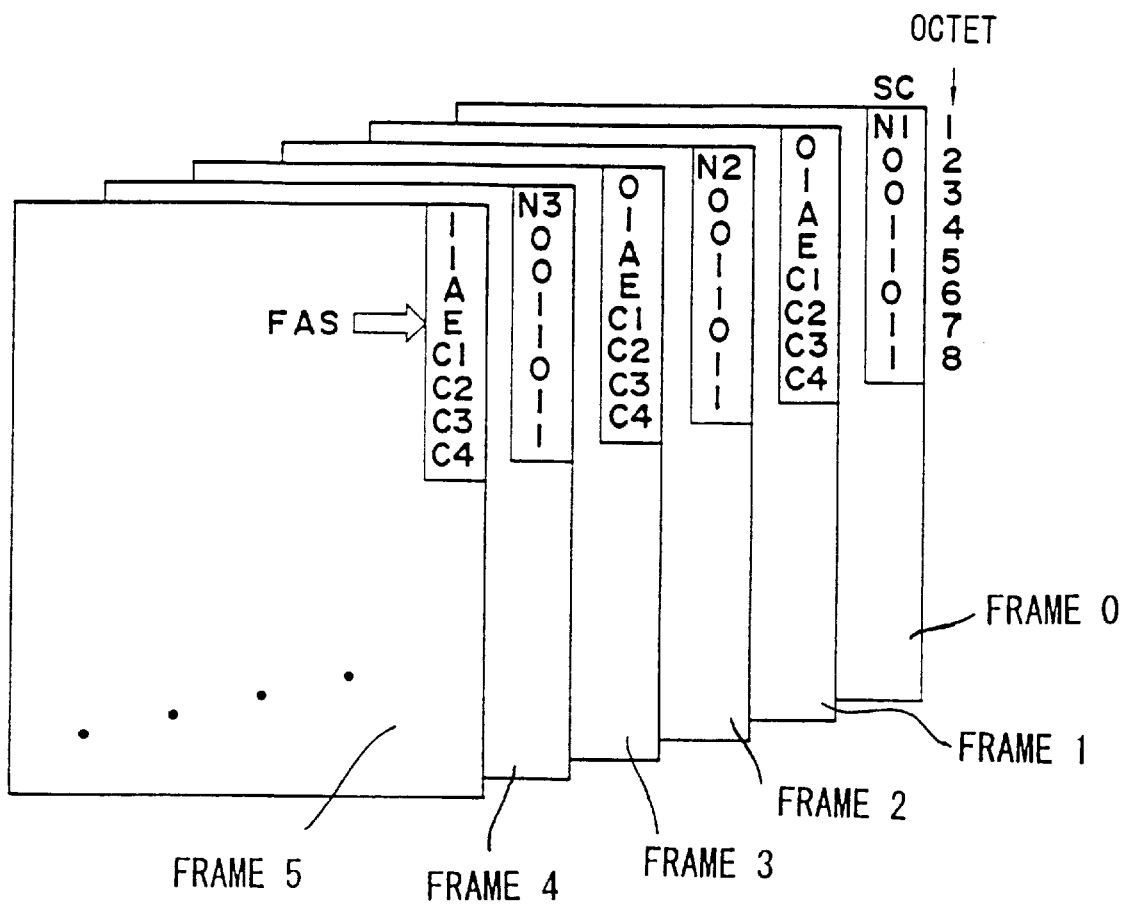
FIG. 44 is a schematic diagram for the explanation of FAS.

Here, as shown in FIG. 44, the frame synchronous signal prescribed in H.221 is regulated so that the data of a value "0011011" is assigned to the second to eighth octets of the even frames, thereby enabling the succeeding data strings to be sampled at a cycle of 8 bits and the bit pattern of this value "0011011" to be detected, and thereby enabling the timing of the frame synchronous signal of the even frames to be detected.

In this way, for the frame synchronous signals prescribed in H.221, the byte boundary of the data in each frame can be detected on the basis of this timing detection result, and furthermore, for example, that this timing detection result is obtained between the two lines and a phase shift of up to 10 [msec] can be compensated for by compensating the phase based on this timing detection result.

Furthermore, when the frame synchronous signals are lined in units of multiframes, as shown in FIG. 45, the frame synchronous signals prescribed in H.221 are regulated so that the first octets of the odd frames succeed with a value of "001011" from the first sub-multiframe, thereby enabling the first octet of the service channel to be sampled between the succeeding frames, this value "001011" to be detected, and the timing of each frame in the multiframe to be detected.

In this way, for the frame synchronous signal prescribed in H.221, this timing detection result is obtained between the two lines, for example, and the phase is compensated for based on this time detection result, and a phase shift of up to 80 [msec] can be compensated for.

Furthermore, for the frame synchronous signal, which is prescribed in H.221, it is regulated so that the first octets of the odd frames succeed at "N1, N2, N3, and N4" from the first sub-multiframe and the values regulated with this 5-bit data are sequentially and circulatively switched for each multiframe.

In this way, for the frame synchronous signals prescribed in H.221, the values are detected by detecting the first octets of these even frames, thereby allowing the timing of the multiframe to be detected between 16 multiframes, and thereby enabling the phase shift of up to 1.28 [sec] to be compensated for.

In actual, if a phase shift of up to 1.28 [sec] can be compensated for in this kid of data communication, then the phase shift can be reliably compensated for.

The multiplexer 49 detects the phase shift between a plurality of lines and compensates for this phase shift according to the principle of phase shift detection.

In addition, the data for the detection of phase shift assigned to this frame synchronous signal is called FAW.

(1-5-2-4) Compensation of Phase Shift

In FIG. 43, the multiplexer 49 inputs the multiplexed data DMU, which is output from the line interface 48, to the data converter 82, outputs it so that the data of a predetermined channel succeeds in a predetermined order in units of 8 bits, thereby forming time slots and converting the input data of each line into serial data.

At this time, in cases where a plurality of lines are connected, the data converter 82 forms a clock having a duty ratio of 50 [%] by taking one of them as a reference and samples the remaining lines with this clock as a reference, thereby fetching the data of each line with this clock as a reference.

Furthermore, the converter 82 detects the timing in which the logic level of these remaining lines switches and the timing so as to sample data of each line at this time, and when these timings are close to each other, the sampling timing is switched between the trailing and rising of the clock, thereby allowing the data to be fetched reliably.

That is, the data to be transmitted through these types of lines has the characteristics of the synchronism not being shifted between lines, but in the phase shifts. In this way, the data is fetched by switching the timing between the trailing and rising of the clock, thereby allowing the data to be fetched securely by setting this timing once.

In this connection, in cases where such a phase shift is compensated, the phase of data for each line can be set at one clock if an FIFO-type memory is used. But this method has a shortcoming in that the overall configuration becomes complicated. Thus, in the case of this embodiment, the data of each line can be fetched reliably with a simple configuration.

Furthermore, in cases where this data is fetched and the line in which the data is fetched is an ISDN line, it is so arranged that the converter 82 detects the byte boundary, thereby compensating bit strings in advance, and fetches the data.

On the other hand, the FAW detector 83 detects FAW from the data strings succeeding in units of eight bits and the counter 84 drives a predetermined ring counter for each line on the basis of the FAW detection result.

In this way, the multiplexer 49 detects the data octet number and the bit boundary, which are input through each line in this counter circuit.

The bit switching circuit 85 compensates the output data of the data converter 82 and stores the compensated data in the buffer memory 86 so that the data of the identical octet number succeed in units of eight bits for each line based on the detection result of this bit boundary.

At this time, the buffer memory 86 sequentially inputs data based on the detection result of the octet number and outputs data, which is sequentially stored, through the selector 87 on the basis of the input reference data, thereby outputting data so that the data having the identical octet number succeed in units of eight bits, and furthermore, compensating the phase shift between channels.

At this time, the buffer memory 86 inputs/outputs data in units of time slot, thereby compensating the phase shift in 8-bit parallel data form and converting it into the original serial data form with the parallel-to-serial converter (P/S) 88.

The error correction circuit 89 performs the error correction process with respect to bit rate assignment signal, etc., and the CRC error correction circuit 90 performs the error correction process with respect to the overall data based on the error correction code, which is attached at the time of transmission.

At this time, the error correction circuit 90 performs the error correction process by utilizing the free time of the time slots to which data is not assigned. In this way, the video conference apparatus 1 can perform the error correction process with a simple configuration even in cases where data is sent/received by switching the transmission speed.

The BAS detector 91 detects the bit rate assignment signal and outputs it to the system controller 46, thereby enabling the system controller 46 to receive the control command, etc., which is sent from a communication object.

The mapping circuit 81 selectively outputs the output data of the parallel-to-serial converter 88 in accordance with the mapping data output from the system controller 46, thereby allowing the multiplexer 49 to output the multiplexed and transmitted audio data, etc. by separating it into each corresponding circuit block.

At this time, the multiplexer 49 outputs the user data, which is output through the external bus interface 50, etc., through the speed adjustment circuit 92 by converting the transmission speed.

Figure 46:
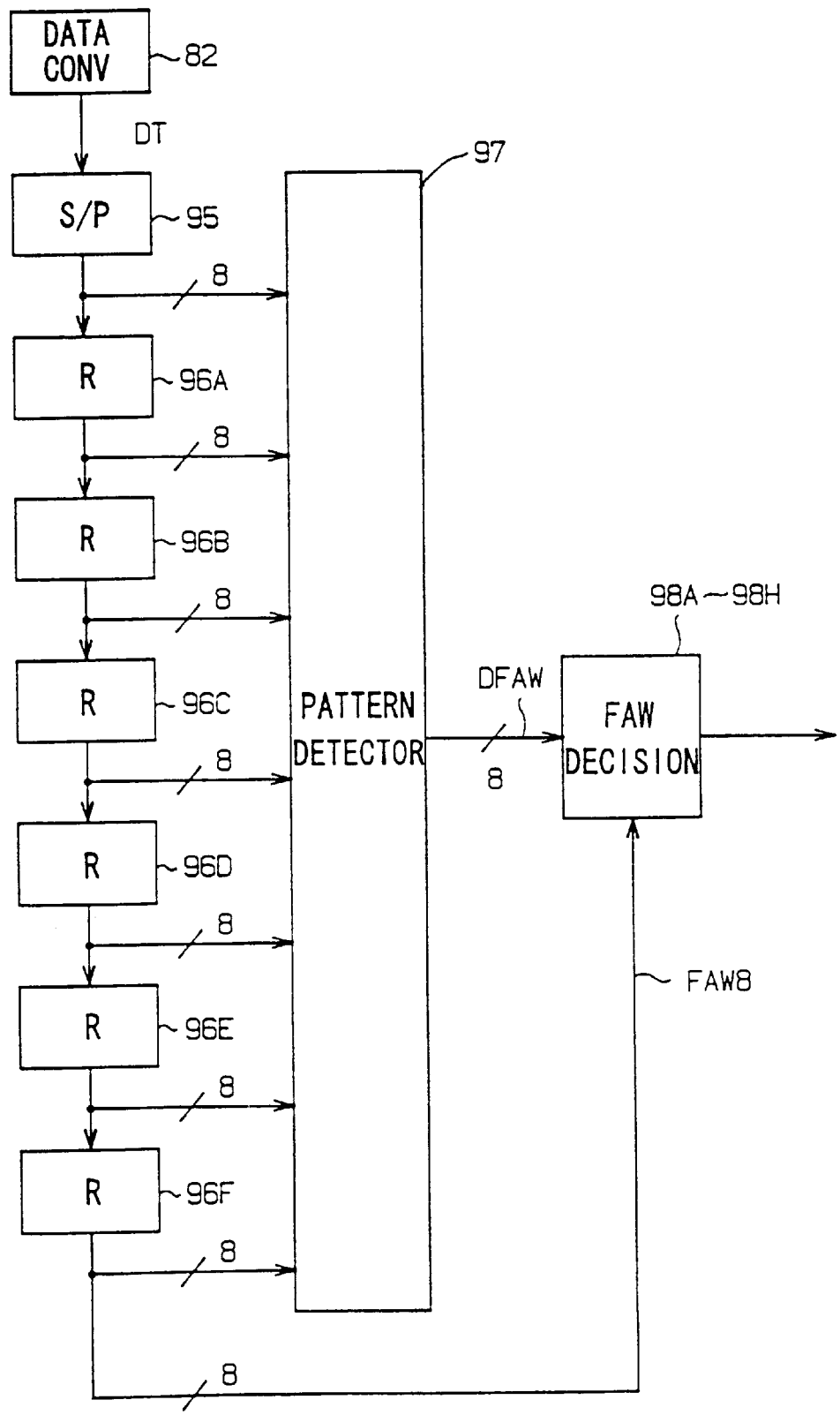
FIG. 46 is a block diagram illustrating the FAW detector.

As shown in FIG. 46, the FAW detector 83 receives the output data DT of the data converter 82 with the serial-to-parallel converter (S/P) 95 and first converts the 8-bit data, which is assigned to the first time slot, into the parallel data and then outputs it.

The registers (R) 96A to 97F are connected in series and sequentially transfer 8-bit parallel data at a repeated cycle of this first time slot. The pattern detector 97 inputs the output data of the serial-to-parallel converter 95 and the output data of these registers 96A to 96F in parallel.

In this way, the pattern detector 97 fetches seven bytes of the succeeding 8-bit data from the data assigned to the first channel and detects whether or not each bit of these seven bytes succeeds with a value "0011011".

That is, the pattern detector 97 fetches these 8 bits×7 bytes data strings and then detects a timing which matches the value "0011011" of the second to eighth octets of the even frames assigned to the frame synchronous signal.

When this timing is detected, the pattern detector 97 inputs the output data of the serial-to-parallel converter 95 and registers 96A to 96F to the masks of eight systems with a value of "0011011" for each bit string in order to obtain the result of comparison, thereby detecting FAW with eight systems at the same time, makes the 8-bit output data fall, and outputs the detection result of DFAW.

In this way, in this embodiment, the pattern detector 97 can simultaneously detect FAW in parallel with respect to the first bit to the eighth bit of one time slot, respectively, as well as detect FAW easily and reliably.

In this connection, for this type of picture data and audio data, when a frame is formed as described above regarding FIG. 44, the vertically arranged seven bit data may succeed in a value identical to the FAW pattern.

Therefore, whether or not a correct FAW is detected cannot be judged by merely detecting the bit pattern of this value "0011011".

For this reason, in this embodiment, the pattern detector 97 outputs the 8-bit output data of the detection result to the FAW decision circuits 98A to 98H for every one bit and judges whether or not they are the correct FAW detection results.

Figure 47:
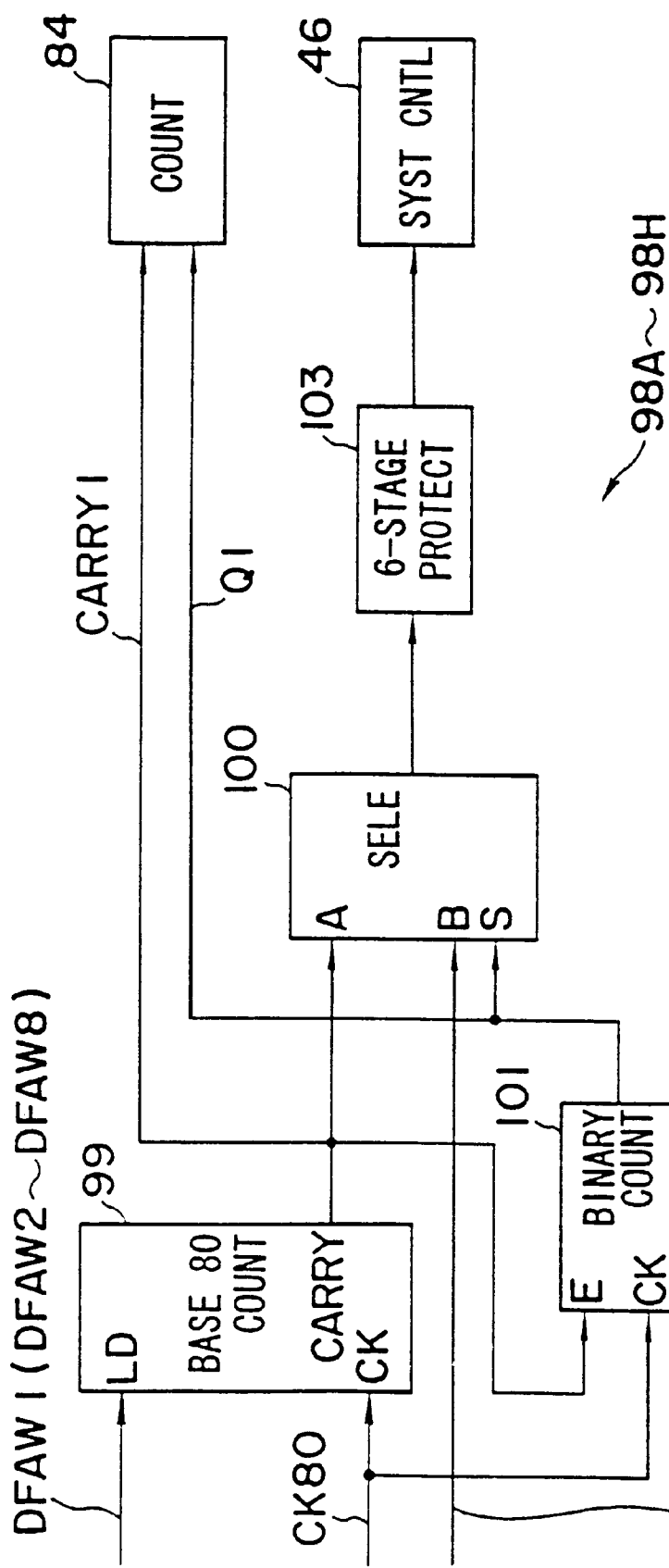
FIG. 47 is a block diagram illustrating the FAW decision circuit.

As shown in FIG. 47, the FAW decision circuits 98A to 98H consist of eight systems in the identical circuit configuration so as to correspond to the detection result DFAW. The FAW decision circuits 98A to 98H each input each bit DFAW 1 to DFAW 8 of the FAW detection result DFAW to the base eighty counter 99 and input each bit FAW 8 (FAW 81 to FAW 88) of the output data of the latch circuit 95F to the selector 100.

The base eighty counter consists of a ring counter with a base of eighty. When the logic level of these bits DFAW 1 to DFAW 8 falls, the count of the clock CK80 with a frequency of 8 [kHz] synchronized with the forming frequency of time slots is started, and when the count value reaches the value 80, the carry signal CARRY is raised.

When the FAW detection result DFAW is obtained, the base eighty counter counts the data of the identical time slots from the corresponding input data in units of eighty bits and the count result is output as the carry signal CARRY.

The binary counter 101 consists of a counter with a base of two, which operates with the clock CK80 as a reference. The binary counter 101 counts the carry signals CARRY, thereby raising the logic level of the output with a period of two frames has passed from the timing in which the FAW detection result DRAW is obtained.

In this way, in cases where the FAW detection result DFAW 1 is correct, the FAW decision circuits 98A to 98H can obtain the FAW detection result DFAW 1 again with the timing in which the logic level of the binary counter 101 rises. In addition, the FAW decision circuits 98A to 98H can detect the data of odd frames, service channel, and octet number 2 with the timing in which the logic level of the carry signal CARRY rises.

Here, in the H.221, provisions, it is regulated so that the data of odd frames, service channel, and octet number 2 are held at the value "1" at all times (FIG. 45). When the FAW detection result DFAW 1 is correct and the logic level of the carry signal CARRY rises, the logic level of the input data FAW 81 to FAW 82 of the selector 100 also rise at the same time.

In this way, the selector 100 outputs the FAW detection result DFAW 1 and the input data FAW 81 to FAW 82 of the selector 100 alternately with a timing in which the logic level of the binary counter 101 switches, thereby outputting a selection result in which the logic levels are held at the value "1" in succession when a correct FAW detection result DFAW 1 is obtained.

When the logic level of this selection result is held at the value "1" for six times in succession, the 6-stage protection circuit 103 judges that a correct FAW detection result DFAW 1 has been obtained and outputs the detection result to the system controller 46.

In actuality, when the bit pattern of FAW which is prescribed in H.221, succeeds for six frames, the 6-stage protection circuit 103 can judge a correct pattern to be reliably detected, thereby enabling the frame synchronous signal to be detected reliably.

On the other hand, when the logic level of the selection result does not rise for six times in succession, the 6-stage protection circuit 103 outputs a reset signal to the base eighty counter 99 and the binary counter 101, thereby allowing the FAW detection circuit 83 to restart the FAW detection process again with respect to this bit.

Thus, in the case of this embodiment, the FAW of eight systems are simultaneously detected in parallel and whether or not the FAW detection results are correct is judged by the FAW decision circuits 98A to 98H for each system. In this way, even in cases where one FAW detection result DFAW 1 (DFAW 2 to DFAW 8) is not correct, whether or not the FAW detection result is correct is simultaneously judged in parallel with respect to another bit string, thereby enabling the FAW to be detected easily and securely in a short time.

Thus, when the FAW detection result is obtained, the system controller 46 starts the operation of the counter 84.

Figure 48:
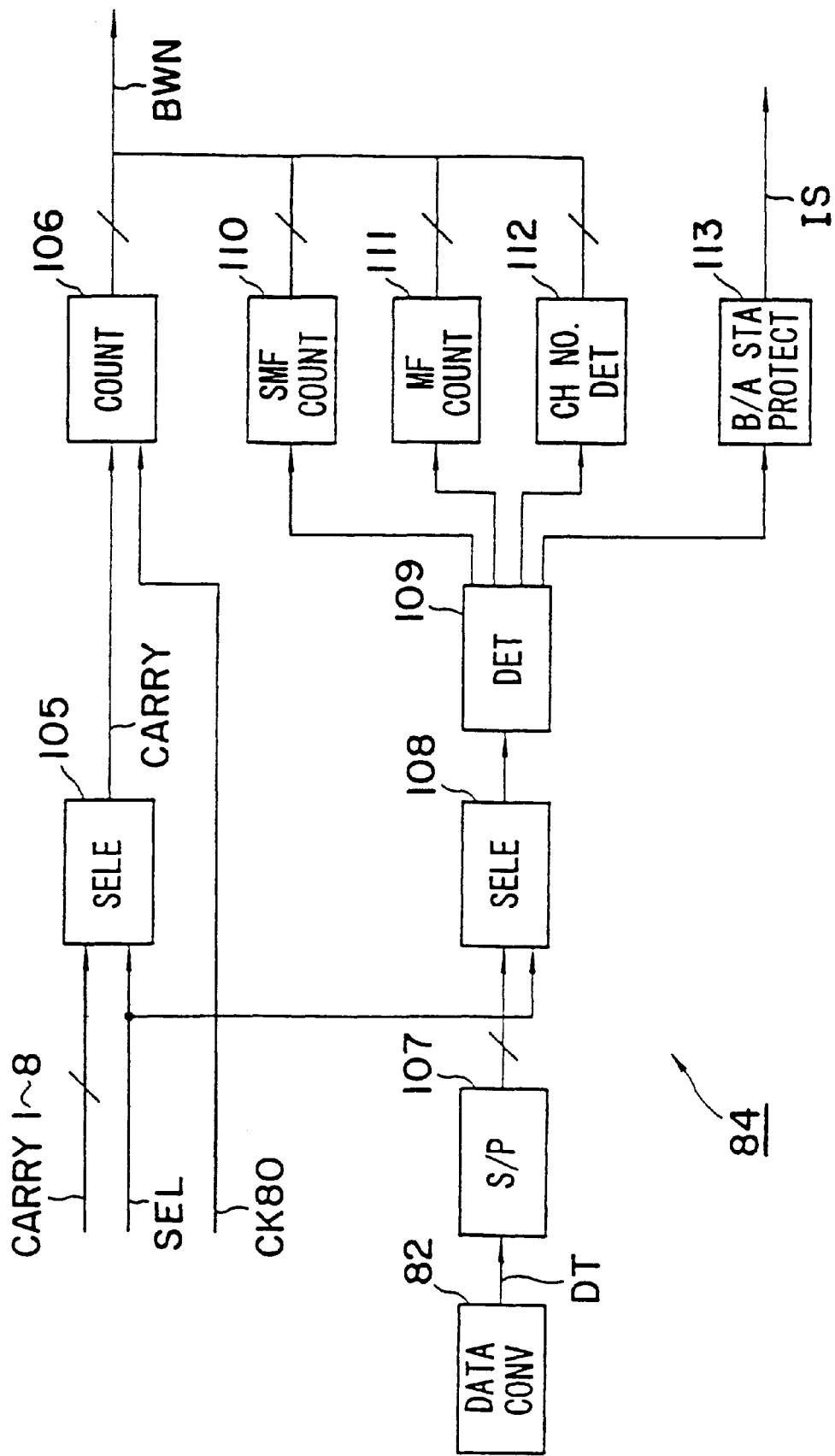
FIG. 48 is a block diagram illustrating the counter.
Figure 49:
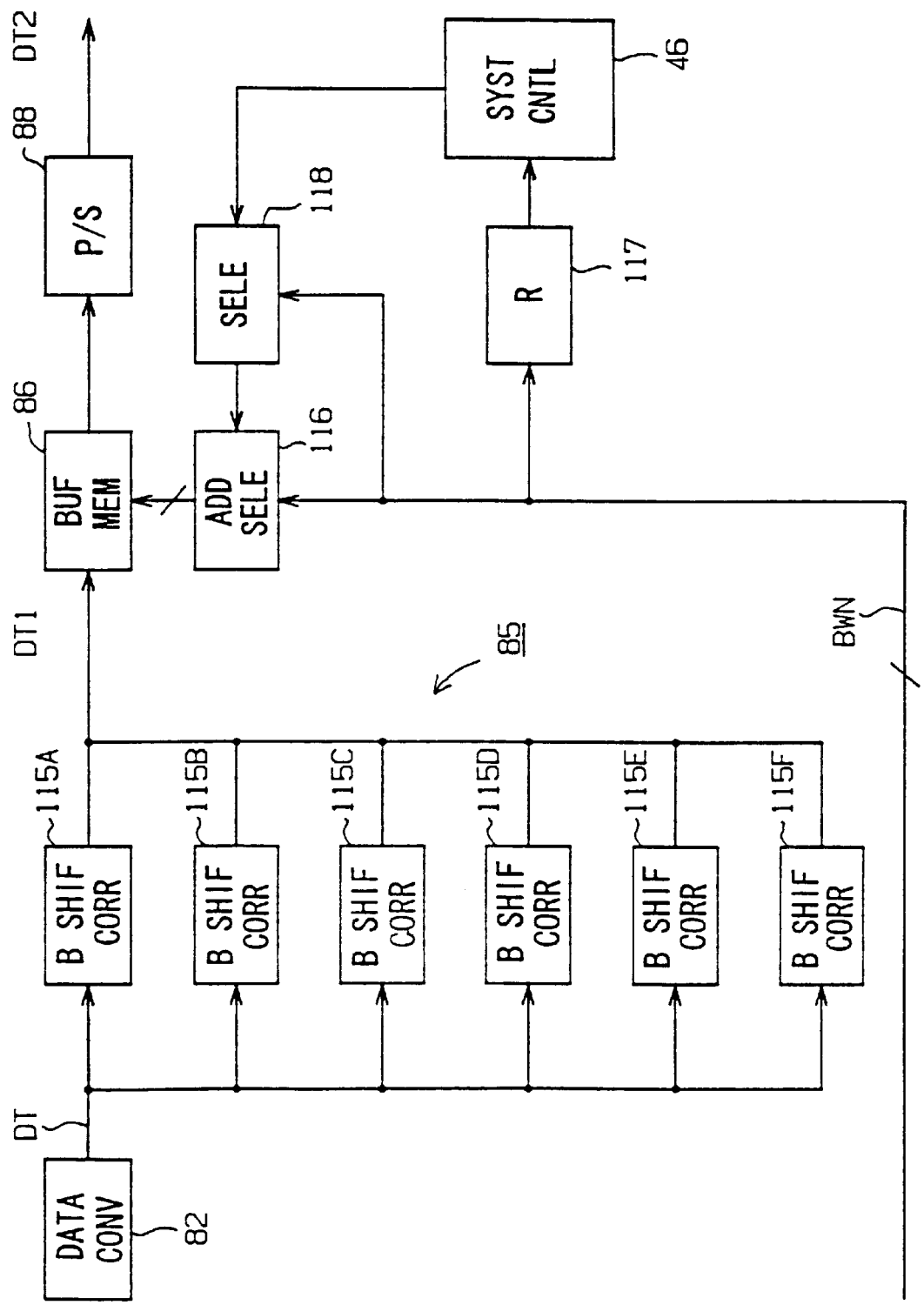
FIG. 49 is a block diagram illustrating the bit switching circuit.

Here, the counter 84 has six systems of a configuration shown in FIG. 48 and detects the octet number of each line in each system.

That is, in the 6-system counter 84, each carry signal CARRY 1 to 8 from the 8-system FAW detection circuit 83 is received by the selector 105 and the carry signal CARRY 1 to 8 output from the one-system FAW detection circuit 83 is selectively input according to the selection signal output through the system controller 46.

When a correct FAW detection result is obtained with respect to the first time slot, the system controller 46 outputs a selection signal SEL through a predetermined reference signal generator so that a carry signal CARRY is selectively input from the FAW detection circuit 83, in which a correct detection result is obtained, to the first counter 84.

Thus, when a carry signal CARRY is selected, the counter 84 loads this carry signal CARRY 1 to the base 160 ring counter 106, which operates with a clock CK80 of 8 [kHz] frequency.

In this way, the counter 84 generates a count value corresponding to the octet number in units of sub-multiframe.

The serial-to-parallel converter 107 converts the time slotted serial data DT, which consists of the output data of the data converter 82, into parallel data and outputs it.

The selector 108 starts its operation in response to the selection signal SEL and selectively outputs the data of one time slot from this parallel data so as to respond to the time slot in which the FAW detection result is obtained.

The detection circuit 109 selectively inputs data of one bit per frame from among the output data of the selector 108 by on the basis of the count result of the ring counter 106, thereby selectively inputting the data of octet number 1 of the service channel (FIG. 44).

Furthermore, the detection circuit 109 monitors the data of this octet number 1, which is obtained from the odd frames, and when a value "001011" is detected in succession, the sub-multiframe (SMF) counter 110 is reset (FIG. 45).

The sub-multiframe counter 110 consists of a hexadecimal ring counter, which counts the count result of the counter 106, thereby increasing the count value in units of frame and resetting the count value at a multiframe cycle.

In this way, the sub-multiframe counter 110 outputs the count value of each frame in multiframe units.

Furthermore, the detector 109 detects the data of the octet number 1 of the first to fifth sub-multiframes and the even frames and outputs these detection results to the MF counter 111 at a predetermined timing.

The MF counter 111 consists of a hexadecimal ring counter, which operates on the basis of the count result of the sub-multiframe counter 110, and operates by loading the detection result of the detector 109, thereby outputting the count values corresponding to the data "N1, N2, N3, and N4" of the octet number 1 of the even frames.

In this way, the counter 84 outputs the octet number detection result BWN taking 16 multiframes as a unit according to the FAW detection result with respect to the lines to be detected.

Furthermore, the detector 109 detects the data of the octet number 1 of the sixth sub-multiframe and even frames and the data "L1, L2 and L3" of the octet number 1 of the seventh sub-multiframe, even frames, and odd frames (FIG. 45) and outputs this detection result to the CH number detector 112, which consists of a latch circuit, with a predetermined timing.

Here, in the H.221 format, the data "L1, L2, and L3" is transmitted by assigning the channel number of the line to the data and the channel detection result is held by latching it to the CH number detector 112 as well as this channel number detection result is output together with the count values of the counters 106 to 112.

Furthermore, the detector 109 takes the bit allocation, which is detected by the counter 106, as a reference, detects the data of the octet numbers 2 to 8 of the even frames and service channel, and outputs them to the before and after stage protection circuit 113. The before and after stage protection circuit 113 judges whether or not this data is a value "0011011".

When a negative result is obtained here, it is considered to be a case of the step being out of synchronization. Therefore, the before and after stage protection circuit 113 outputs a step-out signal IS to the system controller 46.

That is, once the counters 106 to 111 and the CH number detector 112 come to output the detection results of the octet number taking 16 multiframes as a unit, the system controller 46 switches the selection signal SEL and isolates the counter 84 from the FAW detector 83.

In this way, the system controller 46 switches the detection object of the FAW detector 83 to the following second time slot and at the same time outputs a selection signal SEL to the counter 84 of the second system so that the FAW detection result can be output to the counter 84 of this second system.

On the other hand, the counter 84 of the first system in which the FAW detector 83 is isolated starts operation at a timing once synchronized and continues to count the clock CK80 synchronized with a formation cycle of the time slots (that is, the counters 106 to 111 run by themselves), thereby continuously outputting the detection result BWN of the octet numbers.

In this way, the video conference apparatus 1 sequentially switches the detection object of the FAW detector 83 so that the FAW detection result can be obtained, and the overall configuration can be simplified for that portion.

That is, in this video conference apparatus 1, the phase shift of up to six time slots may be compensated, respectively, by connecting the maximum number of lines in channel B.

In this connection, in channel $H_0$, in cases where two lines are connected, the phase shift is detected with respect to two time slots and all the phase shifts can be compensated based on this detection result, and in channels $H_{11}$ and $H_{12}$, transmission can be made with one line, respectively, so it is understood that compensation for phase shift is not required.

In this way, it is understood that phase shift can be detected by only preparing 6-system counter circuits.

In this type of line, there is a case where bit shift may occur due to the malfunctioning of equipment on the transmission side, etc., during communication. In this case, synchronization steps out from the count values of the free-running counters 106 to 111.

For this reason, when this step out is detected by the before and after stage protector 113, the phase shift compensator 80 switches the detection object of the FAW detector 83 and outputs a selection signal SEL to the step-out counter 84 so that it can output an FAW detection result, thereby detecting FAW to resynchronize, and outputs the detection result BWN of the octet numbers.

Figure 50A:
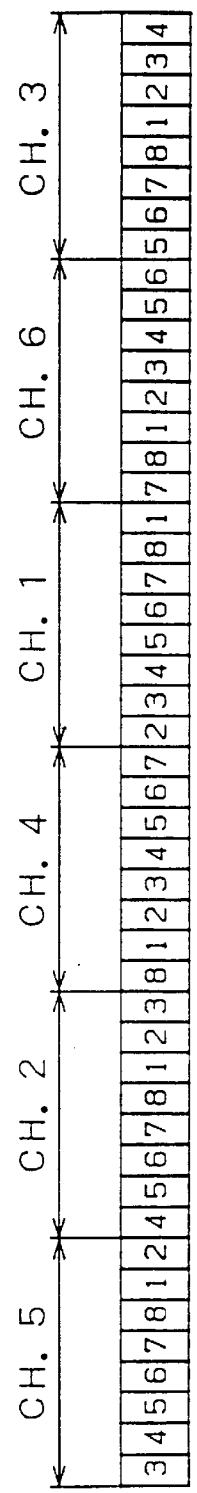
FIGS. 50A to 50C are schematic diagrams for the explanation of phase shift compensation.

As shown in FIGS. 49 and 50A to 50C, the bit switching circuit 85 consists of 6-system bit shift correction circuits 115A to 115F, which correspond to the systems of the counter 84, respectively, and inputs the output data DT of the data converter 82 to these bit shift correction circuits 115A to 115F (FIG. 50A).

The bit shift correction circuits 115A to 115F each consist of 2-system 8-bit latch circuits, latch 8-bit data DT of the corresponding time slot alternately with 2-system 8-bit latch circuits, and fetch and output the latch result with a predetermined timing on the basis of the output data of the system controller 46.

When the detection result BWM of the octet number is obtained by the counter 84, the system controller 46 inputs the FAW detection result DFAW of the corresponding line and outputs this FAW detection result DFAW to the corresponding bit shift correction circuits 115A to 115F.

Figure 50B:
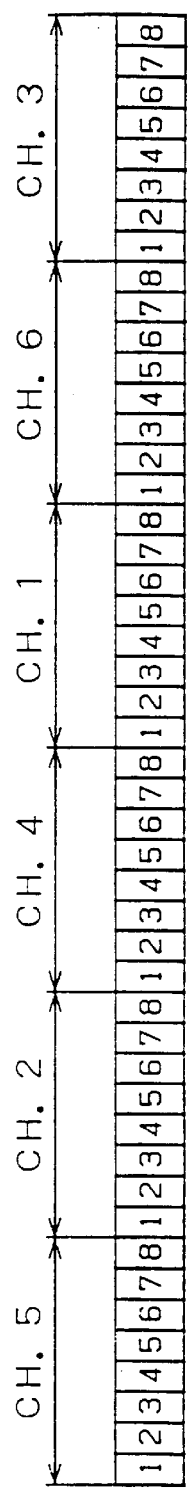
Figure 50C:
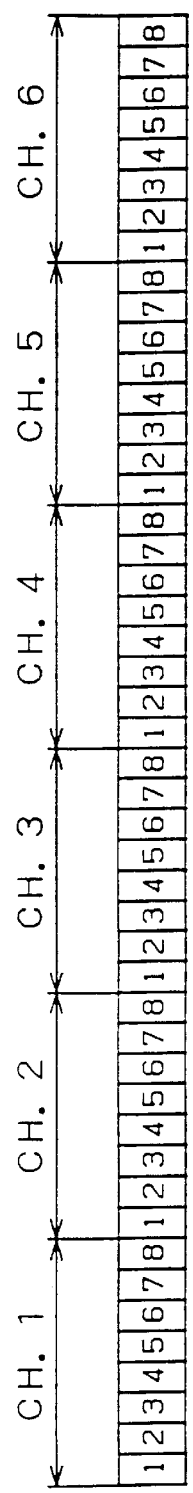

In this way, the bit shift correction circuits 115A to 115F fetch and output the latch result according to the detection results of the counter 84 and the FAW detection circuit 83, thereby converting the array of the data DT so that the succeeding identical octet data of the output data DT, which is sequentially input, succeeds in each time slot, and then output it (FIG. 50B).

For example, in this case, it is understood that the data "1" and "2" of the fifth channel and the data "3" to "8" of the fifth channel of the following time slot are coupled and one time slot is formed.

In this way, in the video conference apparatus 1, up to six lines are connected, thereby enabling the phase shift compensator 80 to compensate the phase shift of each line so that the identical octet data succeeds in each time slot using 6-system bit shift correction circuits 115A to 115F.

In addition, when the output data of the latch circuit is sent, the bit shift correction circuits 115A to 115F output the data at a timing synchronized with the input data DT in a parallel data form. In FIG. 50B, the output data DT1 is substantially and diagrammatically expressed in the form of serial data to show the correspondence with the input data DT.

The bit shift correction circuits 115A to 115F output this output data DT1 to the buffer memory 86 and the address selector 116 outputs the octet number detection result BWN and channel number detection result synchronously corresponding to the timing of this output data DT1.

In this way, the buffer memory 86 makes the octet number detection result BWN and channel number detection result into address data and sequentially stores the input data DT1.

On the other hand, the system controller 46 inputs the octet number detection result BWN through the latch circuit 117 and detects time slots which become a reference for compensating the phase shift.

Here, when phase shift is compensated with respect to the six lines, the time slot which is delayed most is detected and setting is made on the basis of this time slot.

However, when the time slot which is delayed most is detected from among the six time slots according to the octet number detection result BWN which varies sequentially and circulatively like this, the process becomes, complicated.

For this reason, in this embodiment, the system controller 46 inputs the 2-system octet number detection results BWN through the latch circuit (R) 117 and detects the result of comparison of these octet number detection results BWN.

In this way, the system controller 46 detects a line which is delayed from among these two time slots, and then inputs the octet number detection results BWN with respect to this delayed line along with one line out of the remaining four lines and detects the result of comparison.

In this way, the system controller sequentially fetches the 2-system octet umber detection results BWN and detects the result of comparison, thereby detecting the most delayed circuit by repeating this process for a maximum of five times. Thus, the latch circuit 117 can simultaneously fetch the 2-system octet number detection results BWN.

Furthermore, the system controller 46 outputs a switching signal to the selector 118 and selectively outputs the octet number detection result BWN of the most delayed line.

In this way, the address selector 116 reads the octet number detection result BWN of this most delayed line and outputs it to the buffer memory 86 as an address, thereby allowing the buffer member 86 to sequentially output the stored data and to compensate for the phase shift.

At this time, the address selector 116 outputs the data of the channel number, the value of which circulates sequentially, to the buffer memory as address data so that the channel number circulates sequentially.

In this way, the phase shift compensator 80 compensates for the phase shift between lines as well as rearranges the array of the data DT so that the channel numbers sequentially succeed, outputs it (FIG. 50C), and then converts it into its original serial data form with the parallel-to-serial converter 88 and outputs it.

Thus, even in cases where the phase shift is compensated for, the process can be simplified by processing by assigning the data of each line to the time slots.

Furthermore, the HSD data is transmitted by assigning a frame synchronous signal, etc., and can be received in the correct channel array with compensation of phase shift with respect to the document pictures, etc., as well, thereby allowing the document pictures to be reproduced correctly.

(1-5-2-5) Update of Mapping Memory

In this connection, the mapping memory 66 and the mapping circuit 81 switch the data to be assigned to each frame by updating the mapping data, respectively. In this way, the video conference apparatus 1 transmits various data by switching it according to the operation mode.

The mapping memory 66 has to be updated to switch this data. If this update process can be simplified, the time required for the update process by the system controller 46 can be shortened, and the overall configuration can be simplified for that portion.

Furthermore, when the data is mapped to the time slots, or when the data is separated and output to each block, the multiplexer 47 refers to this mapping memory 66. If this reference work can be simplified, the overall processing time can be shortened and the configuration can also be simplified.

Figure 51:
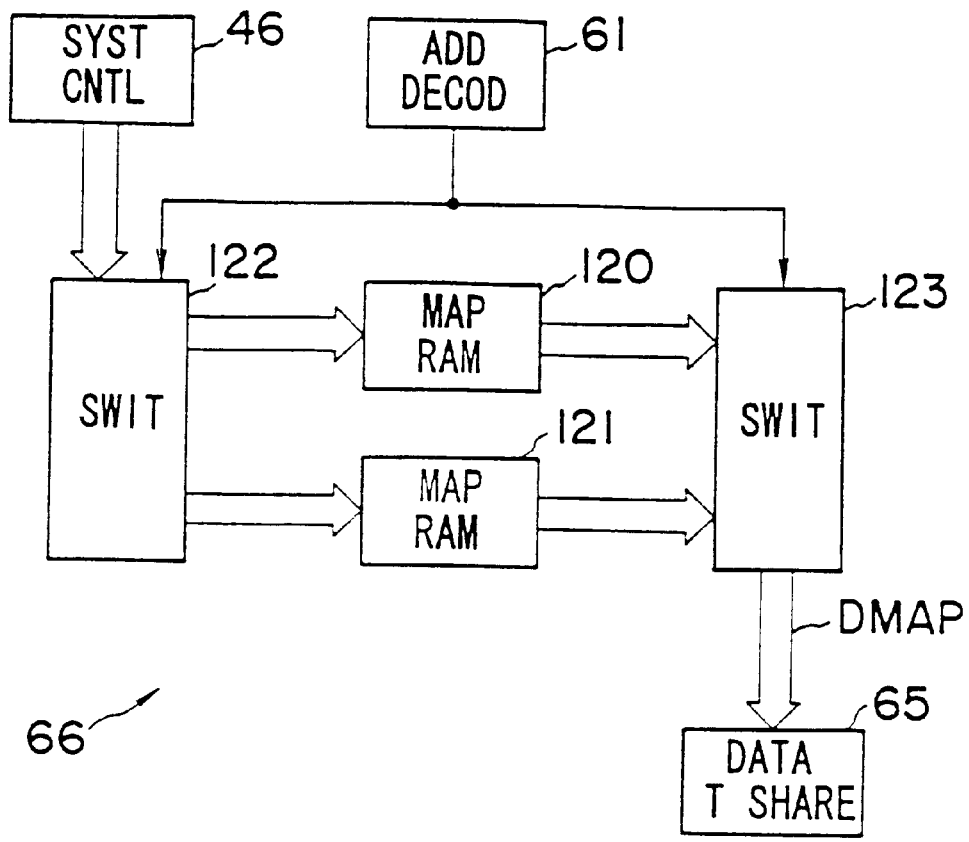
FIG. 51 is a block diagram illustrating a mapping memory.

For this reason, as shown in FIG. 51, the mapping memory 66 forms a memory space corresponding to the time slots in the first and second mapping RAMs 120 and 121, respectively, forms an address space corresponding to the data array of each frame in this memory space, and stores the mapping data in this address space.

Figure 52:
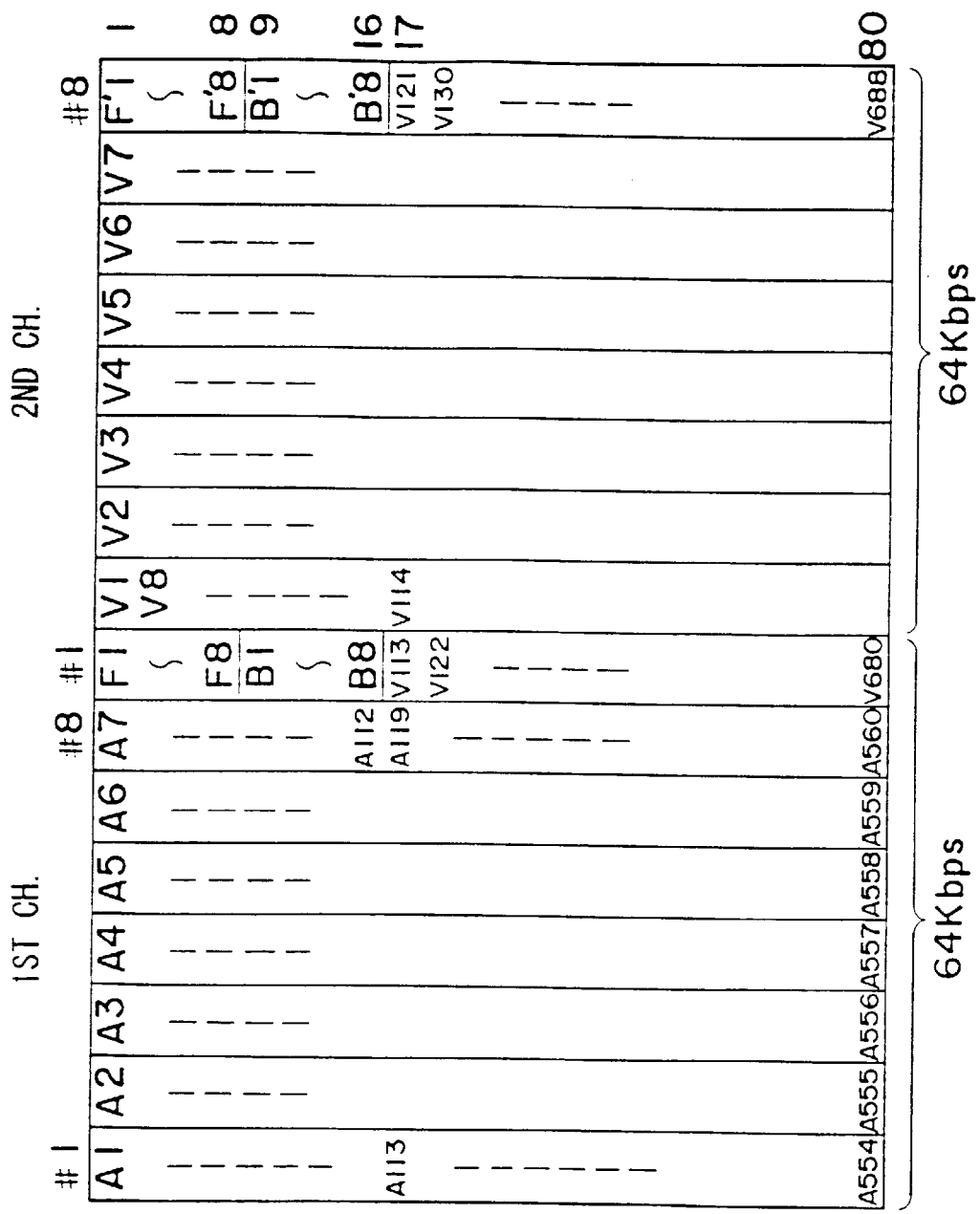
FIG. 52 is a schematic diagram for the explanation.

In this way, as shown in FIG. 52, in cases where the mapping memory 66 transmits data using two lines of channel B, it is so arranged that the data expressing the type of data to be stored corresponding to the frame of the first channel and the second channel is stored as mapping data, and the data time sharing circuit 65 sequentially inputs motion picture data, etc.

In addition, in FIG. 52, the motion picture data is expressed with symbol V and the data of the frame synchronous signal and bit identification signal are expressed with symbols F and B, respectively.

Furthermore, the mapping memory 66 complimentarily switches the switching circuits 122 and 123 at a predetermined timing so that the mapping RAMs 120 and 121 are connected with the system controller 46 or the data time sharing circuit 65, respectively. While the data time sharing circuit 65 is accessing one mapping RAM 120 or 121 and referring to the mapping data DMAP, the mapping data DMAP of the other mapping RAM 121 or 120 can be updated.

In this way, the video conference apparatus 1 switches the connection of the switching circuits 122 and 123 at a predetermined timing, thereby allowing the operation mode to be switched easily.

Figure 53:
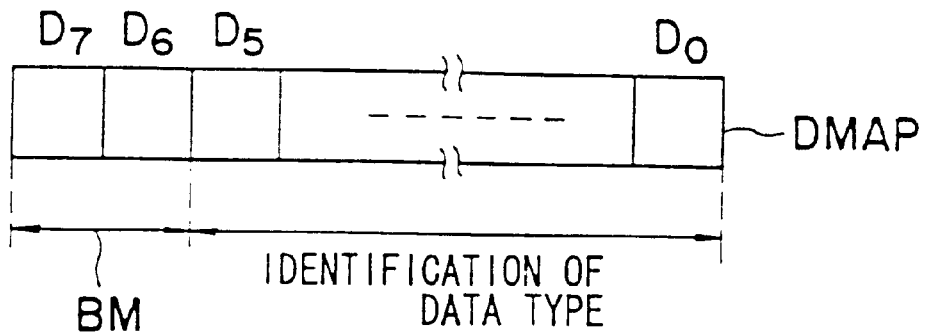
FIG. 53 is a schematic diagram illustrating mapping data.

Here, the mapping data DMAP, as shown in FIG. 53, is constituted of 8-bit data, and so designed to designate the type, such as motion picture data and audio data, with the least significant 6-bit data.

That is, in cases where the audio data is assigned, the mapping data DMAP raises the least significant bit of these six bits only to the value "1", but in cases where the motion picture data is assigned, it raises the following second bit only to the value "1".

On the other hand, the data time sharing circuit 65 selectively inputs the audio data, motion picture data, HSB data, etc., on the basis of these least significant 6-bit data, thereby sequentially assigning the data set in advance to the time slot, and outputs it.

Furthermore, the mapping data DMAP assigns the identification data BM to the most significant bit D7 and switches the mapping data access operation of the data time sharing circuit 65 with this identification data BM.

That is, in the case of this embodiment, each frame consists of the subframes (the 1st to 7th subframes correspond to these in FIG. 52) in which data of the same type is assigned and the subframes (the 8th subframe corresponds to this in FIG. 52) in which the data of different types is assigned.

In this way, in cases where the data of an identical type is assigned to the subframes to be read in succession (that is, in this case, the mapping data of the 1st to 6th subframes and the 8th subframe correspond to this by accessing the mapping data so that raster scanning can be performed), the system controller 46 raises this identification data BM to the value "1".

The data time sharing circuit 65 holds the mapping data DMAP corresponding to the octet number 1 out of the accessed mapping data DMAP.

Furthermore, when the designated data is mapped, the data time sharing circuit 65 detects the identification data BM, and when the identification data BM has risen to the value "1", the data time sharing circuit 65 suspends access to the following mapping data DMAP and maps the data designated by this held mapping data DMAP.

In this way, the access frequency of the mapping memory 66 can be reduced significantly and the processing time can be shortened for that portion. Furthermore, the capacity of the mapping memory 66 can be made compact, thereby allowing the overall configuration of the video conference apparatus 1 to be simplified and made compact.

Furthermore, writing in the mapping memory 66 is not required with respect to the mapping data DMAP in which this access is suspended, thereby enabling the system controller 46 to complete the update process of the mapping memory 66 in a short time for that portion and to reduce the burden of the system controller 46 for that portion.

On the other hand, the mapping circuit 81 (FIG. 43) obtains the mapping data by accessing the mapping memory, contrary to the case of the data time sharing circuit 65, separates the multiplexed data DT according to this mapping data, and outputs the data separated to the corresponding circuit blocks 11, 18, etc.

In this way, even in cases the separation process is carried out on the data received, it can be securely separated into original data with a simple configuration as a whole.

(2) Other Embodiments

The embodiments discussed above have dealt with the case where the image processing in this invention, of the document image and the natural picture is applied to the video conference apparatus. However, this invention is not limited to this, but is widely applicable to the image processor for image processing the document picture and the natural picture.

Further, the embodiments discussed above have dealt with the case where the tele-writing function in this invention is applied to the video conference apparatus. However, this invention is not limited to this, but is widely applicable to an image processor for displaying still pictures which are input through an image scanner, etc..

(3) Effects of the Invention

According to this invention, as described above, the address data is switched between binary input picture data and multi-value input picture data, and the memory space of the input picture memory is used by switching between the binary input picture data and the multi-value input picture data. Thus, the input image memory can be shared between the binary input picture data and the multi-level input picture data. Therefore, an image processor can be provided with simple constitution.

Further, according to this invention, the picture data of the odd-numbered and the even-numbered fields is generated from the picture data of two lines and is sequentially stored, and the picture data stored once is fed back and re-stored at the following field. And simultaneously, the rest of the picture data of the even-numbered and the odd-numbered fields is generated from the picture data of two lines and is sequentially stored. Thereby, even when the line number of the display means is different for the pick-up device of communication objects, the picture data can be transmitted with simple constitution and with real time, and the line number of the picture data can be converted to the line number of the display means to output. Also, binary picture data is processed similarly. Even when the line number of the display means is different from the monitor device of the transmission object side, the input picture can be displayed with the same aspect ratio as the monitor device of the transmission object side. Therefore, the image processor can be provided in which the same display picture as communication objects can be formed regardless of the system of communication objects.

Furthermore, according to this invention, by outputting the picture data of the continuous line from the display picture memory at the same time, and outputting the picture data of the line to be outputted to the display device which is mixed with the picture data of the adjacent line, the sudden brightness change between the adjacent lines can be reduced. Therefore, the image processor can be provided in which even if the interlace method is applied so as to form the display picture, the flickering can be reduced with simple construction.

Furthermore, according to the invention, the input picture data, which is stored in the input picture memory, is updated according to the line drawing data and the picture of line drawing, etc., can be held at a corresponding position by writing the picture expressed with line drawing data directly in the input picture, which is stored in the input picture memory even in cases the display of the input picture is switched, thereby obtaining an image processor which can improve operability by freely switching the display of the input image.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An apparatus for receiving a digital video conference signal including data frames transmitted along a plurality of transmission lines, said data frames having frame synchronization information, the apparatus comprising:

data receiving means for receiving said data frames from said plurality of transmission lines;

data parsing means for parsing said received data frames into units of a predetermined number of bits;

synchronization signal detecting means for examining each of said units and for detecting a particular unit with a predetermined bit pattern indicating said frame synchronization information, said particular unit designating start of a first data frame;

a counter for receiving said units and counting a number of units following detection of said particular unit by said synchronization signal detecting means up to a predetermined number of units, said predetermined number of units corresponding to a size of said first data frame;

a buffer memory for sequentially storing said units parsed by said parsing means; and output control means connected to an output of said counter and for controlling said buffer memory to output the stored units until said counter reaches said predetermined number of units, whereby said first data frame is received and compensated in phase.

2. The apparatus according to claim 1 wherein the synchronization signal detection means includes:

parallel to serial conversion means for converting said parsed units into parallel words of a length equal to said predetermined number of bits;

a plurality of registers for sequentially storing a respective plurality of said parallel words; and pattern detection means for detecting whether one of said stored parallel words has said predetermined bit pattern.

3. The apparatus according to claim 2 wherein said parsing means includes bit boundary correcting means for detecting a correct order of bits in said parallel words and for outputting said words with said bits in said correct order.

4. A method for receiving a digital video conference transmission signal transmitted along a plurality of transmission lines comprising the steps of:

receiving a first signal from a first transmission line of said plurality of transmission lines;

parsing said received signal into segments of a predetermined number of bits;

examining said segments to find a particular segment with a pattern indicating that it is a synchronization segment;

storing said parsed segments in a buffer memory;

counting a number of segments stored in said buffer memory following said synchronization segment until said number reaches a predetermined number corresponding to a size of a first data frame, whereby said first data frame is received;

outputting a first data frame in response to finding the synchronization segment in said step of examining, so as to be compensated in phase;

receiving a second signal from a second transmission line of said plurality of transmission lines; and repeating said steps of examining, storing, counting, and outputting with said signal from said second transmission line, whereby a second data frame is received.

5. The method according to claim 4 wherein said step of parsing includes the steps of:

examining each of said parsed segments;

determining a correct bit boundary for said segments; and correcting an order of said bits within said parsed segments based on the determined bit boundary.

\* \* \* \* \*